US012083464B2

(12) United States Patent
Verstraete et al.

(10) Patent No.: US 12,083,464 B2
(45) Date of Patent: Sep. 10, 2024

(54) FILTER ELEMENT, AIR CLEANER ASSEMBLY, AND METHODS

(71) Applicant: Donaldson Company, Inc., Minneapolis, MN (US)

(72) Inventors: Mathijs Verstraete, Tienen (BE); Bart Catoor, Kessel-lo (BE); William Vanaudenhove, Diest (BE); Mathieu Jonckheere, Wezembeek-Oppem (BE); Benny K. Nelson, Bloomington, MN (US); David J. Burton, Bloomington, MN (US); Steven K. Campbell, Lakeville, MN (US); Timothy J. Wessels, Victoria, MN (US); Daniel E. Adamek, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 457 days.

(21) Appl. No.: 17/429,239

(22) PCT Filed: Feb. 7, 2020

(86) PCT No.: PCT/US2020/017285
§ 371 (c)(1),
(2) Date: Aug. 6, 2021

(87) PCT Pub. No.: WO2020/163756
PCT Pub. Date: Aug. 13, 2020

(65) Prior Publication Data
US 2022/0126228 A1    Apr. 28, 2022

Related U.S. Application Data

(60) Provisional application No. 62/802,824, filed on Feb. 8, 2019.

(51) Int. Cl.
*B01D 46/00* (2022.01)
*B01D 46/52* (2006.01)

(52) U.S. Cl.
CPC ..... *B01D 46/0009* (2013.01); *B01D 46/0004* (2013.01); *B01D 46/522* (2013.01);
(Continued)

(58) Field of Classification Search
CPC ............ B01D 46/0009; B01D 46/0004; B01D 46/522; B01D 46/523; B01D 46/527;
(Continued)

(56) References Cited

U.S. PATENT DOCUMENTS 4,925,561 A    5/1990   Ishii et al.
5,049,326 A    9/1991   Matsumoto et al.
(Continued)

FOREIGN PATENT DOCUMENTS

DE    202008017059 U1    5/2010
WO    97/40918 A1    11/1997
(Continued)

OTHER PUBLICATIONS

International Search Report and Written Opinion for PCT/US2020/017285, mailed May 27, 2020.

*Primary Examiner* — Robert A Hopkins
*Assistant Examiner* — Qianping He
(74) *Attorney, Agent, or Firm* — Merchant & Gould P.C.

(57) ABSTRACT

An air cleaner assembly includes a housing and a removable cover. A filter element is removably positioned in the housing. A two-part mating catch assembly includes a first part that is secured to the cover and a second part that is on one of the housing and the filter element. The first part and second part are positioned to releasably mate when the filter element is operably mounted within the housing.

21 Claims, 50 Drawing Sheets

(52) U.S. Cl.
CPC ......... *B01D 46/523* (2013.01); *B01D 46/527* (2013.01); *B01D 2265/027* (2013.01); *B01D 2265/028* (2013.01); *B01D 2279/60* (2013.01)

(58) Field of Classification Search
CPC ........ B01D 2265/027; B01D 2265/028; B01D 2279/60; B01D 46/001
USPC .......................................................... 55/295
See application file for complete search history.

(56) References Cited

U.S. PATENT DOCUMENTS

| | | | |
|---|---|---|---|
| 5,114,572 | A | 5/1992 | Hunter et al. |
| 5,562,825 | A | 10/1996 | Yamada et al. |
| 5,613,992 | A | 3/1997 | Engel |
| 5,772,883 | A | 6/1998 | Rothman et al. |
| D396,098 | S | 7/1998 | Gillingham et al. |
| 5,792,247 | A | 8/1998 | Gillingham et al. |
| D398,046 | S | 9/1998 | Gillingham et al. |
| D399,944 | S | 10/1998 | Gillingham et al. |
| 5,820,646 | A | 10/1998 | Gillingham et al. |
| 5,895,574 | A | 4/1999 | Friedmann et al. |
| 5,902,364 | A | 5/1999 | Tokar et al. |
| 6,039,778 | A | 3/2000 | Coulonvaux |
| D428,128 | S | 7/2000 | Gillingham et al. |
| 6,179,890 | B1 | 1/2001 | Ramos et al. |
| D437,401 | S | 2/2001 | Ramos et al. |
| 6,190,432 | B1 | 2/2001 | Gieseke et al. |
| 6,210,469 | B1 | 4/2001 | Tokar |
| 6,235,195 | B1 | 5/2001 | Tokar |
| 6,350,296 | B1 | 2/2002 | Warner |
| 6,673,136 | B2 | 1/2004 | Gillingham et al. |
| 7,282,075 | B2 | 10/2007 | Sporre et al. |
| 8,479,924 | B2 | 7/2013 | Mbadinga-Mouanda et al. |
| 9,776,116 | B2 | 10/2017 | Honermann et al. |
| 9,914,079 | B2 | 3/2018 | Kocksch et al. |
| 9,919,256 | B2 | 3/2018 | Mbadinga-Mouanda et al. |
| 2004/0134171 | A1 | 7/2004 | Scott et al. |
| 2006/0091084 | A1 | 5/2006 | Merritt et al. |
| 2007/0193236 | A1 | 8/2007 | Merritt |
| 2008/0282890 | A1 | 11/2008 | Rocklitz et al. |
| 2009/0127211 | A1 | 5/2009 | Rocklitz et al. |
| 2010/0078379 | A1 | 4/2010 | Rocklitz |
| 2010/0186353 | A1 | 7/2010 | Ackermann et al. |
| 2016/0045848 | A1* | 2/2016 | Campbell .............. B01D 46/10 55/497 |
| 2017/0296951 | A1 | 10/2017 | Ardes |
| 2018/0207566 | A1 | 7/2018 | Stanhope et al. |
| 2019/0111374 | A1* | 4/2019 | Burton ............... F02M 35/0205 |

FOREIGN PATENT DOCUMENTS

| | | | |
|---|---|---|---|
| WO | 02/098540 | A1 | 12/2002 |
| WO | 03/47722 | A2 | 6/2003 |
| WO | 2004/007054 | A1 | 1/2004 |
| WO | 2004/071616 | A2 | 8/2004 |
| WO | 2004/082795 | A1 | 9/2004 |
| WO | 2005/107924 | A2 | 11/2005 |
| WO | 2007/149561 | A2 | 12/2007 |
| WO | WO-2009039285 | A1 * | 3/2009 ........... B01D 46/525 |
| WO | 2011/162854 | A1 | 12/2011 |
| WO | 2014/210541 | A1 | 12/2014 |
| WO | 2015/039993 | A1 | 3/2015 |
| WO | 2016/105560 | A2 | 6/2016 |

* cited by examiner

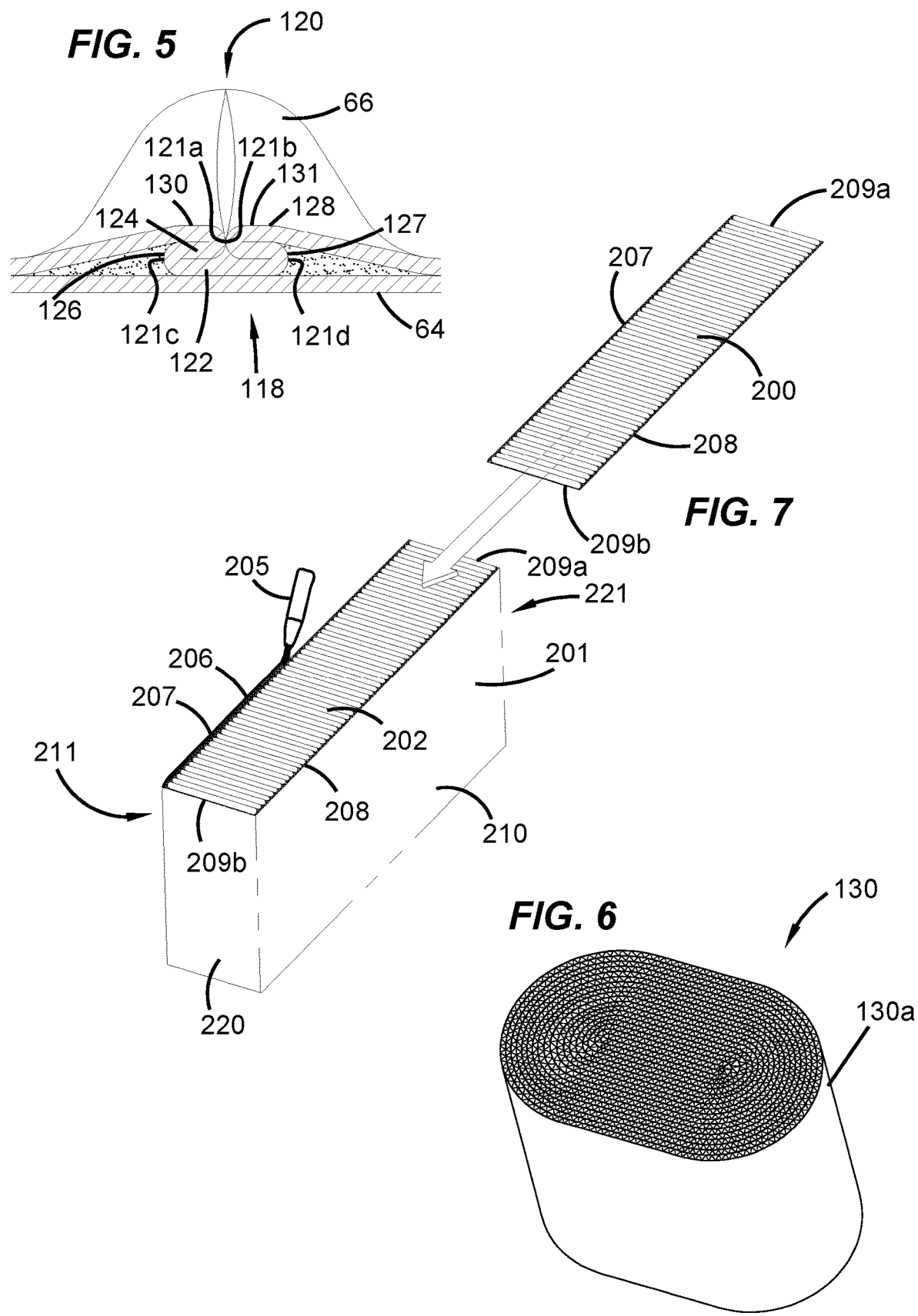

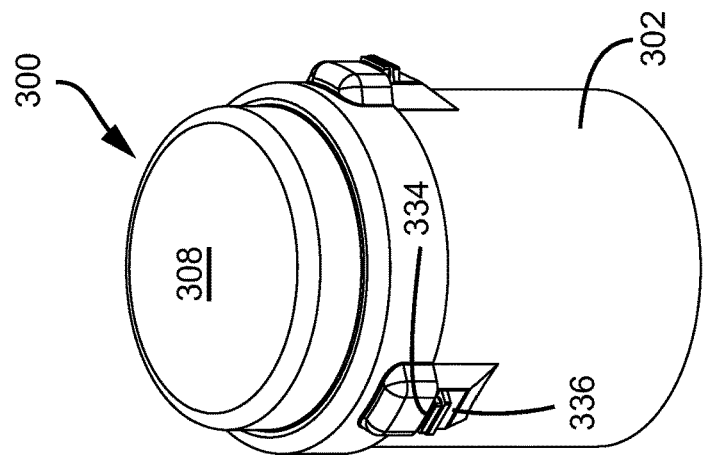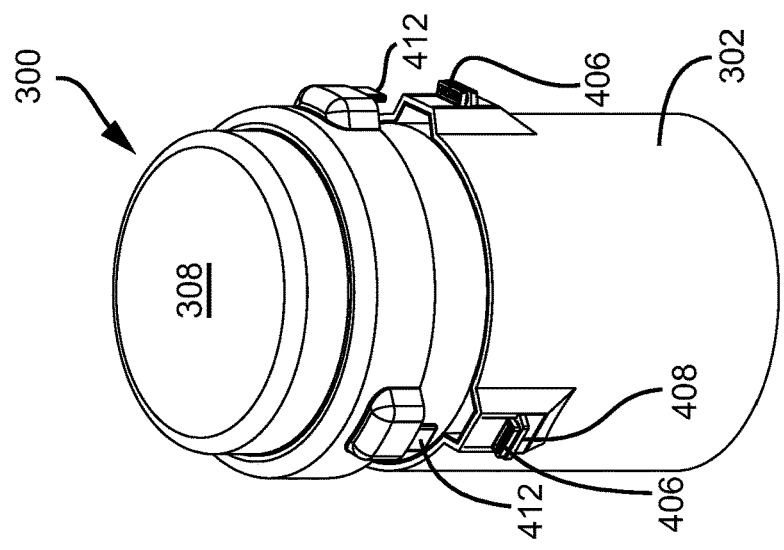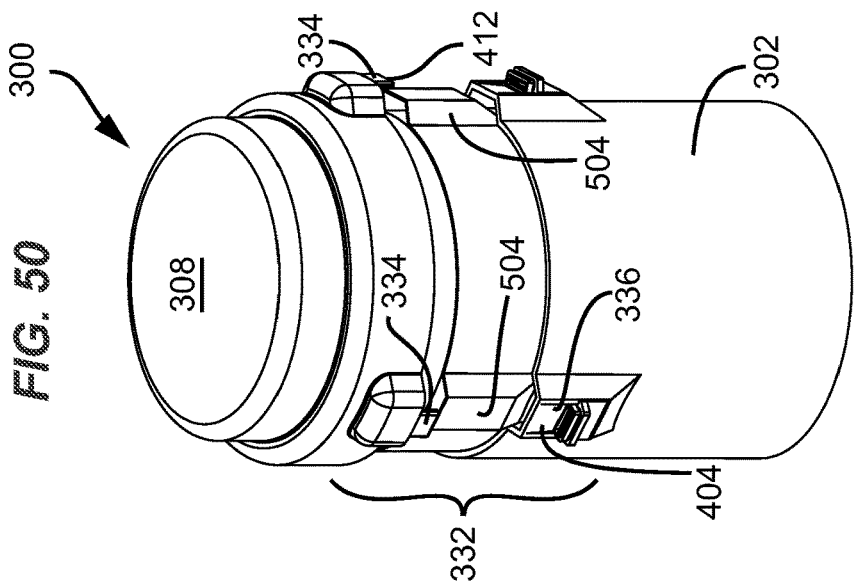

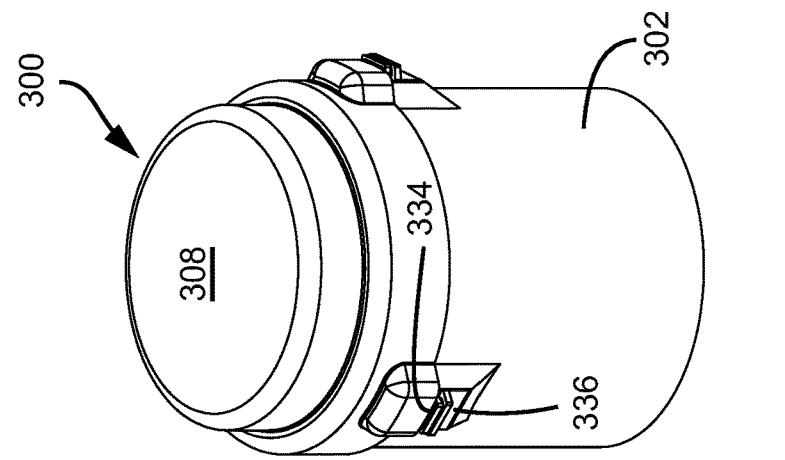
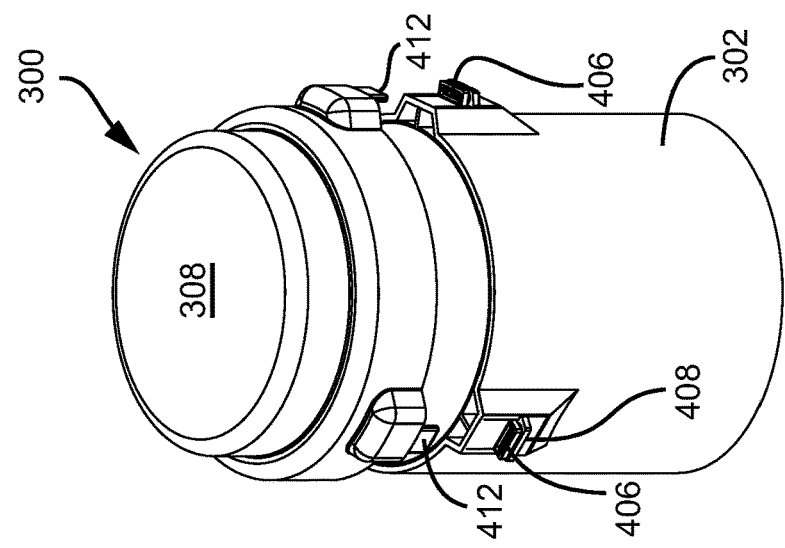
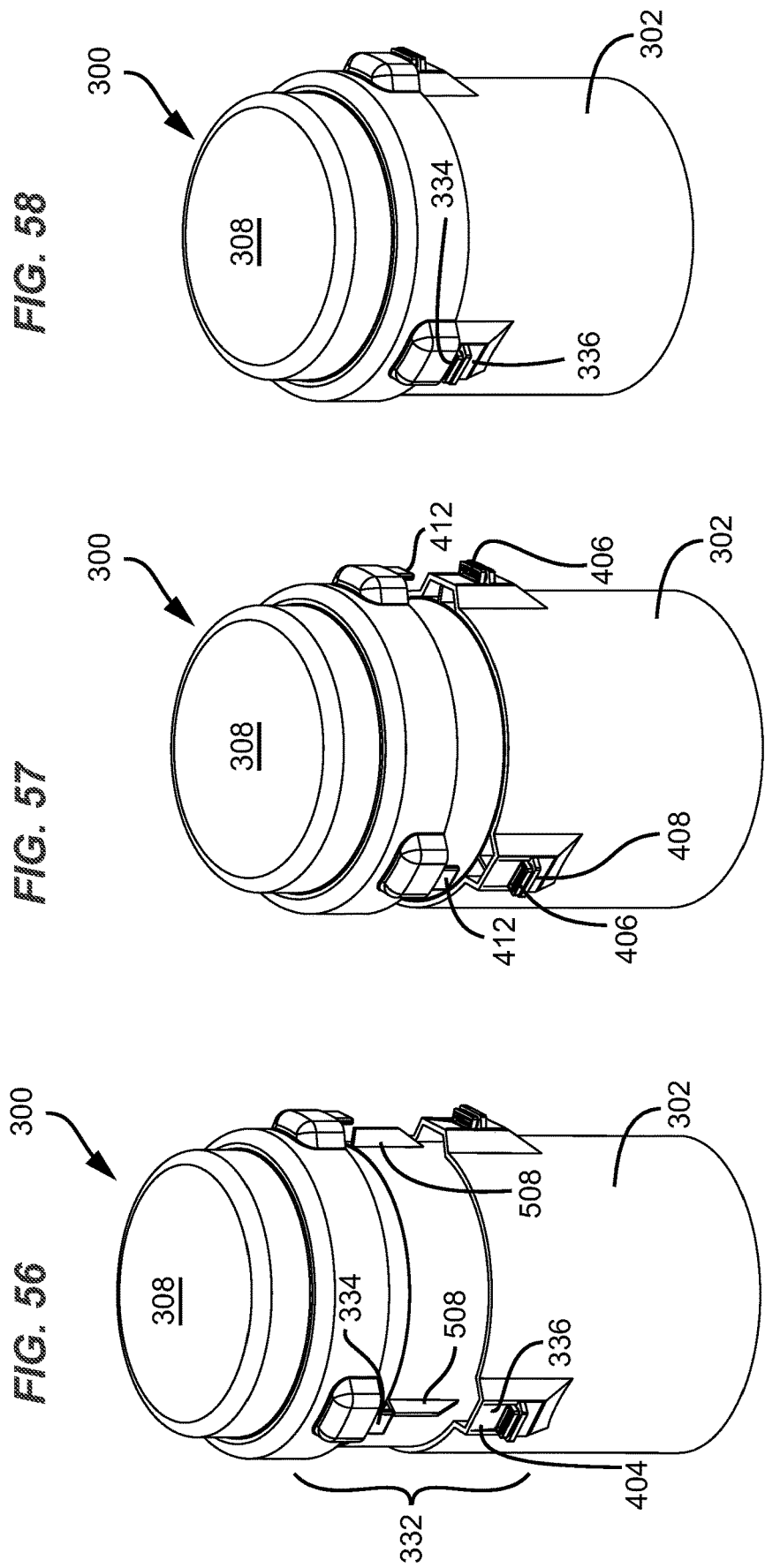

FIG. 65
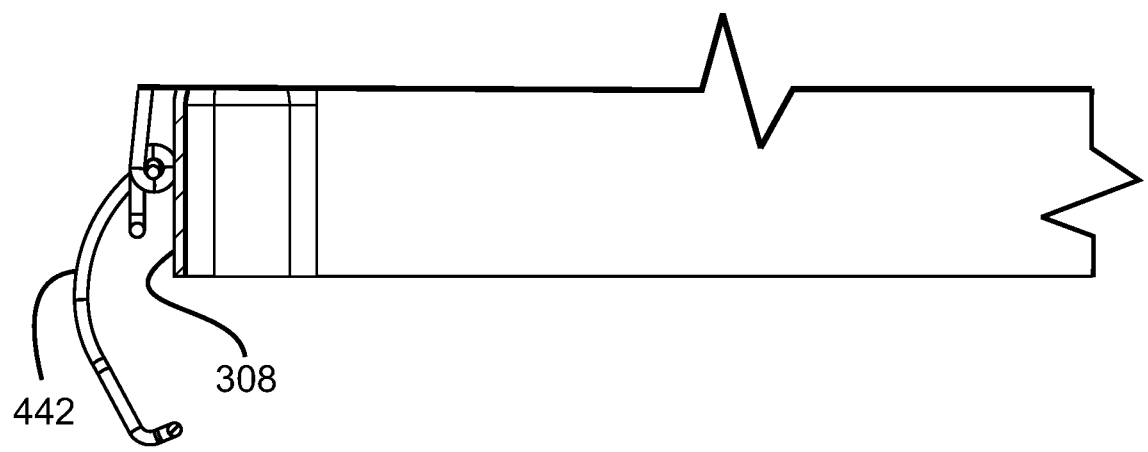
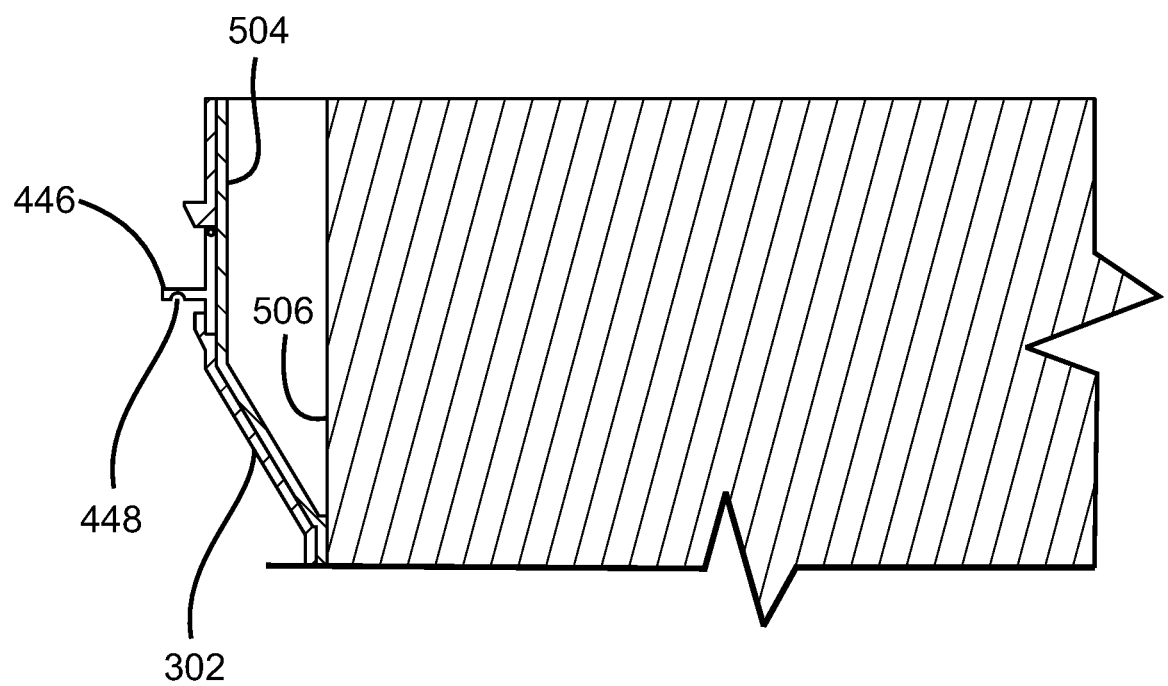

FILTER ELEMENT, AIR CLEANER ASSEMBLY, AND METHODS

This application is a US National Stage application of PCT International Patent application No. PCT/US2020/017285, filed Feb. 7, 2020, which claims the benefit of priority to U.S. Provisional patent application Ser. No. 62/802,824, filed Feb. 8, 2019, which applications are incorporated herein by reference. To the extent appropriate, a claim of priority is made to each of the above disclosed applications.

FIELD OF THE DISCLOSURE

The present disclosure relates to filter arrangements, typically for use in filtering air; such as intake air for internal combustion engines. The disclosure particularly relates to filter arrangements that involve elements (cartridges) having opposite flow ends. Air cleaner arrangements, components, and features; and, methods of assembly and use, are described.

BACKGROUND

Air streams can carry contaminant material such as dust and liquid particulate therein. In many instances, it is desired to filter some or all of the contaminant material from the air stream. For example, air flow streams to engines (for example combustion air streams) for motorized vehicles or for power generation equipment, gas streams to gas turbine systems and air streams to various combustion furnaces, carry particulate contaminant therein that should be filtered. It is preferred, for such systems, that selected contaminant material be removed from (or have its level reduced in) the air.

A variety of air filter arrangements have been developed for such contaminant removal. They typically include a serviceable (i.e. removable and replaceable) main filter element. It is desirable that the main filter element: be easy to service, be of a configuration that is readily and appropriately sealed within an air cleaner assembly in which it is used; and, preferably, be configured, in combination with the air cleaner assembly, such that an inappropriate or unapproved element cannot be readily installed or appear to be installed. Approaches toward this have been developed; see, for example, WO 2014/210541 and WO 2016/105560, incorporated herein by reference. Improvements are sought.

SUMMARY

According to the present disclosure, air cleaner assemblies, components, features, and methods relating thereto, are described. Among the features described are air filter elements usable as serviceable filter elements in air cleaner assemblies such as, for example, to filter intake air and internal combustion engines.

In general, an air cleaner assembly is provided that improves the prior art.

In one aspect, an air cleaner is provided including: (a) a housing having an interior volume and an access opening in communication with the interior volume; (b) a cover removably oriented over the access opening; (c) a filter element removably oriented in the interior volume of the housing; (d) a two-part mating catch assembly; (i) a first part of a two-part mating catch assembly being secured to the cover; (ii) a second part of the two-part mating catch assembly being on one of the housing and the filter element; and (iii) the first part and second part of the catch assembly being positioned to releasably mate when the filter element is operably mounted within the housing interior volume.

In some aspects, the second part is integral with the housing and is movable radially outward from a remaining portion of the housing when the filter element is operably mounted within the housing interior volume.

In some aspects, the filter element is constructed and arranged to push the second part radially outward from the remaining portion of the housing when the filter element is operably mounted within the housing interior volume.

In some aspects, the filter element includes the second part secured thereto; the second part extending through an opening in the housing when the filter element is operably mounted within the housing interior volume.

In some aspects, the filter element includes a frame surrounding filter media, and an ear construction extending from the frame; the second part projecting from the ear construction.

In some aspects, the filter element has a longitudinal axis extending therethrough; and the second part projects from the ear construction parallel to the longitudinal axis.

In some aspects, the filter element includes z-media forming opposite flow faces; the longitudinal axis passes through both flow faces; and the second part includes a pair of tabs located laterally spaced from the z-media and projecting in a direction away from the flow faces and the z-media.

In some aspects, the ear construction includes a pair of ears each extending from the frame.

In some aspects, the first part of the two-part catch assembly is a latch, and the second part is a hook.

In some aspects, the first part the two-part catch assembly is an over-center latch, and the second part is a hook.

In some aspects, the filter element includes a frame surrounding filter media; a longitudinal axis extending therethrough; and an ear construction extending from the frame; the ear construction including a projection arrangement therefrom and in a direction parallel to the longitudinal axis.

In some aspects, the projection arrangement includes one or more tabs.

In some aspects, the filter element includes z-media forming opposite flow faces; the longitudinal axis passes through both flow faces; and the one or more tabs are located laterally spaced from the z-media and projecting in a direction away from the flow faces and the z-media.

In some aspects, the tabs are positioned such that when the filter element is operably mounted within the housing interior volume, the tabs push the second part radially outward from the remaining portion of the housing.

In some aspects: (a) the filter element includes a media pack comprising filter media and having first and second, opposite, flow faces; (i) the first flow end comprising an inlet flow face; (ii) the second flow end comprising an outlet flow face; and (iii) the media pack being configured to filter air flowing into the inlet flow face prior to the air exiting the outlet flow face; (b) a frame mounted to the media pack; and (c) a seal arrangement positioned on the frame; (i) the seal arrangement comprising a seal member oriented to releasably, sealingly engage the housing.

In some aspects, the seal member is radially directed and is oriented to form a radial seal with the housing.

In some aspects: (a) the filter media includes fluted media with inlet flutes and outlet flutes; (i) the inlet flutes being open at the inlet flow face and blocked downstream of the inlet flow face; and (ii) the outlet flutes being open at the outlet flow face and blocked upstream of the outlet flow face.

In some aspects, the filter element includes an ear construction extending from the frame; the ear construction having a projection arrangement therefrom.

In some aspects, the filter element is racetrack-shaped having opposite curved ends joined by straight sides.

In one or more example embodiments, the first part of the two-part mating catch assembly includes a latch member; the second part of the two-part mating catch assembly includes a radially inwardly deflectable flange with a flange tab having a through aperture; and a fixed housing tab having a through aperture; and the filter element includes radially extending plugs or ribs that are positioned to push the radially inwardly deflectable flange radially outwardly until the through aperture of the flange tab is in axial alignment with the through aperture of the fixed housing tab to allow for receipt of the latch member through the aligned through apertures.

In some example embodiments, the first part of the two-part mating catch assembly includes an over-center latch member; the second part of the two-part mating catch assembly includes a pivoting member including an arm pivoting about a hinge point on the housing; the arm having a finger and a catch; and the filter element includes radially extending plugs or ribs that are positioned to push down on the pivoting member, to rotate the arm from an interfering position to a non-interfering position and allow engagement by the over-center latch with the catch on the finger.

In another aspect, a method of installing a filter element in a housing of an air cleaner is provided. The method includes (a) orienting a filter element into the interior volume of a housing through an access opening in the housing; (b) orienting a cover over the access opening; and (c) releasably mating a first part and second part of a two-part mating catch assembly to secure the cover to the housing; (i) a first part of a two-part mating catch assembly being secured to the cover; and (ii) a second part of the two-part mating catch assembly being on one of the housing and the filter element.

In some aspects: (a) the second part is integral with the housing; and (b) the step of orienting a filter element includes using the filter element to push the second part radially outwardly from a remaining portion of the housing.

In some aspects: (a) the filter element includes the second part secured thereto; and (b) the step of orienting a filter element includes extending the second part through an opening in the housing when the filter element is operably mounted within the housing interior volume.

In a further aspect, a filter element for use in a housing of an air cleaner is provided; the element comprising a media pack comprising filter media; and an interference engagement member.

In another aspect, a filter element for use in a housing of an air cleaner is provided; the element comprising a media pack comprising filter media; and an interference engagement member sized and adapted to engage an interference member and move the interference member to a non-interfering position, wherein the interference member prevents the housing being mated with a cover unless the filter element is installed therein.

In another aspect, a filter element for use in a housing of an air cleaner is provided; the element comprising a media pack comprising filter media; and a projection arrangement sized and adapted to engage a catch assembly integral with the housing of the air cleaner.

The element can include a frame mounted to the media pack.

The element may further comprise a seal arrangement.

The element may further comprise a frame mounted to the media pack and a seal arrangement positioned on the frame.

The element can include an ear construction.

The projection arrangement may extend from the ear construction parallel to a longitudinal axis extending through the element.

The media pack can have first and second, opposite, flow faces; the first flow end comprising an inlet flow face; the second flow end comprising an outlet flow face; and the media pack being configured to filter air flowing into the inlet flow face and out through the outlet flow face.

A longitudinal axis passes through both the inlet and outlet flow faces.

The projection arrangement can include a pair of tabs located laterally spaced from the media pack and projecting in a direction away from the flow faces.

The ear construction may include a pair of ears each extending laterally from the frame; and there is at least one tab extending from each of the ears.

The seal arrangement can comprise a seal member oriented to releasably, sealingly engage the housing.

The seal member may be radially directed and is oriented to form a radial seal with the housing.

The seal member can be an outwardly directed radial seal.

The filter element can be racetrack-shaped having opposite curved ends joined by straight sides.

The filter element can further comprise a face grid over one of the flow faces.

The projection arrangement may extend at least 10 mm and no greater than 100 mm from the ear construction.

The projection arrangement may extend at least 15 mm and no greater than 80 mm from the ear construction.

In some example embodiments, the interference engagement member comprises one or more plugs extending radially outwardly from a sidewall of the filter element.

In some example embodiments, the interference engagement member comprises one or more ribs extending radially outwardly from a sidewall of the filter element.

It is noted that not all these specific features described herein need to be incorporated in an arrangement for the arrangement to have some selected advantage according to the present disclosure.

BRIEF DESCRIPTION OF THE DRAWINGS

FIG. 5 is a schematic, cross-sectional view of an example of a darted fluted;

FIG. 6 is a schematic, perspective view of a coiled media construction comprising a coiled sheet of single facer media material;

FIG. 7 is a schematic, perspective view of a stacked media construction;

FIG. 50 is a perspective view of another embodiment of an air cleaner assembly, during a step of installation of the element;

FIG. 51 is a perspective view of the air cleaner assembly of FIG. 50 during a further step of installation of the element;

FIG. 52 is a perspective view of the air cleaner assembly of FIG. 50 during a further step of installation of the element;

FIG. 56 is a perspective view of another embodiment of an air cleaner assembly, during a step of installation of the element;

FIG. 57 is a perspective view of the air cleaner assembly of FIG. 56 during a further step of installation of the element;

FIG. 58 is a perspective view of the air cleaner assembly of FIG. 56 during a further step of installation of the element;

FIG. 65 is a schematic, cross-sectional view of the housing and element of FIG. 61 during one step of assembly.

DETAILED DESCRIPTION

Figure 1:
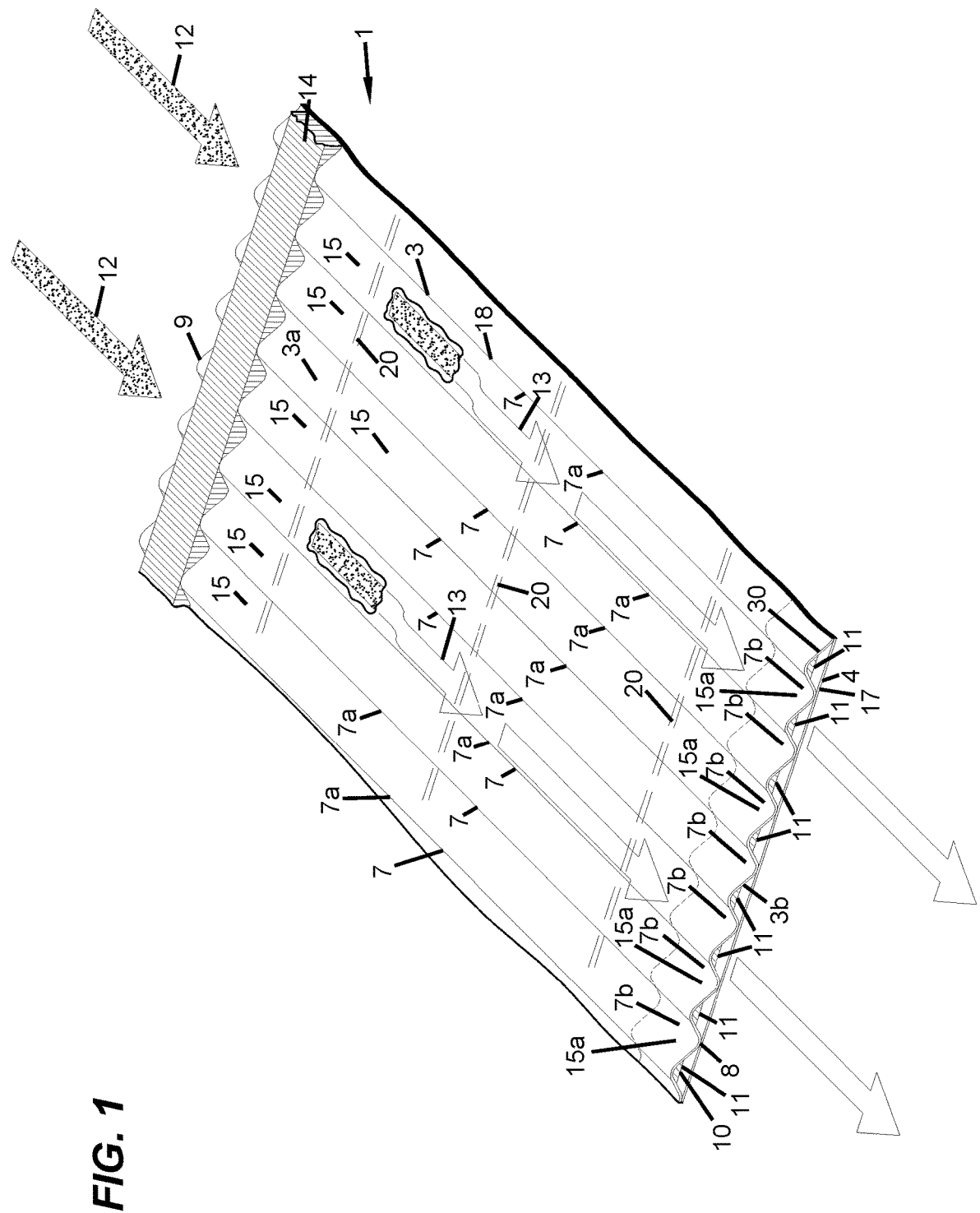
FIG. 1 is a fragmentary, schematic, perspective view of a single facer strip of z-filter media comprising a flutes sheet secured to a facing sheet.

I. Z-Filter Media Configurations, Generally.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is shown herein at FIG. 7 and described in FIG. 11 of 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, published Sep. 30, 2004 as WO 2004/082795, incorporated herein by reference. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending there across.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

In general, the media pack includes appropriate seal material therein, to ensure there is no unfiltered flow of air through the media pack, in extension from front flow face (an inlet flow face) completely through and outwardly from opposite oval face (outlet flow face).

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006, incorporated herein by reference; also comprising flutes extending between opposite flow faces, with a seal arrangement to prevent flow of unfiltered air through the media pack.

In FIG. 1 herein, an example of media 1 useable in z-filter media is shown. The media 1 is formed from a fluted (corrugated) sheet 3 and a facing sheet 4. Herein, a strip of media comprising fluted sheet secured to facing sheet will sometimes be referred to as a single facer strip, or by similar terms.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction; an equal number of ridges and troughs are necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

In the example shown, adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

In the example shown, adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

In more general terms, z-filter media comprises fluted filter media secured to facing filter media, and configured in a media pack of flutes extending between first and second opposite flow faces. A sealant arrangement is provided within the media pack, to ensure that air entering flutes at a first upstream edge cannot exit the media pack from a downstream edge, without filtering passage through the media.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media especially those which use straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Still referring to FIG. 1, at 20 tack beads are shown positioned between the corrugated sheet 3 and facing sheet 4, securing the two together. The tack beads can be for example, discontinuous lines of adhesive. The tack beads can also be points in which the media sheets are welded together.

From the above, it will be apparent that the corrugated sheet 3 is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
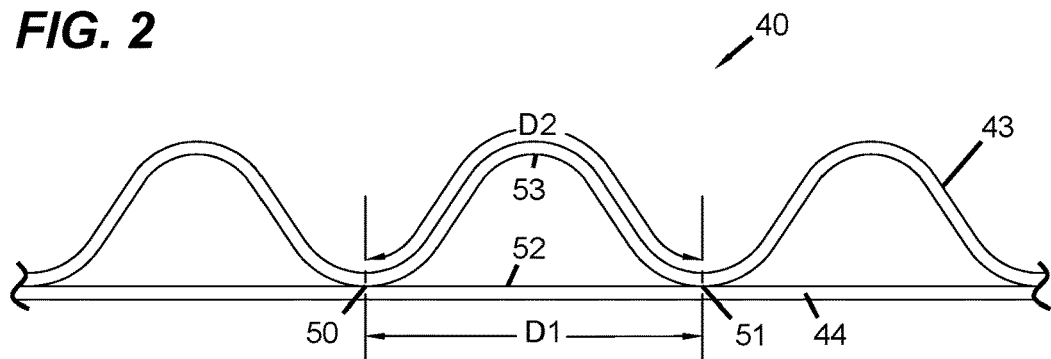
FIG. 2 is an enlarged, schematic, fragmentary view of a single facer sheet comprising fluted media secured to the facing media.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arch-shaped media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

DCI A Flute: Flute/flat =1.52:1; The Radii (R) are as follows:
R1000 = .0675 inch (1.715 mm);
R1001 = .0581 inch (1.476 mm);
R1002 = .0575 inch (1.461 mm);
R1003 = .0681 inch (1.730 mm);

DCI B Flute: Flute/flat = 1.32:1; The Radii (R) are as follows:
R1004 = .0600 inch (1.524 mm);
R1005 = .0520 inch (1.321 mm);
R1006 = .0500 inch (1.270 mm);
R1007 = .0620 inch (1.575 mm);

Std. E Flute: Flute/flat = 1.24:1; The Radii (R) are as follows:
R1008 = .0200 inch (.508 mm);
R1009 = .0300 inch (.762 mm);
R1010 = .0100 inch (.254 mm);
R1011 = .0400 inch (1.016 mm);

Std. X Flute: Flute/flat = 1.29:1; The Radii (R) are as follows:
R1012 = .0250 inch (.635 mm);
R1013 = .0150 inch (.381 mm);

Std. B Flute: Flute/flat = 1.29:1; The Radii (R) are as follows:
R1014 = .0410 inch (1.041 mm);
R1015 = .0310 inch (.7874 mm);
R1016 = .0310 inch (.7874 mm);

TABLE A-continued (Flute definitions for FIG. 3)

Std. C Flute: Flute/flat = 1.46:1; The Radii (R) are as follows:
R1017 = .0720 inch (1.829 mm);
R1018 = .0620 inch (1.575 mm);
Std. A Flute: Flute/flat = 1.53:1; The Radii (R) are as follows:
R1019 = .0720 inch (1.829 mm);
R1020 = .0620 inch (1.575 mm).

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and Ser. No. 12/012,785, filed Feb. 4, 2008 can be used, with air cleaner features as characterized herein below. The complete disclosures of each of U.S. Ser. Nos. 12/215,718 and 12/012,785 are incorporated herein by reference.

Figure 3A:
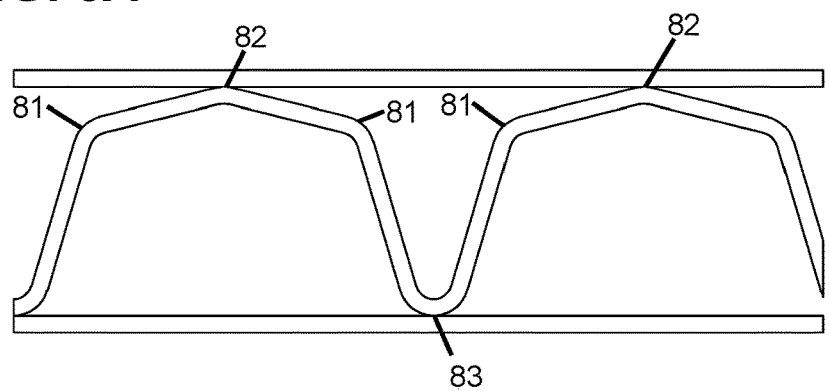
FIG. 3A is schematic, fragmentary, cross-sectional view of a further fluted media configuration in a single facer media pack.
Figure 3B:
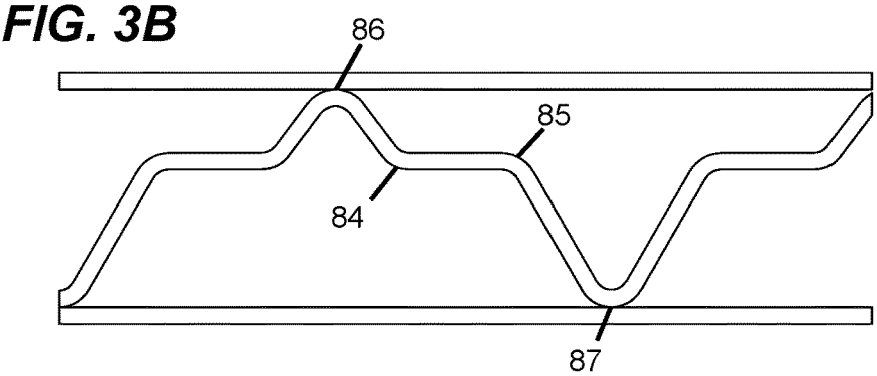
FIG. 3B is a schematic, fragmentary, cross-sectional view of a still further alternate flute definition.
Figure 3C:
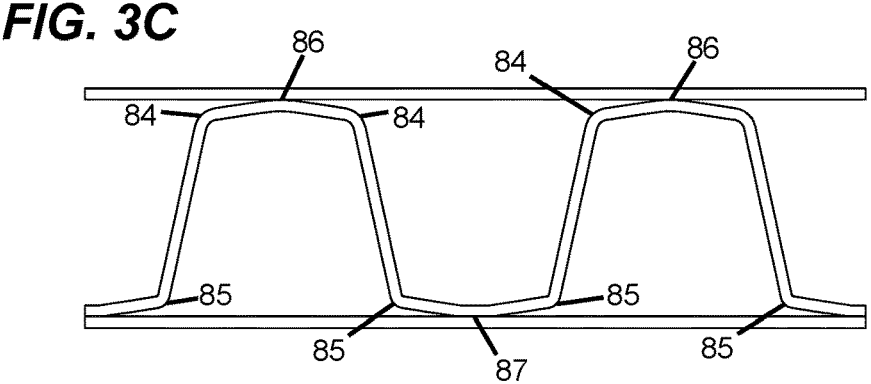
FIG. 3C is a schematic, fragmentary, cross-sectional view of yet another flute definition for a media pack.
Figure 3:
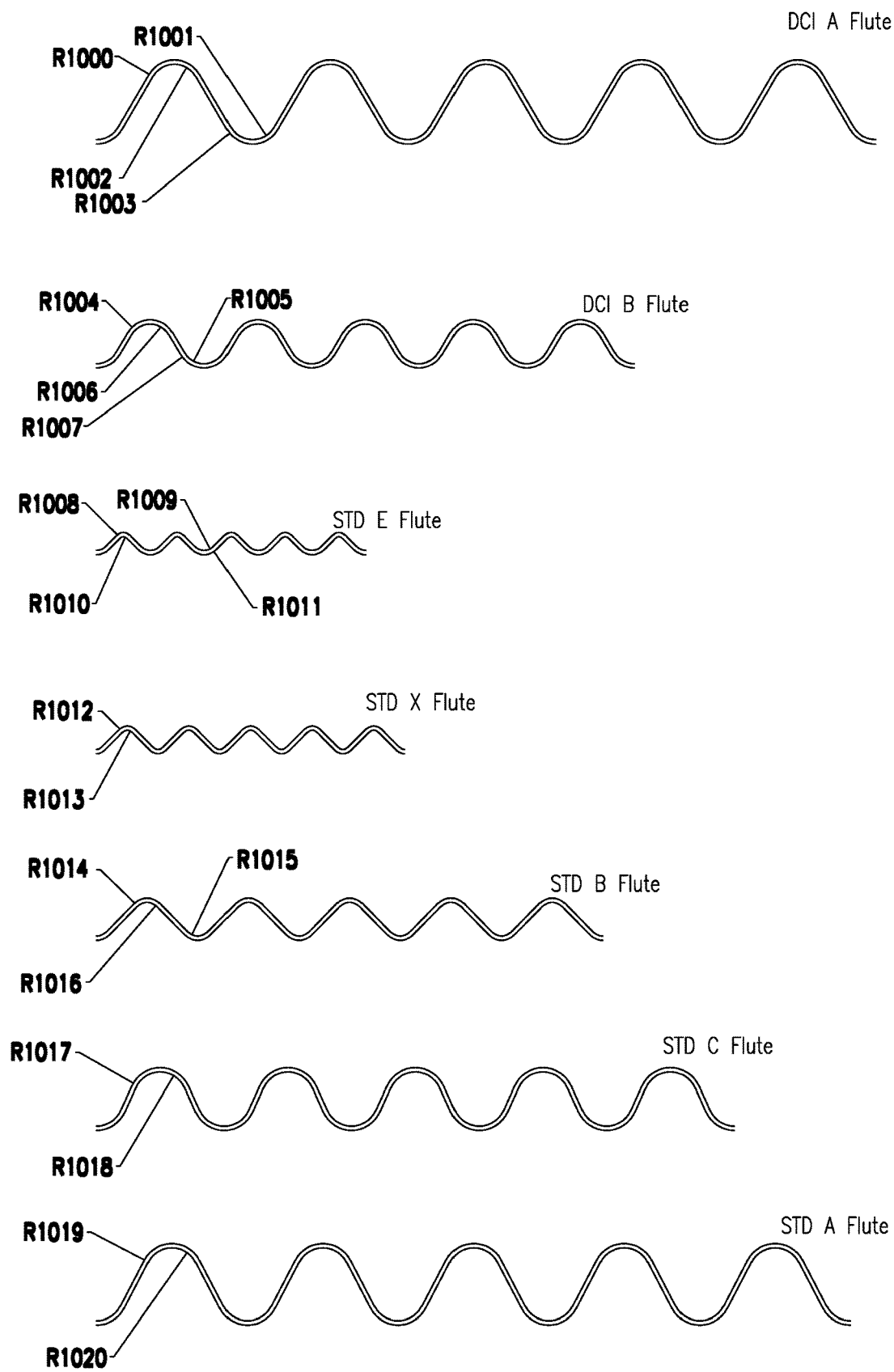
FIG. 3 is a schematic view of various selected flute shapes.

In FIGS. 3A-3C, cross-sectional views of exemplary portions of filtration media are shown wherein the fluted sheet has one or more non-peak ridge extending along at least a portion of the flute length. FIG. 3A shows a fluted sheet having one non-peak ridge 81 provided between adjacent peaks 82, 83, and FIGS. 3B and 3C show fluted sheets having two non-peak ridges 84, 85 between adjacent peaks 86, 87. The non-peak ridges 81, 84, 85 can extend along the flute length any amount including, for example, an amount of 20% of the flute length to 100% of the flute length. In addition, the fluted sheet can be provided without non-peak ridges 81, 84, 85 between all adjacent peaks 82, 83, 86, 87, and can be provided with differing numbers of non-peak ridges 81, 84, 85 between adjacent peaks 82, 83, 86, 87 (e.g., alternating zero, one, or two non-peak ridges in any arrangement). The presence of non-peak ridges 81, 84, 85 can help provide more media available for filtration in a given volume, and can help reduce stress on the fluted sheet thereby allowing for a smaller radius at the peaks and therefore reduced media masking. Such media can be used in arrangements according to the present disclosure.

II. Manufacture of Coiled Media Configurations Using Fluted Media, Generally.

Figure 4:
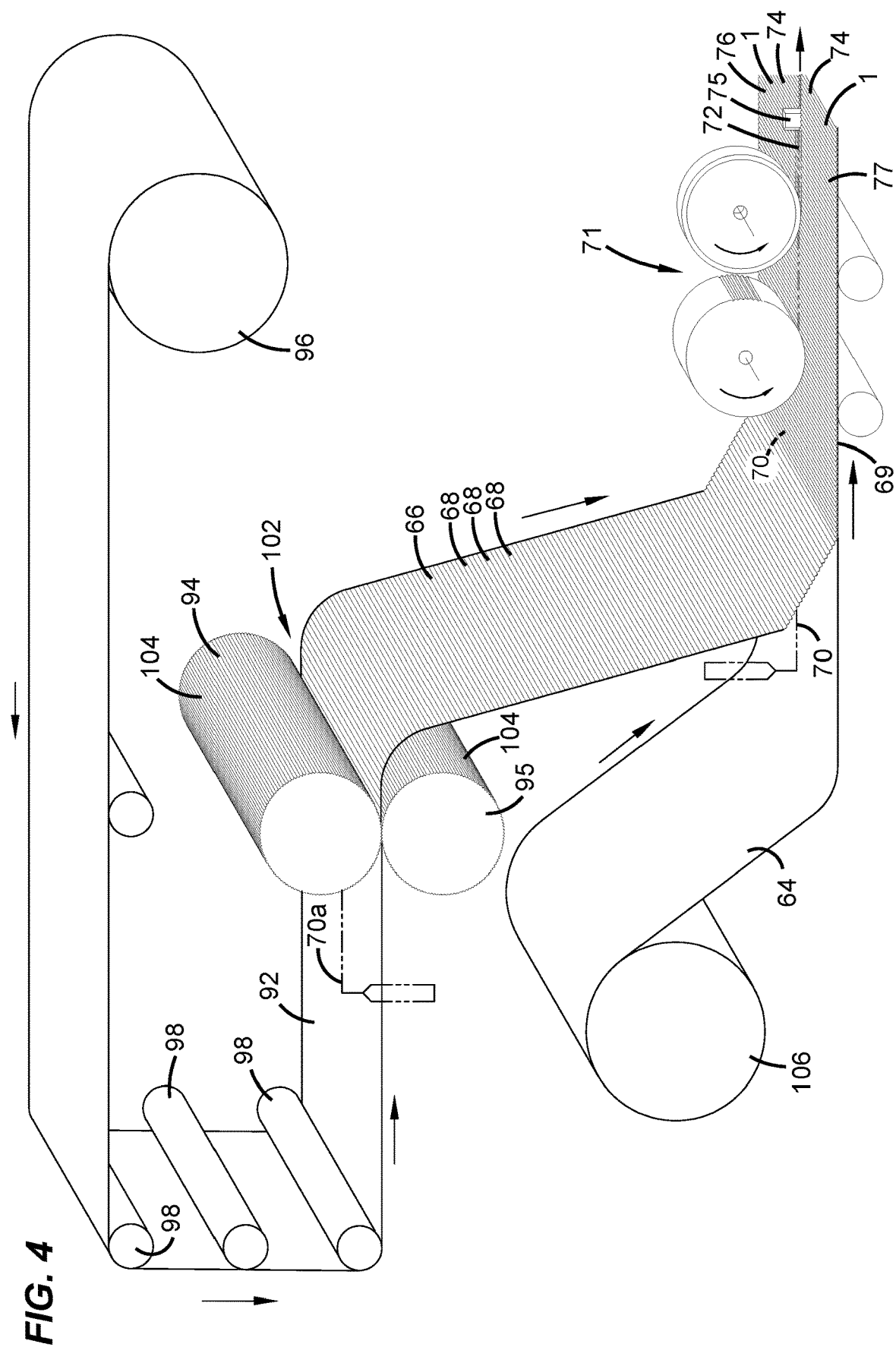
FIG. 4 is a schematic view of a process for making single facer media for use in a media pack according to the present disclosure.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 14, FIG. 1.

The term "single facer bead" references a sealant bead positioned between layers of a single facer; i.e., between the fluted sheet and facing sheet.

An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, into single facer strips for stacking, as described below in connection with FIG. 7.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown are possible.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, and 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121*a*, 121*b*, is directed toward the other.

In FIG. 5, creases 121*c*, 121*d*, will generally be referred to herein as "lower, outwardly directed" creases. The term "lower" in this context refers to the fact that the creases 121*c*, 121*d* are not located on the top as are creases 121*a*, 121*b*, in the orientation of FIG. 5. The term "outwardly directed" is meant to indicate that the fold lines of the creases 121*c*, 121*d* are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and incorporated herein by reference.

Alternate approaches to darting the fluted ends closed are possible. Such approaches can involve, for example, darting which is not centered in each flute, and rolling or folding over the various flutes. In general, darting involves folding or otherwise manipulating media adjacent to fluted end, to accomplish a compressed, closed state.

Techniques described herein are particularly well adapted for use in media packs that result from a step of coiling a single sheet comprising a corrugated sheet/facing sheet combination, i.e., a "single facer" strip.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Reference numeral 130, FIG. 6, generally indicates a coiled media pack 130. The coiled media pack 130 comprises a single strip 130*a* of single facer material comprising a fluted sheet secured to facing sheet coiled around a center, which can include a core, or which can be careless as illustrated. Typically, the coiling is with facing sheeting directed outwardly. As previously described, in general a single facer bead and winding bead would be used, to provide flute seals within the media.

The particular coiled media pack 130 depicted comprises an oval media pack 131. It is noted that the principles described herein, however, can be applied starting with the media pack having a circular configuration.

In FIG. 7, schematically there is shown a step of forming a stacked z-filter media pack from strips of z-filter media, each strip being a fluted sheet secured to a facing sheet. Referring to FIG. 7, single facer strip 200 is being shown added to a stack 201 of strips 202 analogous to strip 200. Strip 200 can be cut from either of strips 76, 77, FIG. 4. At 205, FIG. 7, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209*a*, 209*b*. Inlet and outlet flutes of the corrugated sheet/facing sheet combination comprising each strip 200, 202 generally extend between the front and rear edges 207, 208, and parallel to side edges 209*a*, 209*b*.

Still referring to FIG. 7, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with certain of the remaining figures. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that a stacked arrangement shown in U.S. Ser. No. 10/731,504, is a slanted stacked arrangement.

A variety of filter media having upstream and downstream flow faces are contemplated and can be used in various implementations. Among those include a form of pleated media with flutes having defined peaks to reduce masking, such as those described in patent publication US 2010/0078379, incorporated herein by reference.

Figure 8:
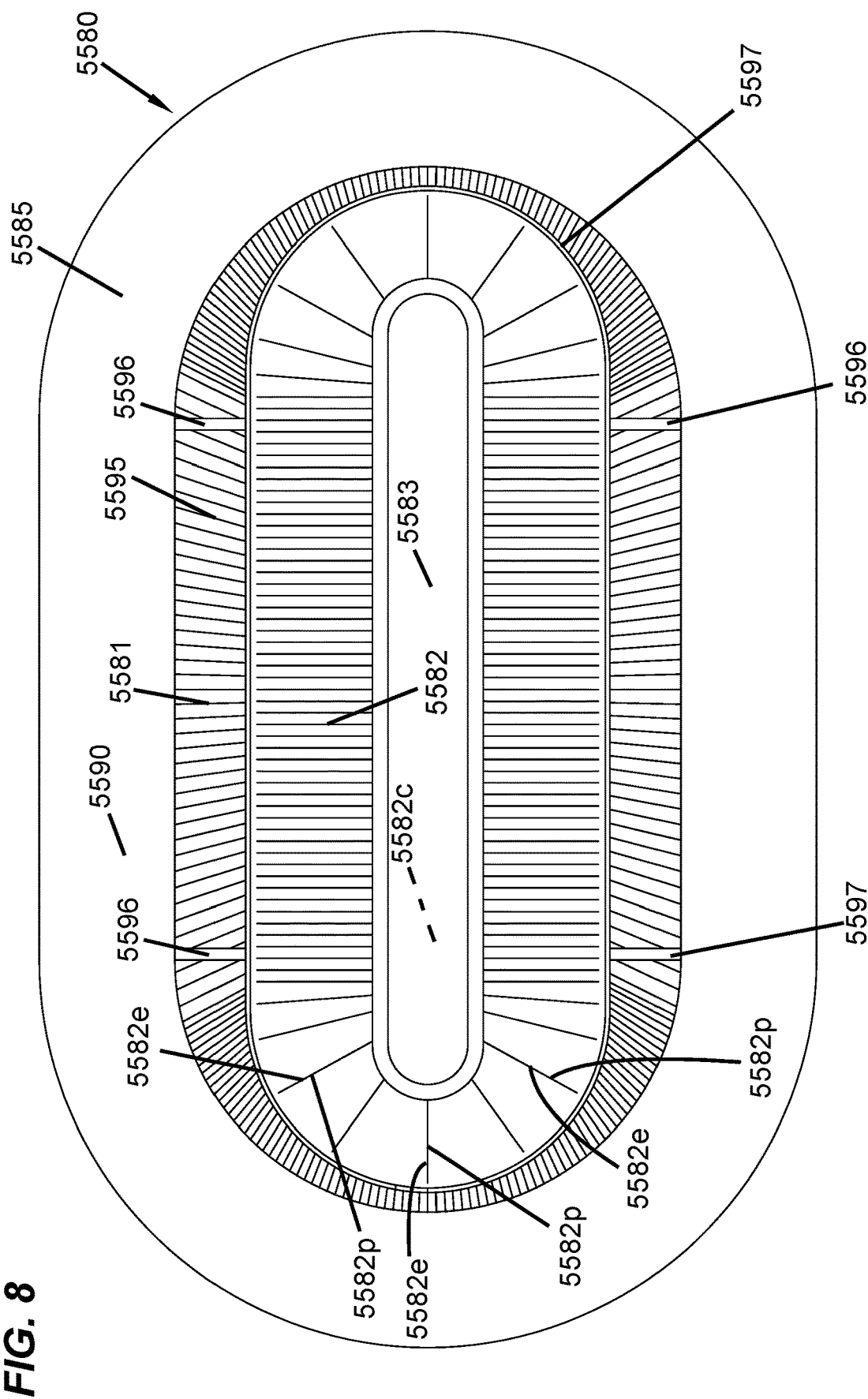
FIG. 8 is a schematic flow end view of a filter media pack using an alternate media to the media of FIG. 1, and alternately usable in selected filter cartridges in accord with the present disclosure.
Figure 9:
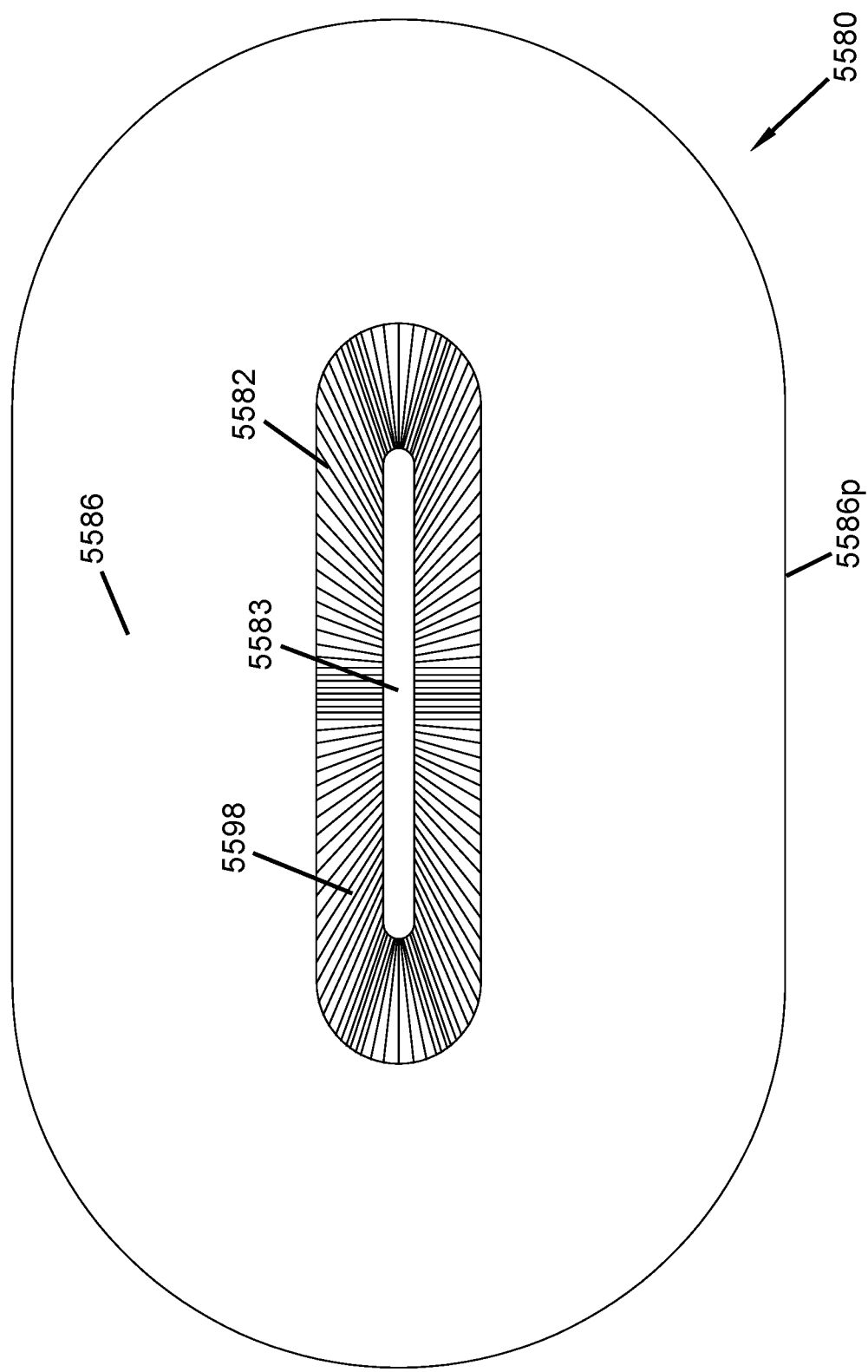
FIG. 9 is a schematic opposite flow end view to the view of FIG. 8.
Figure 10:
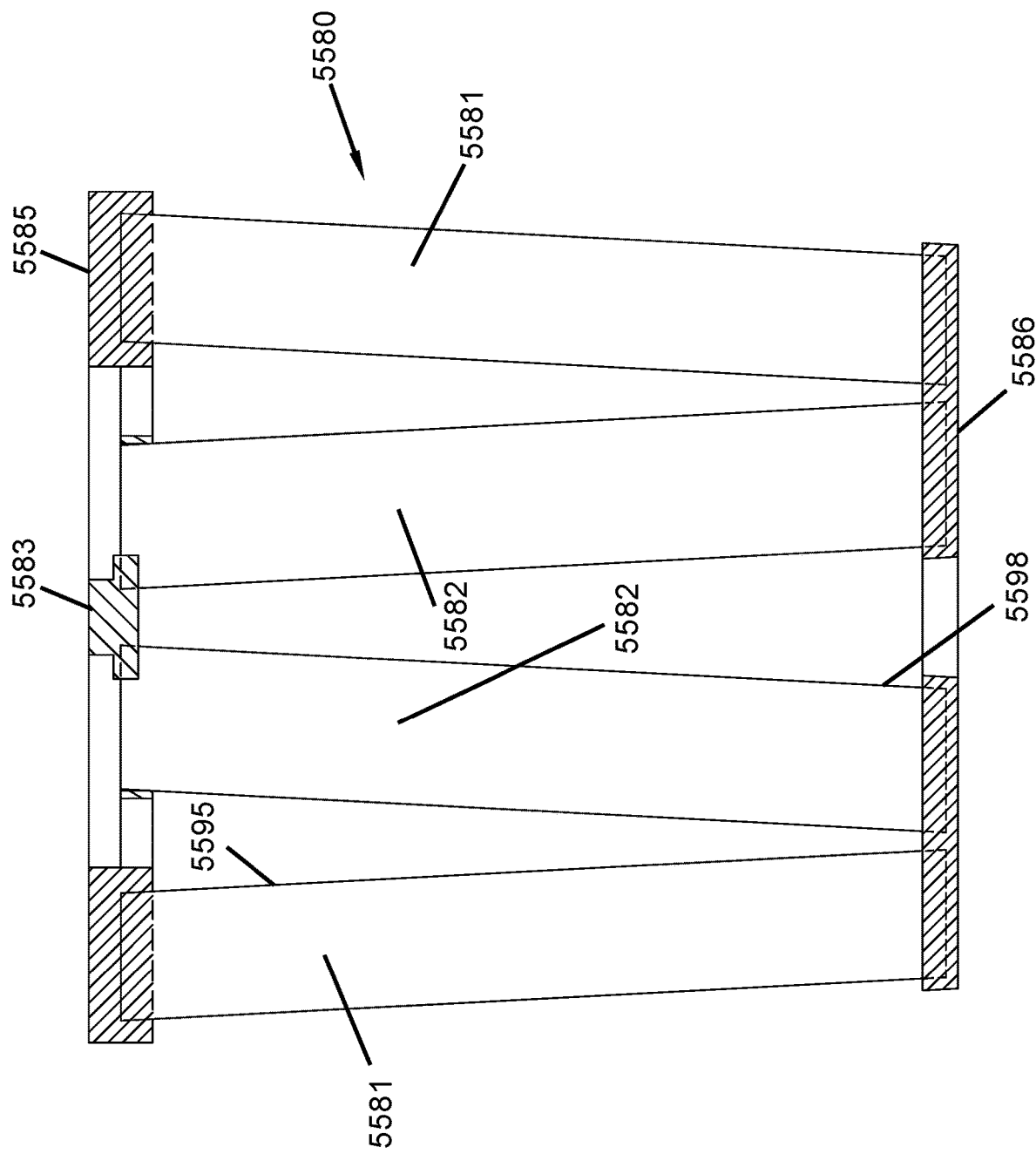
FIG. 10 is a schematic cross-sectional view of the media pack of FIGS. 8 and 9.

Alternate types of media arrangements or packs that involve flutes between opposite ends extending between can be used with selected principles according to the present disclosure. An example of such alternate media arrangement or pack is depicted in FIGS. 8-10. The media of FIGS. 8-10 is analogous to one depicted and described in DE 20 2008 017 059 U1; and as can sometimes found in arrangements available under the mark "IQORON" from Mann & Hummel.

Referring to FIG. 8, the media or media pack is indicated generally at 5580. The media or media pack 5580 comprises a first outer pleated (ridged) media loop 5581 and a second, inner, pleated (ridged) media loop 5582, each with pleat tips (or ridges) extending between opposite flow ends. The view of FIG. 8 is toward a media pack (flow) end 5585. The end 5585 depicted, can be an inlet (flow) end or an outlet (flow) end, depending on selected flow direction. For many arrangements using principles characterized having the media pack 5580 would be configured in a filter cartridge such that end 5585 is an inlet flow end.

Still referring to FIG. 8, the outer pleated (ridged) media loop 5581 is configured in an oval shape, though alternatives are possible. At 5590, a pleat end closure, for example molded in place, is depicted closing ends of the pleats or ridges 5581 at media pack end 5585.

Pleats, or ridges 5582 (and the related pleat tips) are positioned surrounded by and spaced from loop 5581, and thus pleated media loop 5582 is also depicted in a somewhat oval configuration. In this instance, ends 5582e of individual pleats or ridges 5582p in a loop 5582 are sealed closed. Also, loop 5582 surrounds the center 5582c that is closed by a center strip 5583 of material, typically molded-in-place.

During filtering, when end 5585 is an inlet flow end, air enters gap 5595 between the two loops of media 5581, 5582. The air then flows either through loop 5581 or loop 5582, as it moves through the media pack 5580, with filtering.

In the example depicted, loop 5581 is configured slanting inwardly toward loop 5582, in extension away from end 5585. Also spacers 5596 are shown supporting a centering ring 5597 that surrounds an end of the loop 5582, for structural integrity.

In FIG. 9, an end 5586 of the cartridge 5580, opposite end 5585 is viewable. Here, an interior of loop 5582 can be seen, surrounding an open gas flow region 5598. When air is directed through cartridge 5580 in a general direction toward end 5586 and away from end 5585, the portion of the air that passes through loop 5582 will enter central region 5598 and exit therefrom at end 5586. Of course air that has entered media loop 5581, FIG. 8 during filtering would generally pass around (over) an outer perimeter 5586p of end 5586.

In FIG. 10 a schematic cross sectional view of cartridge 5580 is provided. Selected identified and described features are indicated by like reference numerals It will be understood from a review of FIGS. 8-10, the above description, that the cartridge 5580 described, is generally a cartridge which has media tips extending in a longitudinal direction between opposite flow ends 5585, 5586.

In the arrangement of FIGS. 8-10, the media pack 5580 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

Herein, in FIGS. 11-18, some schematic, fragmentary, cross-sectional views are provided of still further alternate variations of media types that can be used in selected applications of the principles characterized herein. Certain examples are described in U.S. Ser. No. 62/077,749, filed Nov. 10, 2014 and owned by the Assignee of the present disclosure, Donaldson Company, Inc. In general, each of the arrangements of FIGS. 12-18 represents a media type that can be stacked or coiled into an arrangement that has opposite inlet and outlet flow ends (or faces), with straight through flow.

Figure 11:
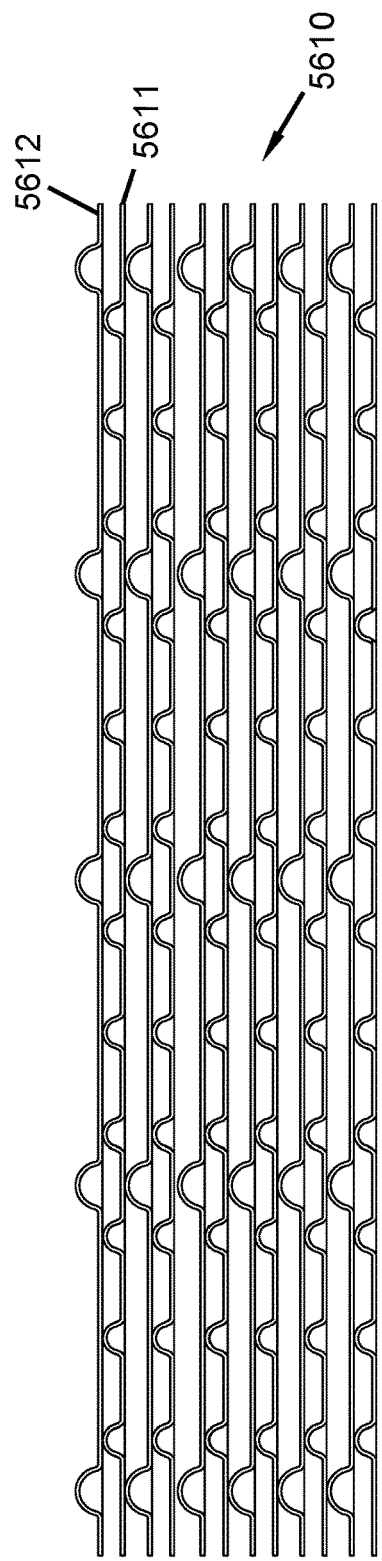
FIG. 11 is a schematic, fragmentary, cross-sectional view of a further alternate media type usable in a media pack of a filter cartridge having features in accord with the present disclosure.

In FIG. 11, an example media arrangement 5601 from U.S. Ser. No. 62/077,749 (2658) is depicted, in which an embossed sheet 5602 is secured to a non-embossed sheet 5603, then stacked and coiled into a media pack, with seals along opposite edges of the type previously described for FIG. 1 herein.

Figure 12:
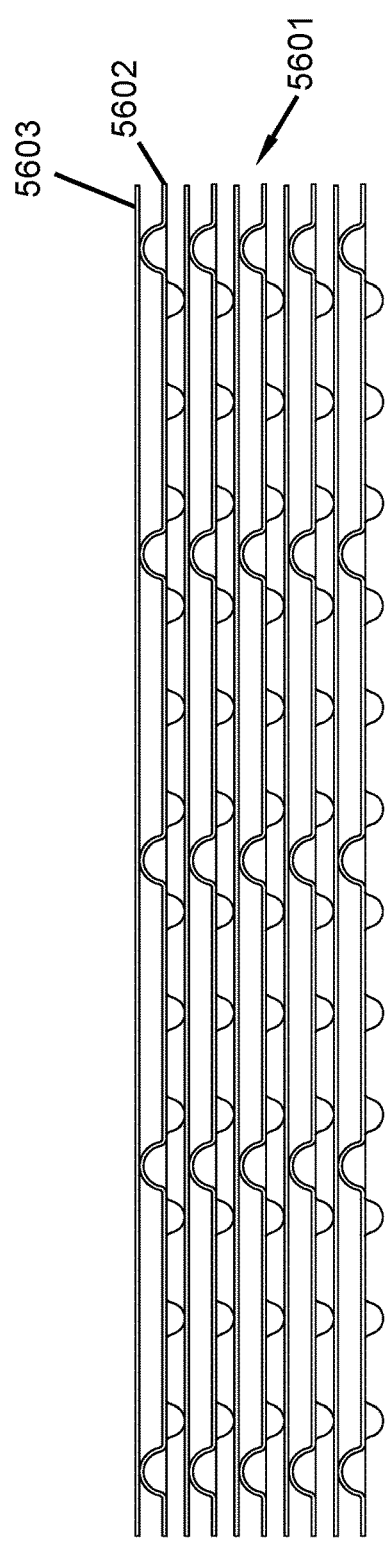
FIG. 12 is a schematic, fragmentary cross-sectional view, of a first variation of the media type of FIG. 11.

In FIG. 12, an alternate example media pack 5610 from U.S. Ser. No. 62/077,749 is depicted, in which a first embossed sheet 5611 is secured to a second embossed sheet 5612 and then formed into a stacked or coiled media pack arrangement, having edge seals generally in accord with FIG. 1 herein.

Figure 13:
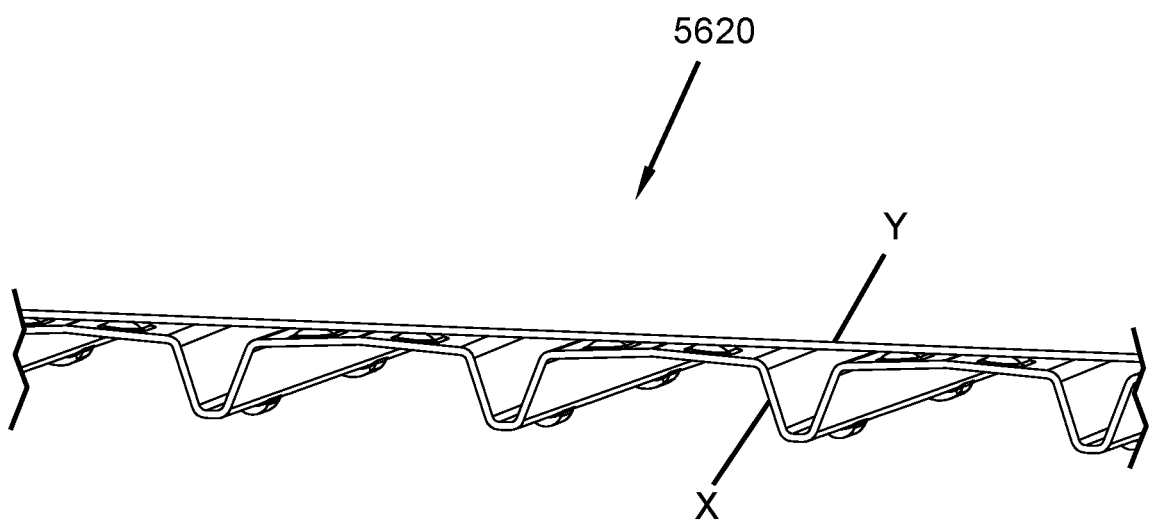
FIG. 13 is a schematic fragmentary depiction of another usable fluted sheet/facing sheet combination in accord with the present disclosure.
Figure 14:
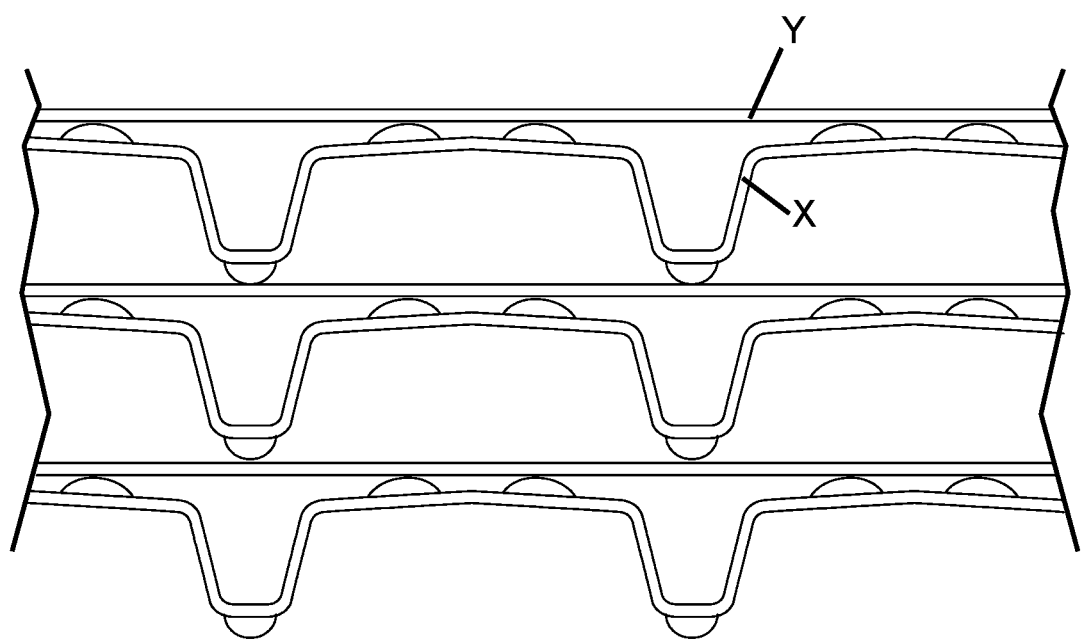
FIG. 14 is a fragmentary second schematic view of the type of media in FIG. 13 shown in a media pack.
Figure 15:
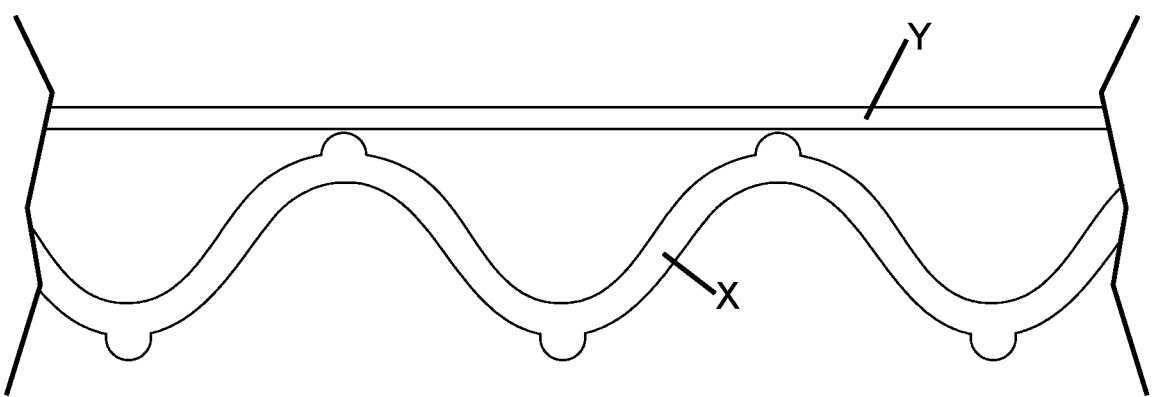
FIG. 15 is a schematic, fragmentary, plan view of still another media variation usable in arrangements according to the present disclosure.

In FIG. 13-15, a third example media arrangement 5620 from U.S. Ser. No. 62/077,749 is depicted. Edge seals can be conducted in either the upstream end or the downstream end, or in some instances both. Especially when the media is likely to encounter chemical material during filtering, it may be desirable to avoid a typical adhesive or sealant.

In FIG. 13, a cross-section is depicted in which the fluted sheet X has various embossments on it for engagement with the facing sheet Y. Again these can be separate, or sections of the same media sheet.

In FIG. 14, a schematic depiction of such an arrangement between the fluted sheet X and facing sheet Y is also shown.

In FIG. 15, a still further variation of such a principle is shown between a fluted sheet X and a facing sheet Y. These are meant to help understand how a wide variety of approaches are possible.

Figure 16:
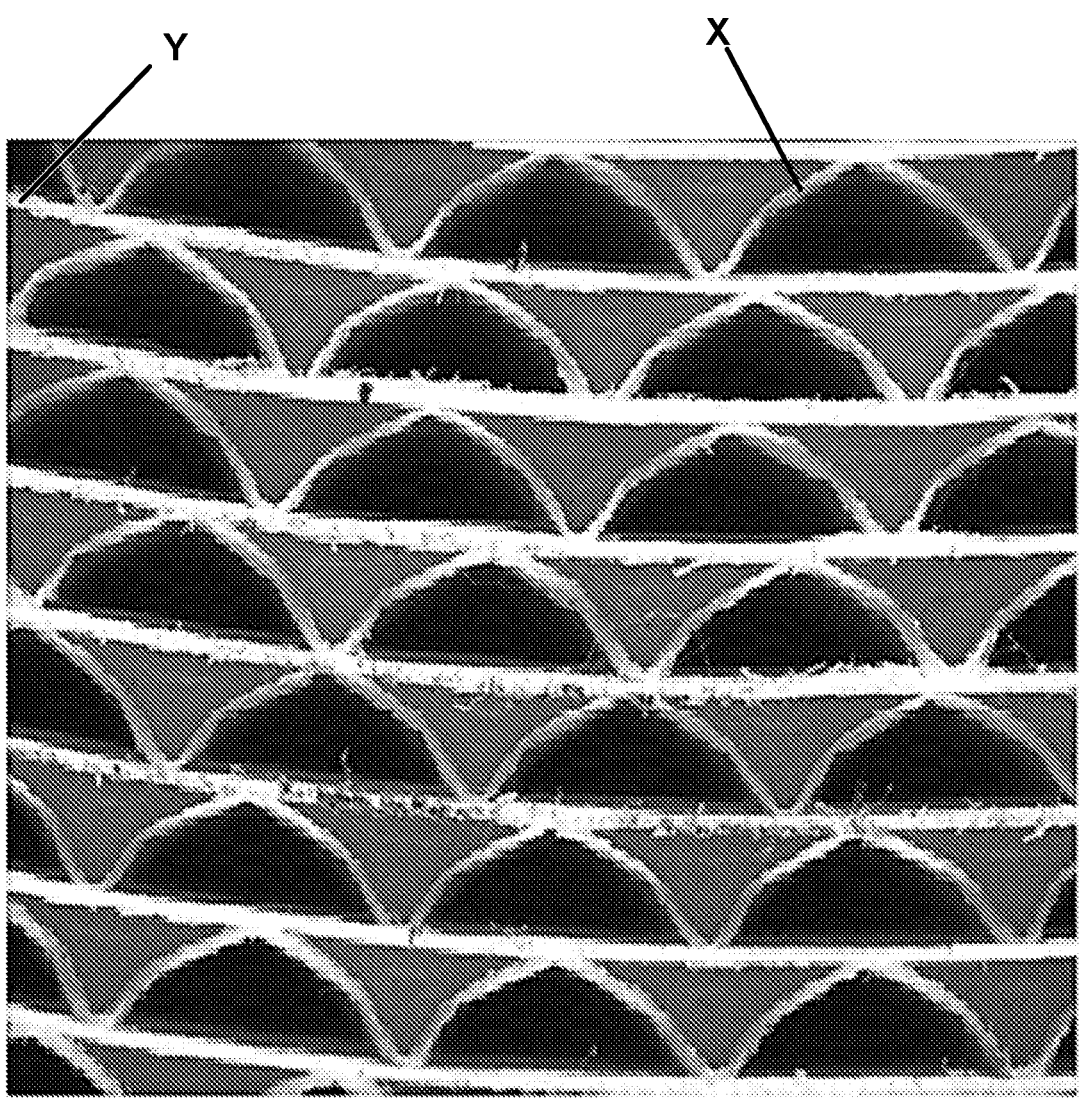
FIG. 16 is a schematic view of another variation of usable media in accord with the present disclosure.
Figure 17:
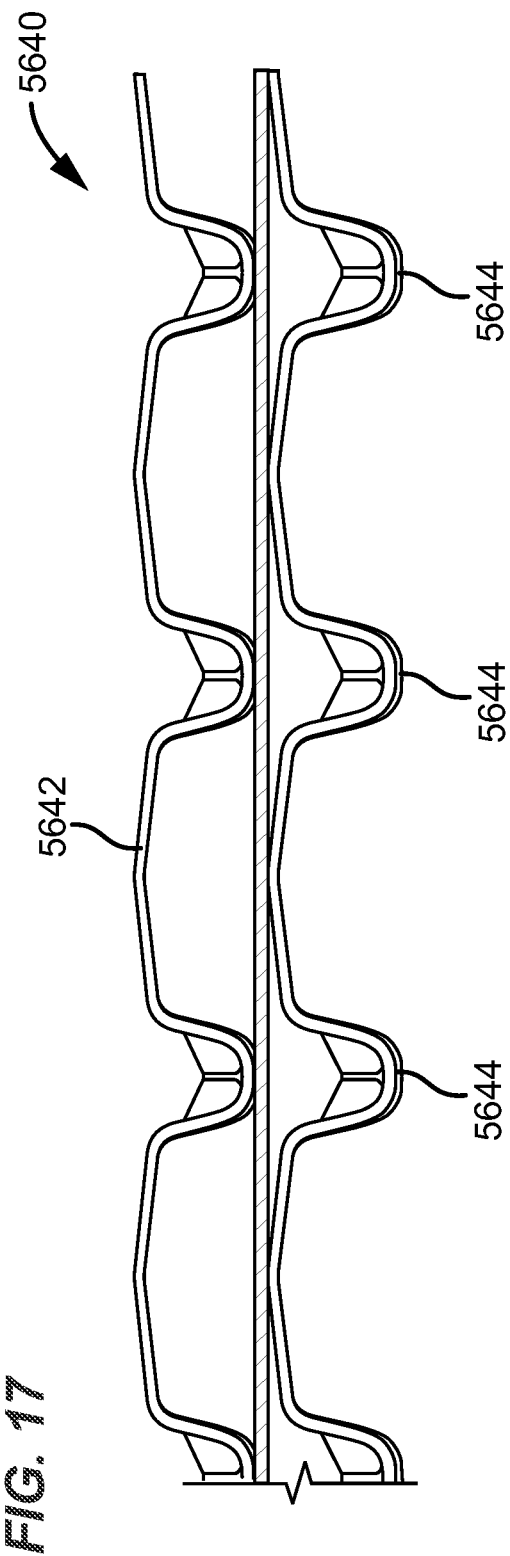
FIG. 17 is a schematic depiction of another usable fluted sheet/facing sheet combination in accord with the present disclosure.
Figure 18:
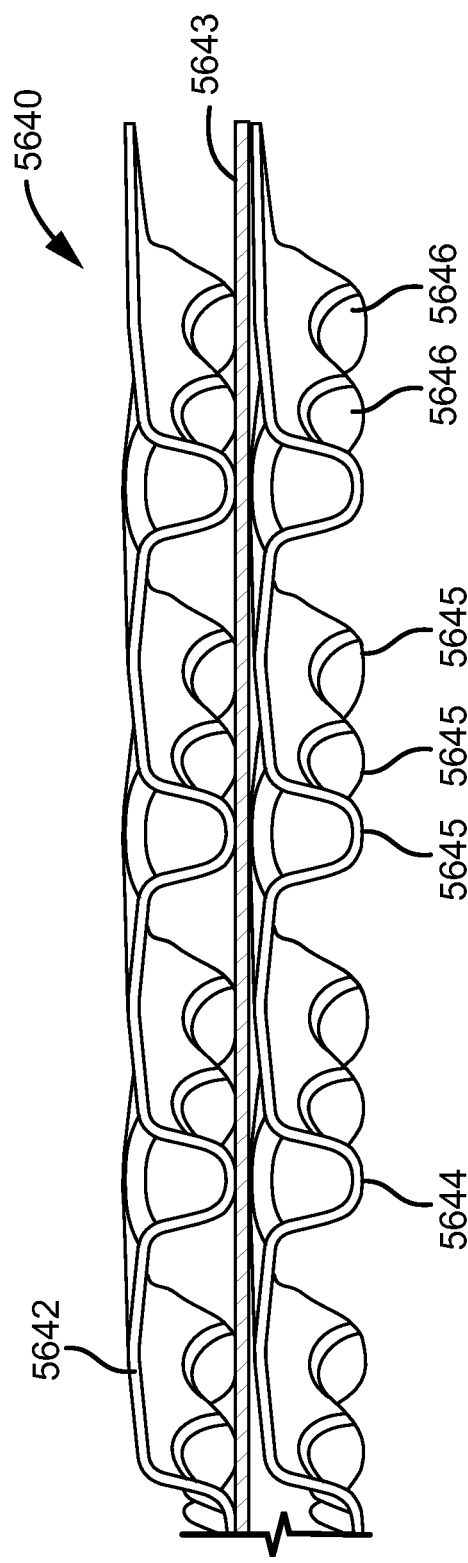
FIG. 18 is a perspective view of a portion of the usable fluted sheet/facing sheet combination depicted in FIG. 17.

In FIG. 16-18, still another possible variation in fluted sheet X and facing sheet Y is shown.

In FIGS. 16-18, an example media arrangement 5640 is depicted, in which a fluted sheet 5642 is secured to a facing sheet 5643. The facing sheet 5643 may be a flat sheet. The media arrangement 5640 can then be stacked or coiled into a media pack, with seals along opposite edges of the type previously described for FIG. 1 herein. In the embodiment shown, the flutes 5644 of fluted sheet 5642 have an undulating ridgeline including a series of peaks 5645 and saddles 5646. The peaks 5645 of adjacent flutes 5644 can be either aligned as shown in FIGS. 17 and 18 or offset. Further the peak height and/or density can increase, decrease, or remain constant along the length of the flutes 5644. The ratio of the peak flute height to saddle flute height can vary from about 1.5, typically from 1.1 to about 1.

It is noted that there is no specific requirement that the same media be used for the fluted sheet section and the facing sheet section. A different media can be desirable in each, to obtain different effects. For example, one may be a cellulose media, while the other is a media containing some non-cellulose fiber. They may be provided with different porosity or different structural characteristics, to achieve desired results.

A variety of materials can be used. For example, the fluted sheet section or the facing sheet section can include a cellulose material, synthetic material, or a mixture thereof. In some embodiments, one of the fluted sheet section and the facing sheet section includes a cellulose material and the other of the fluted sheet section and facing sheet section includes a synthetic material.

Synthetic material(s) can include polymeric fibers, such as polyolefin, polyamide, polyester, polyvinyl chloride, polyvinyl alcohol (of various degrees of hydrolysis), and polyvinyl acetate fibers. Suitable synthetic fibers include, for example, polyethylene terephthalate, polyethylene, polypropylene, nylon, and rayon fibers. Other suitable synthetic fibers include those made from thermoplastic polymers, cellulosic and other fibers coated with thermoplastic polymers, and multi-component fibers in which at least one of the components includes a thermoplastic polymer. Single and multi-component fibers can be manufactured from polyester, polyethylene, polypropylene, and other conventional thermoplastic fibrous materials.

These examples are meant to indicate generally that a variety alternate media packs can be used in accord with the principles herein. Attention is also directed to U.S. Ser. No. 62/077,749 incorporated herein by reference, with respect to the general principles of construction and application of some alternates media types.

Additional examples of alternative types of media arrangements or packs that involve filtration media having flutes extending between opposite ends or flow faces in a straight through flow configuration are depicted in FIGS. 19-22. The flutes can be considered inlet flutes when they are arranged to receive dirty air via an inlet flow face, and they can be considered outlet flutes when they are arranged to permit filtered air to flow out via an outlet flow face.

Figure 19:
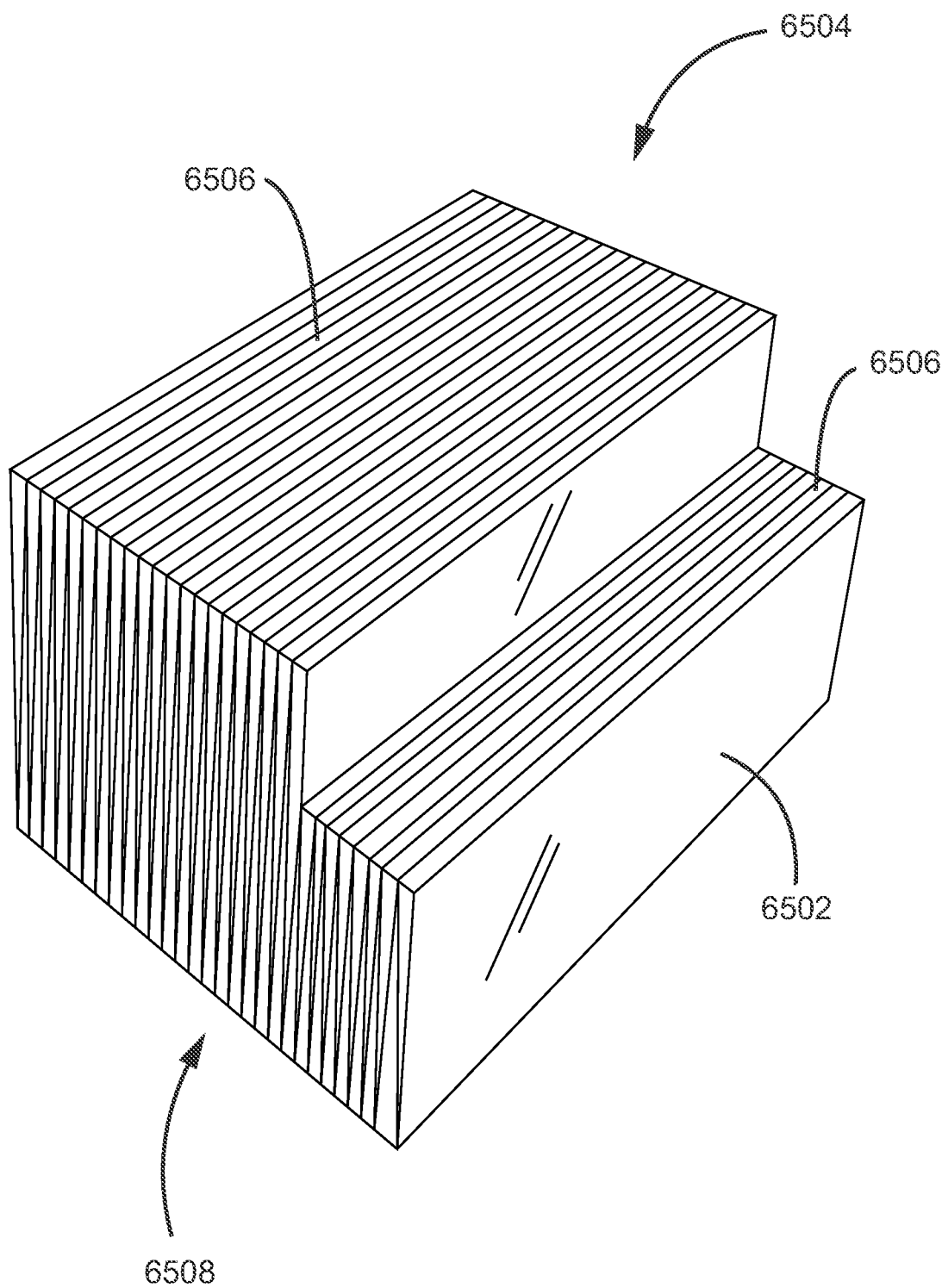
FIG. 19 is a perspective view of another media variation useable in arrangements according to the present disclosure.
Figure 20:
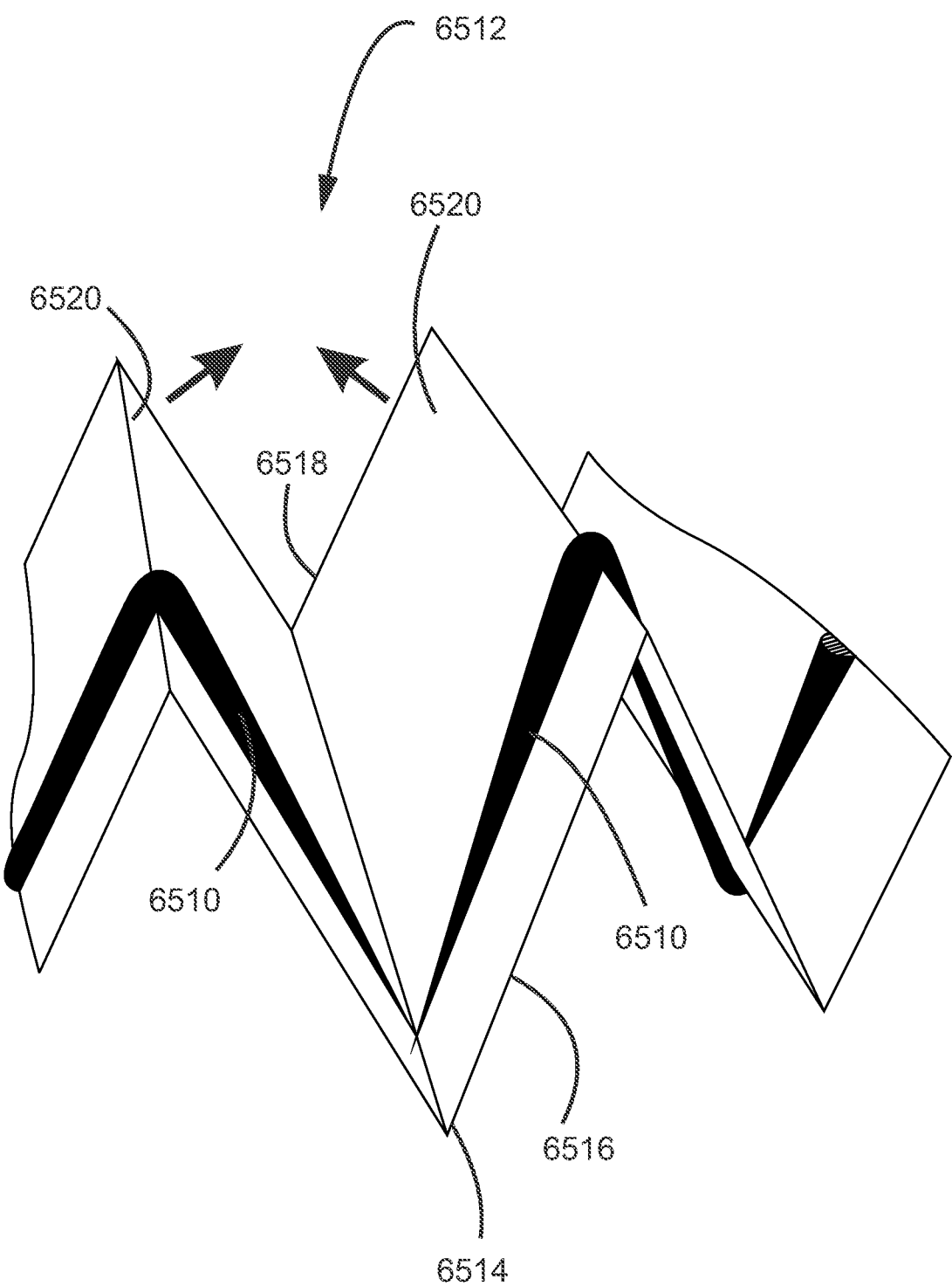
FIG. 20 is a schematic, perspective view of a portion of a support section of the filter media of FIG. 19, illustrated in a folded configuration but expanded or separated for illustrative purposes.
Figure 21:
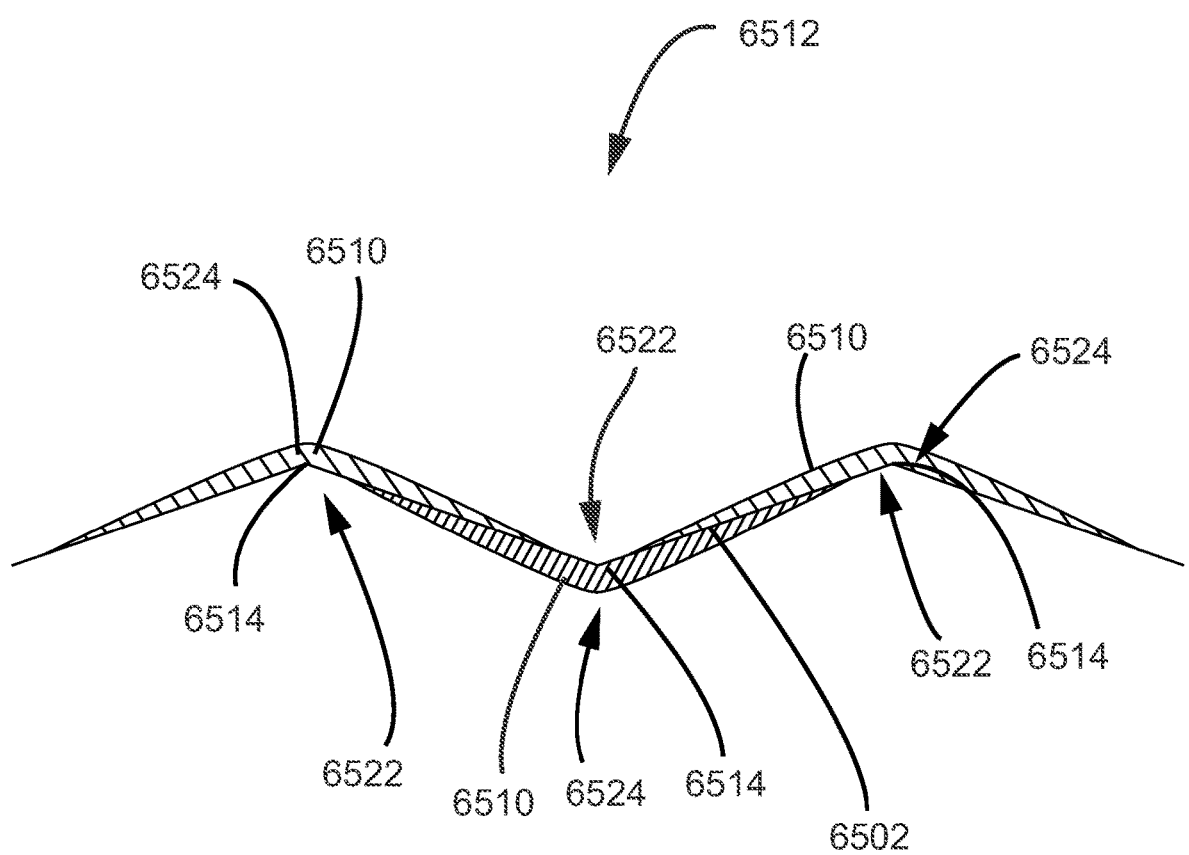
FIG. 21 is a schematic, cross-sectional view of a portion of the support section of the filter media of FIG. 19, illustrated in a folded configuration but expanded or separated for illustrative purposes.

The filtration media 6502 depicted in FIGS. 19-21, which is analogous to ones depicted in U.S. Pat. Nos. 8,479,924 and 9,919,256 assigned to Mann+Hummel GmbH, is illustrated in an arrangement that shows how the filtration media 6502 can be formed into a media pack arrangement 6504.

The media pack arrangement 6504 can be considered as having relatively long or deep pleats from an inlet flow face 6506 to an outlet flow face 6508, and can also have varying pleat depths as illustrated. As the depth of pleats of a media pack increases, there is a tendency of the filtration media to collapse on each other thereby causing masking. Masking is undesirable because masked filtration media tends to no longer be available for filtration thereby decreasing dust holding capacity and flow through the media pack, and also potentially increasing pressure drop across the media pack. In order to reduce masking and to help the filtration media retain its shape, support structures are known to be applied to pleated media. In FIGS. 20 and 21, support sections or spacers 6510 are provided. It should be appreciated that FIGS. 20 and 21 are illustrated in a folded configuration 6512 having pleat folds 6514, but are expanded or separated to show how the filtration media 6502 and the support sections or spacers 6510 can be arranged.

As illustrated in FIGS. 20-21, the filtration media 6502 extends between a first side 6516 and a second side 6518. Although only one support section 6510 is shown on each pleat face 6520, it should be appreciated that multiple support sections 6510 can be arranged along each pleat face 6520 so that when the filtration media 6502 is arranged into a media pack as illustrated in FIG. 19 as media pack 604, the volume between each of the support sections 6510 can be considered flutes extending between the inlet flow face 6506 and the outlet flow face 6508. The support sections 6510 can be arranged on each flow face 6520 so that opposite support sections 6510 contact or engage each other to help maintain the media pack shape while also limiting the amount of filtration media that would be contacted by the support sections 6510, as illustrated in FIG. 20. Furthermore, by providing that the support sections 6510 have adhesive properties, the support sections 6510 can be provided so that opposing support sections 6510 can adhere to each other when the filtration media 6502 is arranged into the media pack 6504.

The support sections 6510 can be arranged in a tapered configuration where support sections 6510 have a cross section at an interior fold 6522 and wherein the cross section increases toward an exterior fold 6524. In this context, the phrase "interior fold" refers to the side of the media that forms an acute angle, and the phrase "exterior fold" refers to the side of the media that forms an obtuse angle when the media is arranged into a media pack. Furthermore, the reference to changing the cross section of the support sections 6510 can refer to one or both of the height that the support section extends away from the media to which it is adhered and also to the width along the media to which it is adhered to in a direction toward or away from other support sections across adjacent flutes. Changing the shape of the support sections 6510 can help maintain the shape of the media pack and the resulting flutes, and can help reduce the amount of media that would otherwise be contacted by the support sections 6510 if they were not arranged in a tapered configuration. In addition, the support sections 6510 can be arranged in a non-tapered configuration. As illustrated in FIG. 21, the support sections 6510 can be provided so that they extend over the exterior folds 6524 although it is not necessary for the support sections 6510 to extend over the exterior folds. In addition, it is not necessary for the support sections 6510 to extend into the interior folds 6522, although, if desired, the support sections 6510 can be provided so that they extend into the interior folds 6522.

The support sections 6510 can be applied to the filtration media 6502 as adhesive extruded onto the filtration media 6502 where the adhesive forms the support sections 6510. Before the adhesive has a chance to fully cure, the filtration media 6502 can be folded into the media pack arrangement 6504, which may or may not have varying pleat depths. By forming the media pack arrangement 6504 before the adhesive has fully cured, the opposing support sections 6510 can become bonded or adhered to each other thereby forming flutes extending between the inlet flow face 6506 and the outlet flow face 6508.

It should be appreciated that the filtration media 6502 can be provided with deformation, such as corrugations, extending across the media. The direction of deformation, such as corrugation, can be parallel or perpendicular to the pleat fold direction.

Figure 22:
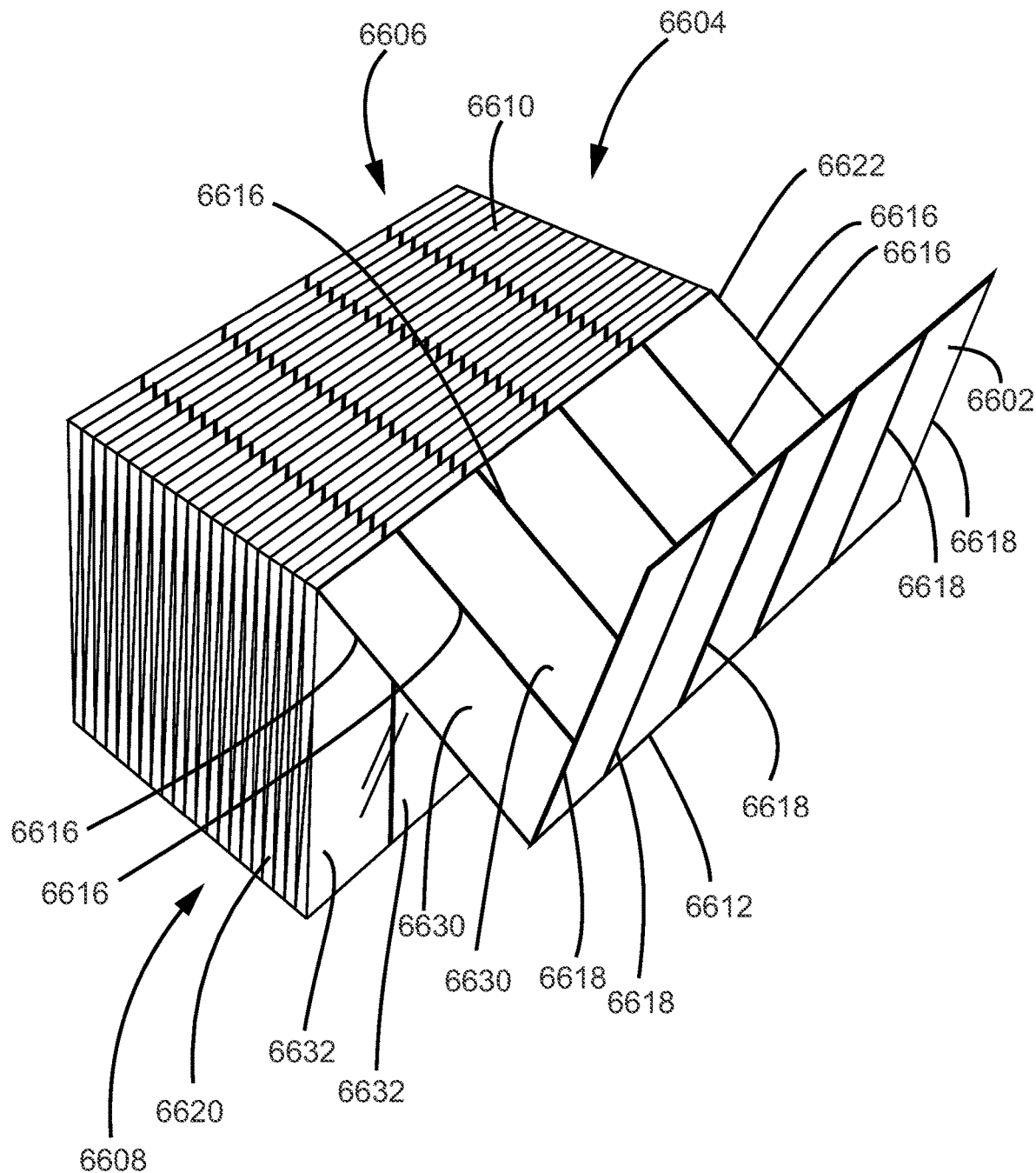
FIG. 22 is a perspective view of another media variation useable in arrangements according to the present disclosure.

The filtration media 6602 depicted in FIG. 22 is analogous to filtration media depicted in US 2018/0207566 assigned to Champion Laboratories, Inc., as another example of a media pack arrangement 6604 having inlet and outlet flutes in a straight through flow arrangement.

The filtration media pack arrangement 6604 can be formed by folding the filtration media 6602 to form an inlet flow face 6606 and an outlet flow face 6608. The pleat tips 6610 form the inlet flow face 6606, and the pleat tips 6612 form the outlet flow face 6608. Adhesive beads 6616 and 6618, which may be continuous or discontinuous, extend along the filtration media 6602 in multiple lines across the filtration media 6602 from a media first side 6620 to a media second side 6622. The adhesive beads 6616 and 6618 along the media first side 6620 and along the media second side 6620 can be thickened, if desired, and can be arranged to provide an edge seal along the media first side 6620 and the media second side 6622. By providing that the adhesive beads 6616 and 6618 adhere to each other as the filtration media 6602 is folded, inlet flutes 6630 and outlet flutes 6632 can be formed in the straight through media pack arrangement 6604.

A similar type of filtration media pack arrangement is commercially available under the name Enduracube from Baldwin Filters, Inc. The filtration media pack available under the name Enduracube from Baldwin Filters, Inc. is arranged in a pleated configuration forming inlet flutes and outlet flutes extending between an inlet flow face and an outlet flow face.

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

It is also noted that while the techniques described herein were typically developed for advantageous application and arrangements involving media packs with straight through flow configurations, the techniques can be applied to advantage in other systems. For example, the techniques can be applied when the cartridge comprises media surrounding a central interior, in which the cartridge has an open end. Such arrangements can involve "forward flow" in which air to be filtered enters the central open interior by passage through the media, and the exits through the open end; or, with reverse flow in which air to be filtered enters the open end and then turns and passes through the media. A variety of such arrangements are possible, including pleated media and alternate types of media. Configurations usable would include cylindrical and conical, among others.

III. Example Air Cleaner Assemblies

A. FIGS. 23-35

Figure 23:
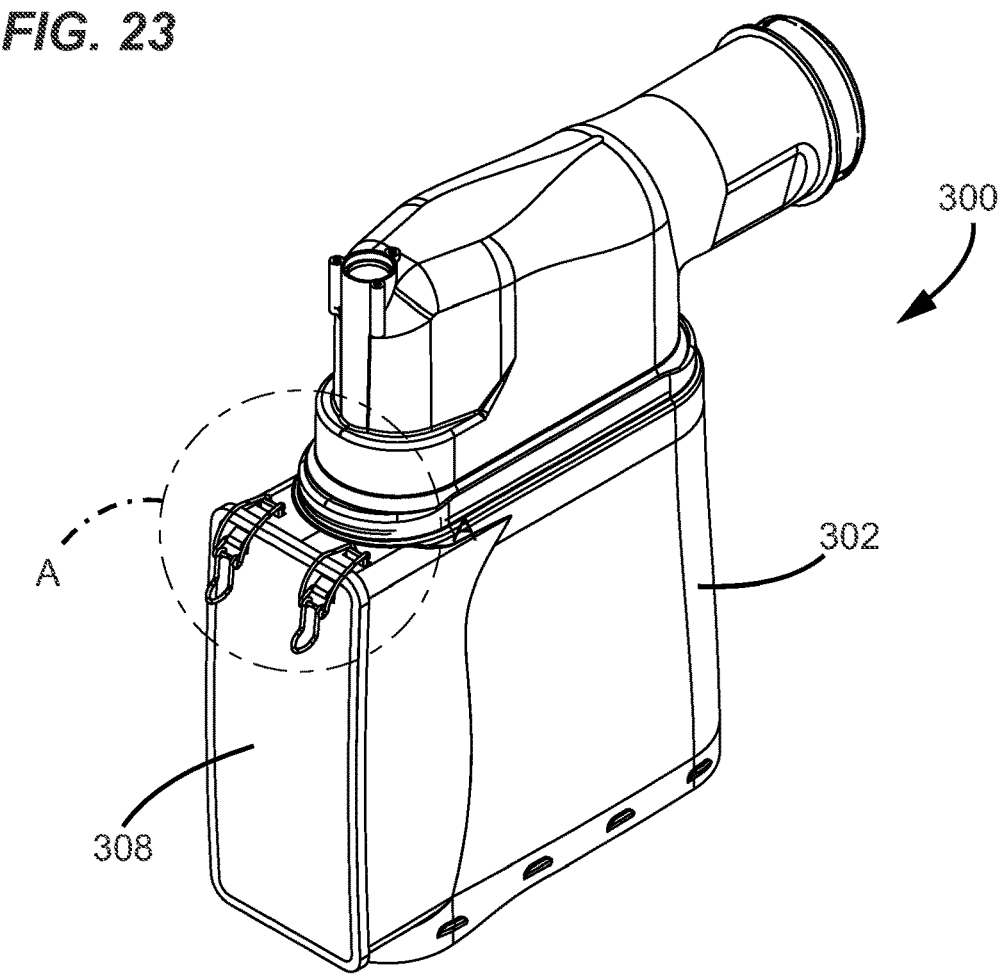
FIG. 23 is a perspective view of a first embodiment of an air cleaner assembly, constructed in accordance with principles of this disclosure.
Figure 26:
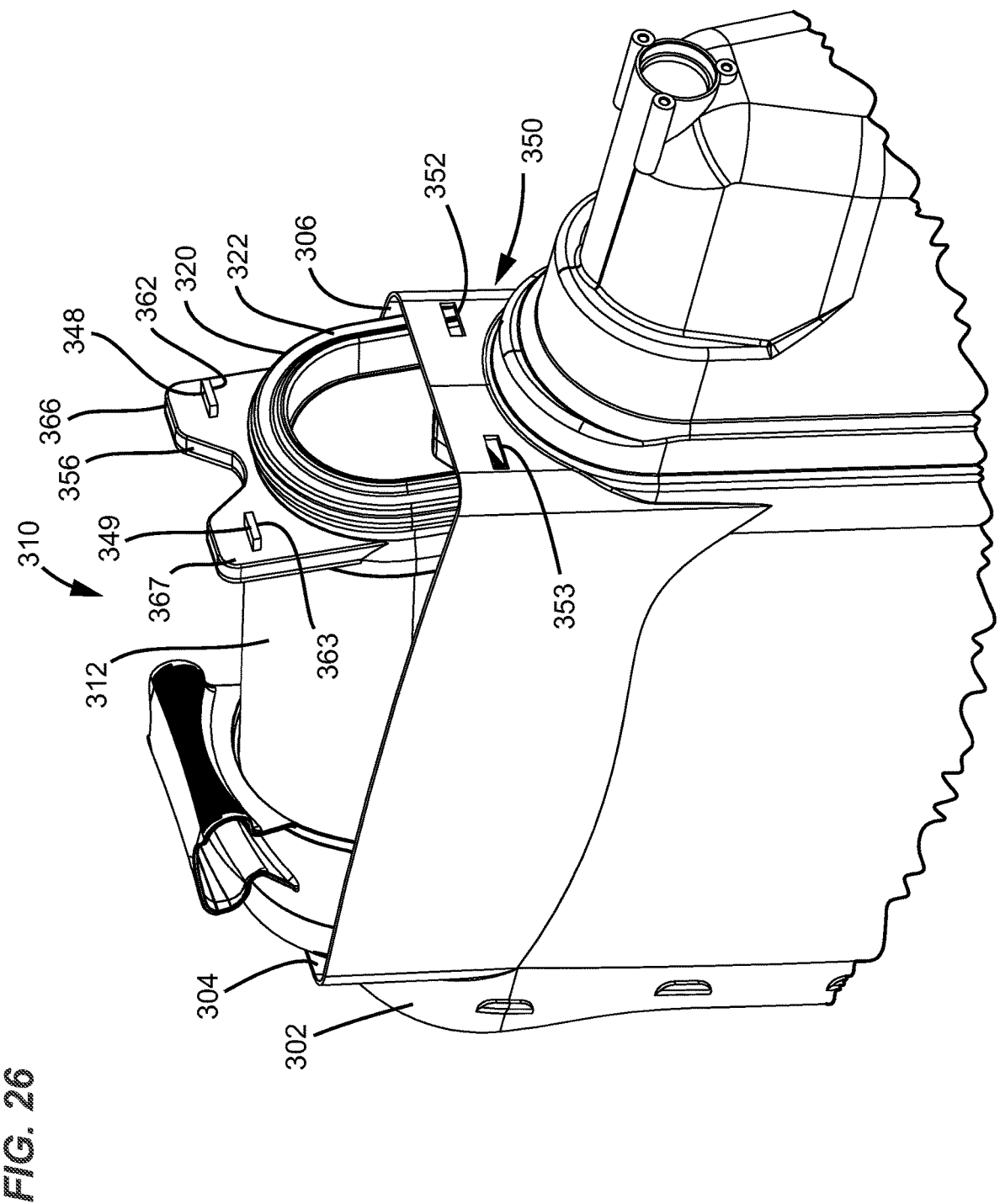
FIG. 26 is a perspective view showing the filter element of FIG. 25 during one step of installment in the air cleaner assembly of FIG. 23.

Attention is now directed to FIG. 23. In FIG. 23 is a perspective view of an embodiment of an air cleaner assembly 300. The air cleaner assembly 300 includes a housing 302. The housing 302 has an interior volume 304 (FIG. 27) and an access opening 306 (FIG. 26). A cover 308 is removably oriented over the access opening 306. The housing 302 is in communication with an intake for air and an outlet for filtered air to be used by an engine, often a diesel engine.

Figure 25:
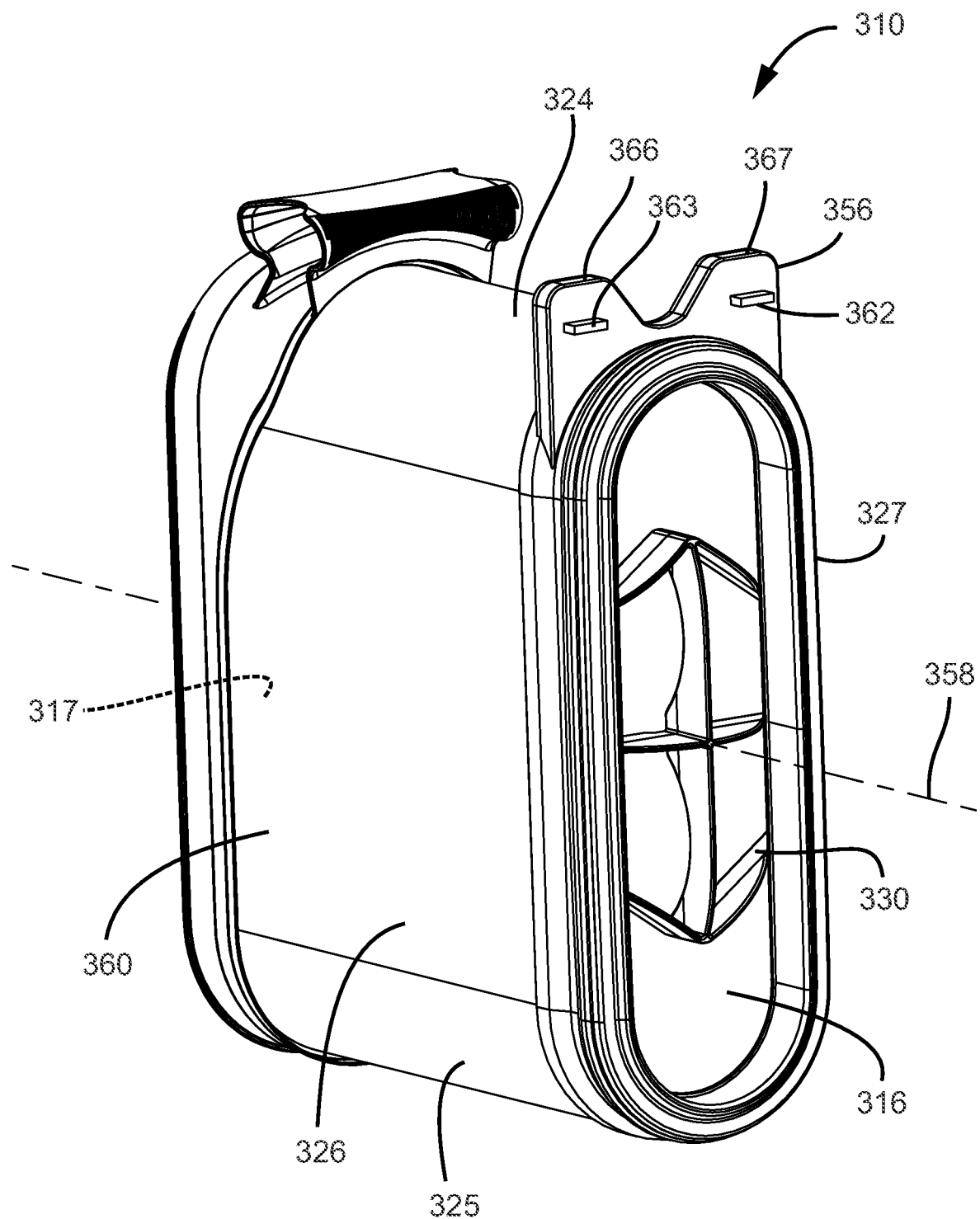
FIG. 25 is a perspective view of an embodiment of a filter element usable in the air cleaner assembly of FIG. 23.

Located within the interior volume 304 of the housing 302 is a filter element 310 (FIG. 25). The filter element 310 is located within the housing 302 so that air that is taken into the housing 302 passes through the filter element 310, where dust and other debris is removed from the air, and then the filtered air proceeds downstream of the filter element 310 to the outlet to be used by the engine.

Still in reference to FIG. 25, the filter element 310 is just one example embodiment. The filter element 310 can be embodied in many different forms. The filter element 310 includes a construction of filter media 312. In this example, the filter media 312 is z-media 314, as described above in connection with FIGS. 1-22. Other types of filter media can be used.

The z-media 314 of FIG. 25 has opposite flow faces 316, 317. One of the flow faces 316, 317 is an inlet flow face, while the other is an outlet flow face. The media pack 312 is configured to filter air flowing into the inlet flow face prior to exiting the outlet flow face. In one example embodiment, the inlet flow face is at 317, while the outlet flow face is at 316.

The filter element 312 includes a frame 318. The frame 318, in this embodiment, is mounted to the media pack 312. The frame 318 is positioned on or adjacent the flow face 316 and surrounds or circumscribes the flow face 316.

A seal arrangement 320 is positioned on the frame 318. The seal arrangement 320 includes a seal member 322. The seal member 322 comprises a compressible, rubber-like material that forms a releasable seal with the housing 302. The seal member 322 can be made from many materials including, for example, compressible polyurethane foam.

The seal member 322 may be embodied in many different forms. In the example shown herein, the seal member 322 is radially directed and oriented to form a radial seal with the housing. In this case, the radial direction is an outward radial direction, and in other embodiments, the radial direction could be an inward radial direction. In still other embodiments, the seal member 322 could be an axial or a pinch seal.

The filter element 310 is racetrack-shaped having opposite curved ends 324, 325 joined by opposite straight sides 326, 327. In the embodiment shown, the frame 318 and the seal member 322 are also racetrack-shaped.

The frame 318 can include a face grid 330 over the flow face 316. The face grid 330 can help keep the filter media 312 from telescoping. The grid 330 can also help to support the seal member 322.

Figure 24:
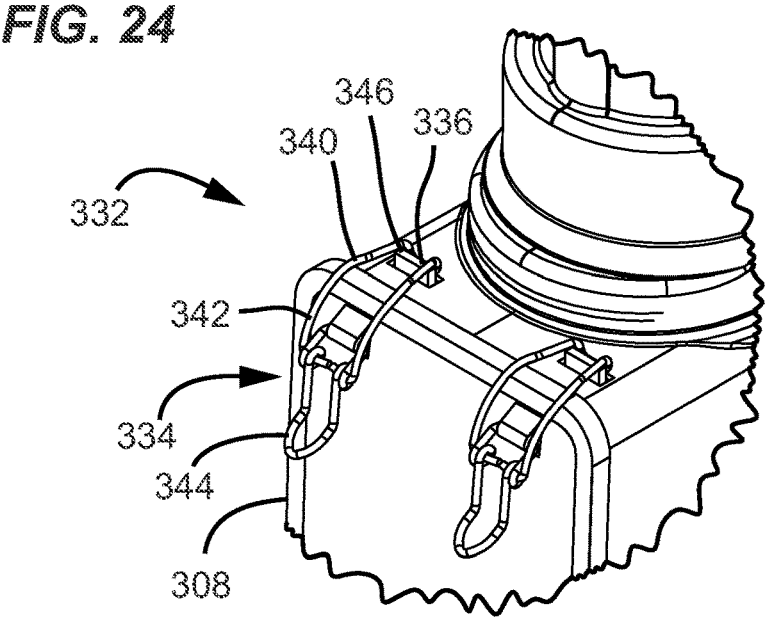
FIG. 24 is a perspective view of an enlarged area of the air cleaner assembly of shown at "A" in FIG. 23.

In accordance with principles of this disclosure, the air cleaner assembly 300 includes a two-part mating catch assembly 332 (FIG. 24). The two-part mating catch assembly 332 releasably mate when the filter element 310 is correctly and properly mounted within the interior volume 304 of the housing 302 and the cover 308 is correctly mounted in place over the access opening 306.

Many embodiments are possible. In general, a first part 334 of the two-part mating catch assembly 332 is secured to the cover 308. A second part 336 of the two-part mating catch assembly 332 is on one of the housing 302 and the filter element 310.

In general, the first part 334 is a latch 340. The latch 340 is shown in FIG. 24 as an over-center latch 342. The over-center latch 342 includes a lever 344 and a hook 346. The hook 346 engages the second part 336. The second part 336 will typically be a keeper 348, which is used to be releasably engaged by the hook 346.

In the embodiment of FIGS. 23-29, the filter element 310 includes the second part 336 secured thereto. The second part 336 extends through an opening 350 in the housing 302 when the filter element 310 is operably mounted within the housing interior volume 304.

In FIG. 24, the opening 350 is form of a pair of apertures 352, 353 extending through the housing 302. The apertures 352, 353 are located adjacent to the access opening 306 and the removable cover 308.

Attention is again directed to FIG. 25. As mentioned previously, the second part 336 of the catch assembly 332 can be secured to the filter element 310. In FIG. 25, the second part 336 projects from an ear constructions 356. The ear construction 356 extends from the frame 318.

A longitudinal axis 358 extends through the filter element 310 and passes through each flow face 316, 317. In general, the axis 358 is parallel to the side wall 360 of the filter media pack 312. The second part 336 projects from the ear construction 356 generally parallel to the longitudinal axis 358.

The second part 336 may be embodied in several different forms. In the FIG. 25 embodiment, the second part 336 includes a pair of tabs 362, 363 located laterally spaced from the z-media 314 and projecting in a direction away from the flow faces 316, 317 and the z-media 314. The tabs 362, 363 project in a direction away from the remaining portion of the filter element 310. In the embodiment of FIG. 25, the tabs 362, 363 are adjacent to the flow face 316 and project in a direction opposite from the opposite flow face 317.

The ear construction 356 is illustrated in FIG. 25 as including a pair of ears 366, 367 extending from the frame 318. The ears 366, 367 extend from a side of the frame 318 to be radial of or lateral of the frame 318. The ears 366, 367 are generally axially between the seal member 322 and the opposite flow face 317.

Each ear 366, 367 includes one of the tabs 362, 363 extending thereon.

The tabs 362, 363 are sized to be received within the apertures 352, 353. FIG. 26 shows one step of installing the filter element 310 into the housing 302. The filter element 310 is installed through the access opening 306 leading with the curved end 325 that is opposite from the curved end 324. The curved end 324 is the portion of the filter element 310 that is adjacent to the ears 366, 367 having the tabs 362, 363.

The tabs 362, 363 are sized to interact with the first part 334. In many arrangements, the tabs 362, 363 extend at least 10 mm and no greater than 100 mm from the ear construction 356; preferably at least 15 mm and no greater than 80 mm from the ear construction 356.

Figure 27:
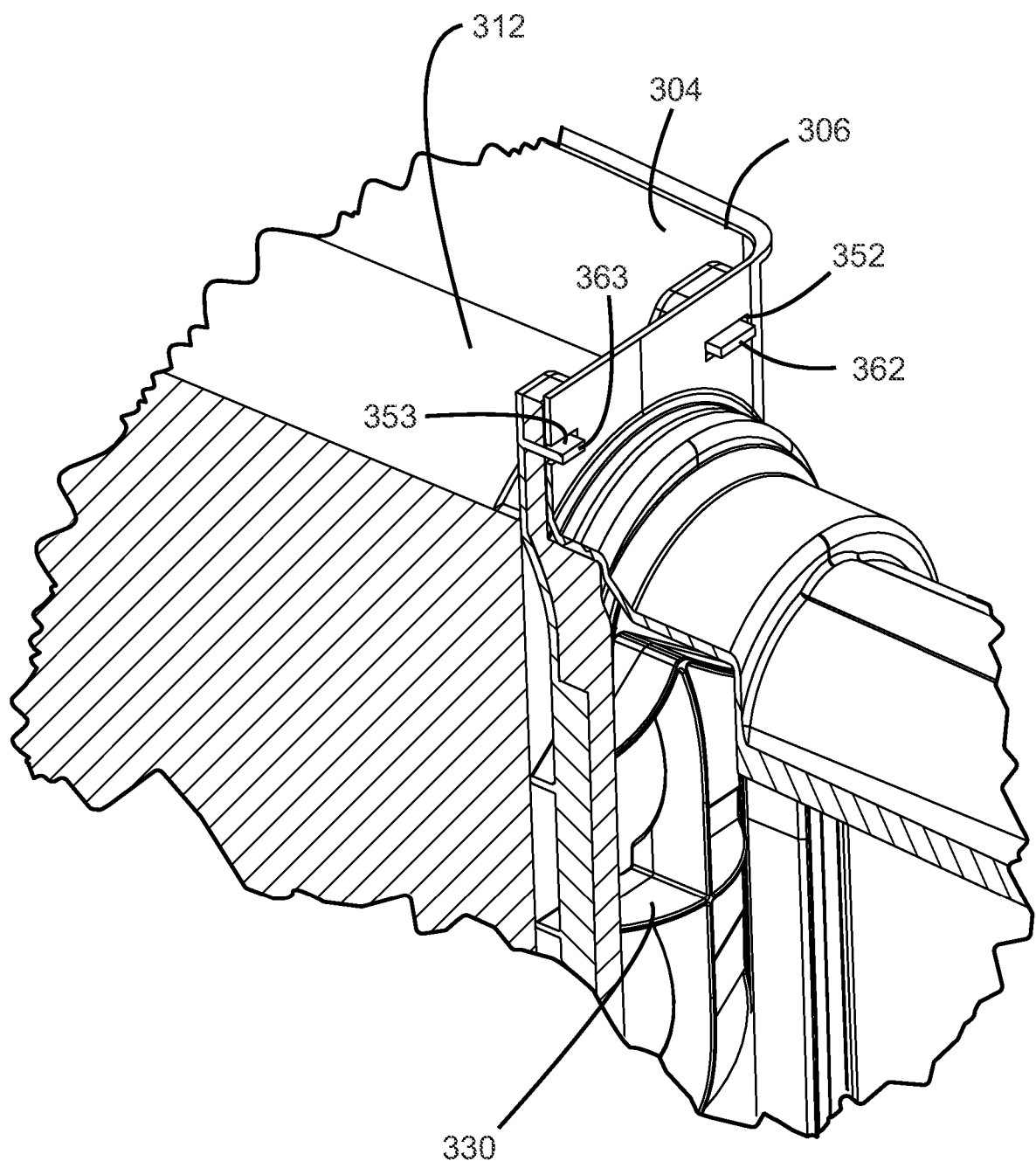
FIG. 27 is a perspective view of a partial assembly of the air cleaner housing of FIG. 23 and a portion of the filter element of FIG. 25.
Figure 28:
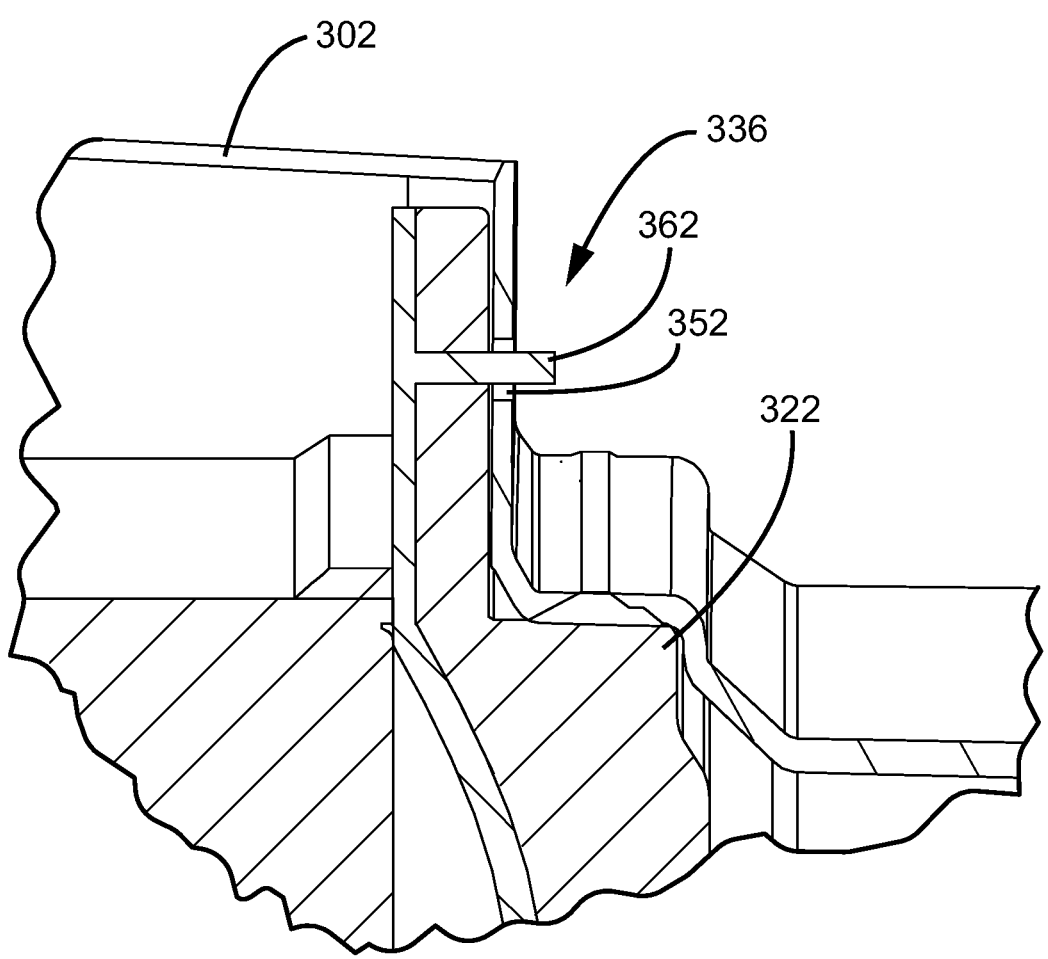
FIG. 28 is an enlarged, sectional view of a portion of the filter element installed in the air cleaner housing of FIG. 23.

In FIG. 27, the filter element 310 has been installed into the housing 302, and the tabs 362, 363 can be seen projecting through the apertures 352, 353 in the housing 302. FIG. 28 shows an enlarged view of one of the tabs 362 extending or projecting through the aperture 352.

Figure 29:
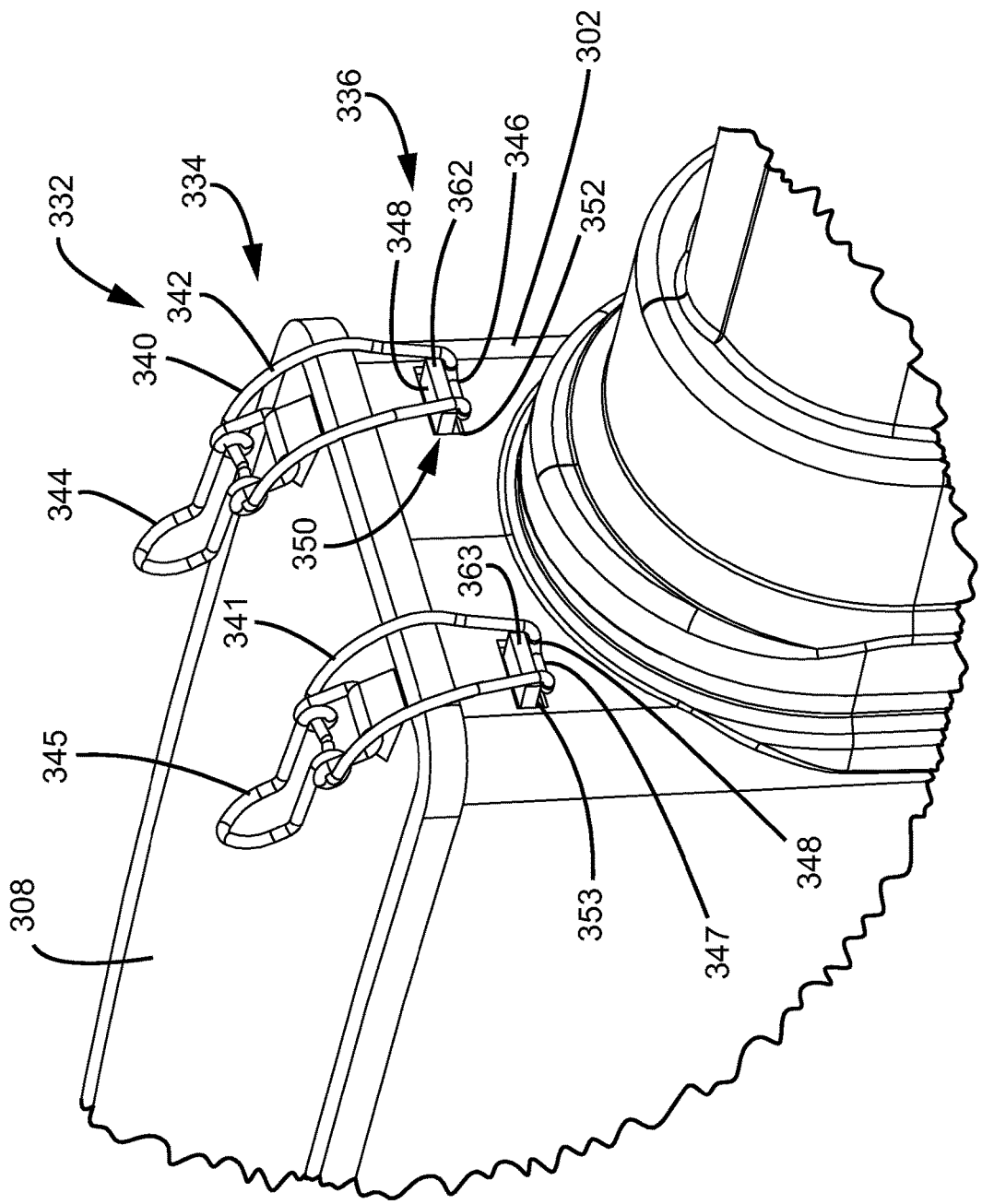
FIG. 29 is an enlarged, perspective view of a portion of the air cleaner assembly of FIG. 23 with the filter element of FIG. 25 installed therein.

FIG. 29 shows the final step of engaging the two-part mating catch assembly 332. In FIG. 29, the first part 334 is mated with our engaged with the second part 336. In this embodiment, there are two latches 340, 341. Each of the latches 340, 341 has a hook 346, 347 and a lever 344, 345. The hooks 346, 347 can be seen engaged with the tabs 362, 363, which function as keepers 348, 349.

FIGS. 30-35 show another embodiment of air cleaner assembly 300. The same reference numerals will be used for like parts. The air cleaner assembly 300 of FIGS. 30-35 is the same as the air cleaner assembly 300 of FIGS. 23-29, with the exception of the second part 336 of the catch assembly 332.

Figure 31:
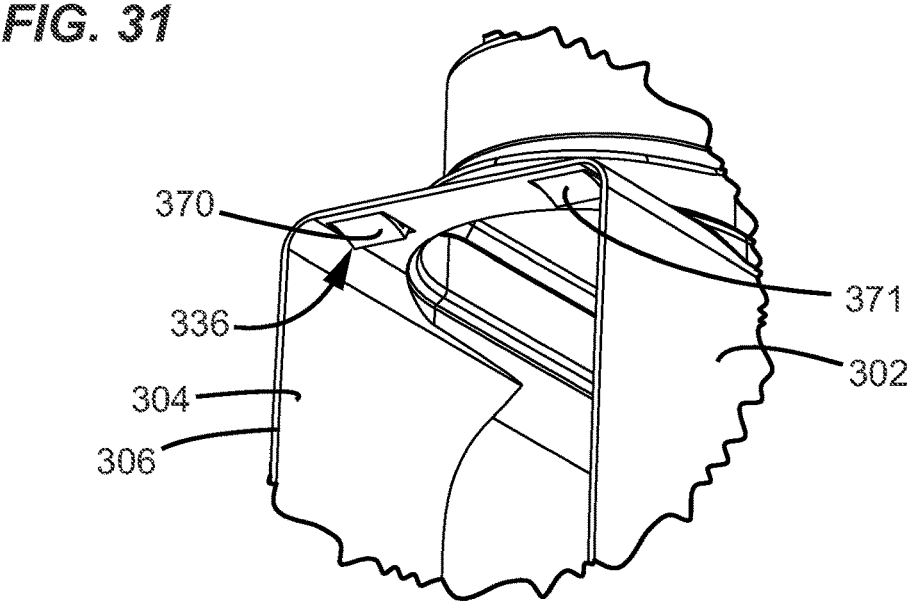
FIG. 31 is an enlarged view of area "B" of FIG. 30.

In this embodiment, the second part 336 is integral with the housing 302. As can be seen in FIG. 31 the second part 336 includes a pair of flanges 370, 371 integral with the housing 302 and that are movable radially outward from a remaining portion of the housing 302 when the filter element 310 is operably mounted within the housing interior volume 304.

In FIG. 31, the flanges 370, 371 can be seen in a pre-engaged state, before the filter element 310 has been installed in the housing 302. The flanges 370, 371 are adjacent to the access opening 306 and angle or ramp in a direction toward the interior volume 304 and away from the exterior surface/wall 374 of the housing 302.

The filter element 310 is constructed and arranged to push the second part 336 radially outward from the remaining portion of the housing 302, when the filter element 310 is operably mounted within the housing interior volume 304. In this embodiment, the filter element 310 pushes the flanges 370, 371 from the direction where they ramp or extend inwardly as shown in FIGS. 31 and 33, to the position shown in FIG. 34, in which keepers 348, 349 extend outward from the housing wall 374.

Figure 30:
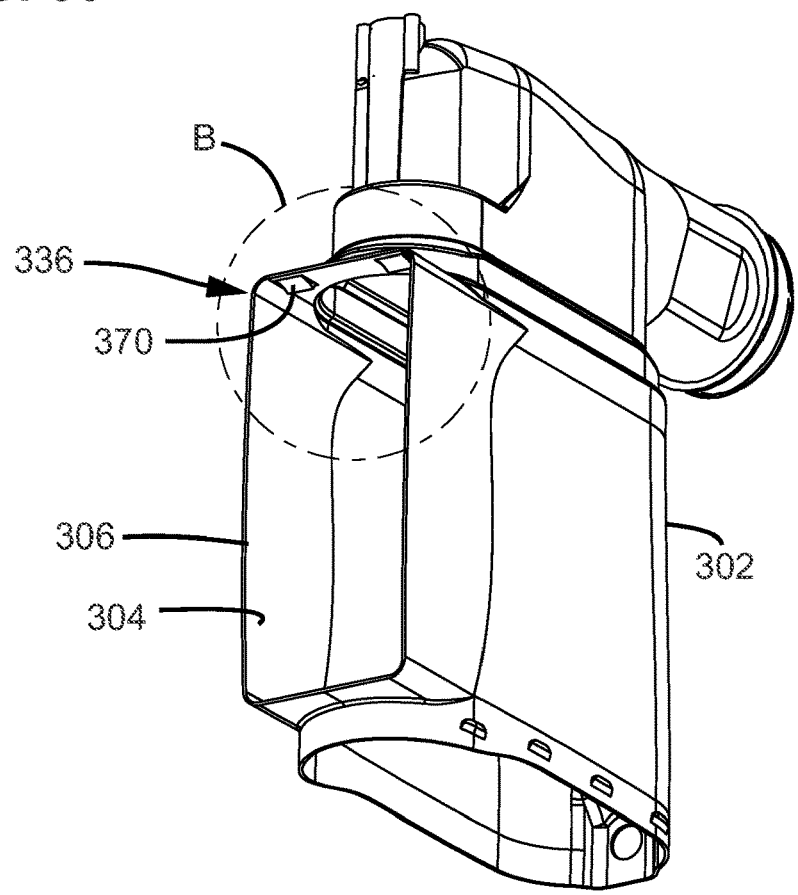
FIG. 30 is a perspective view of a second embodiment of a housing for an air cleaner assembly, the assembly being depicted without the filter element installed therein and without the cover member.
Figure 32:
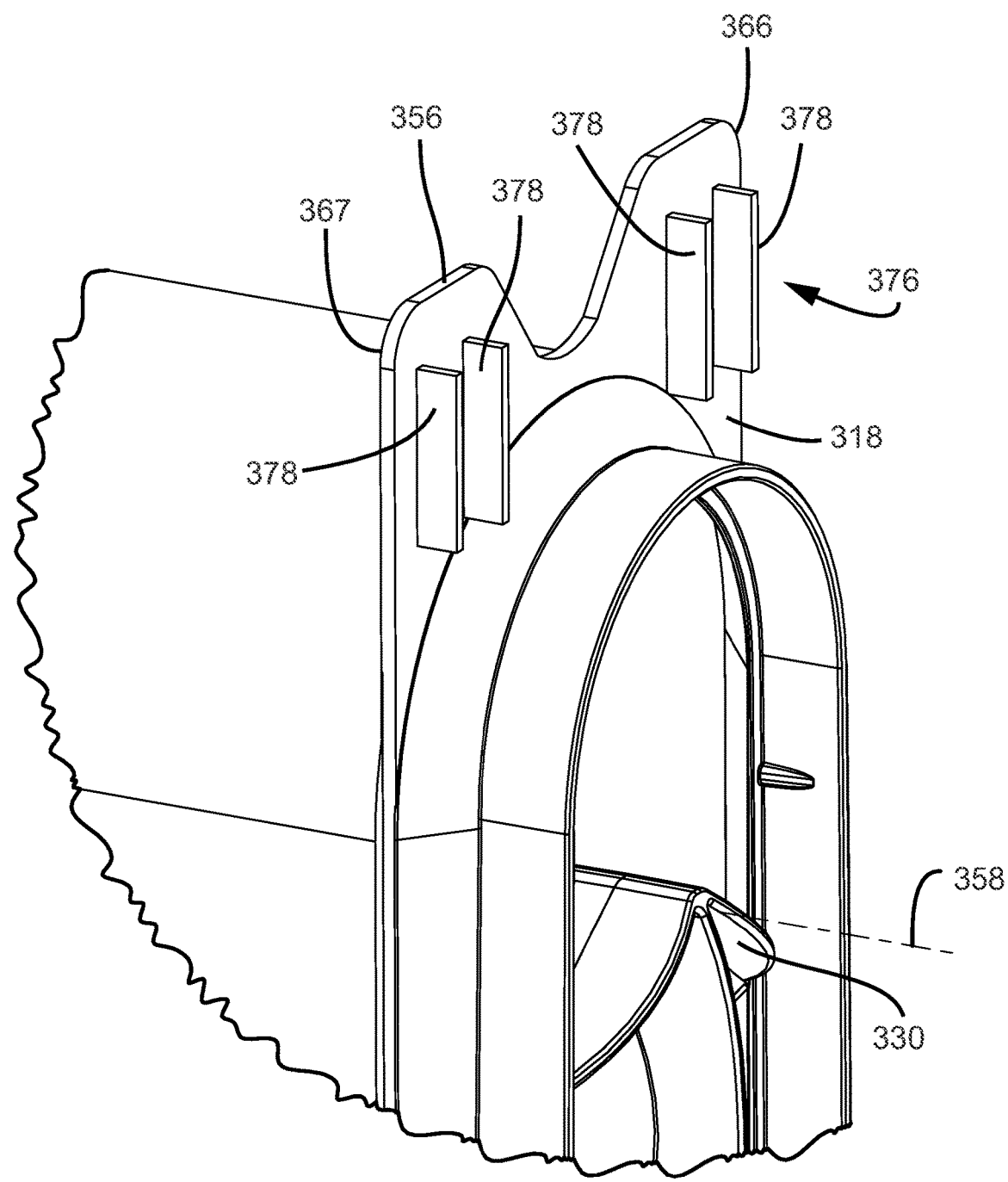
FIG. 32 is a perspective view of a portion of a filter element usable with the air cleaner assembly of FIG. 30, the filter element being shown with the frame and before the seal arrangement is in place.

FIG. 32 shows the filter element 310 usable with the embodiment of FIG. 30. In this embodiment, the filter element 310 includes a projection arrangement 376 on the ear construction 356. The projection arrangement 376 projects in a direction parallel to the longitudinal axis 358. The filter element 310 in FIG. 32 has the frame 318, but does not depict the seal arrangement 320 mountable or molded on the frame 318, for purposes of enhancing clarity.

The projection arrangement 376 can include many embodiments. In this embodiment, the projection arrangement 376 includes one or more tabs 378. The tabs 378 are positioned such that when the filter element 310 is operably mounted within the housing interior volume 304, the tabs 378 push the flanges 370, 371 radially outward from the remaining portion of the housing 302 so that the keepers 348, 349 project from the housing wall 374. In the example shown in FIG. 32, there are two tabs 378 on each of the ears 366, 367. Many variations are possible.

Figure 33:
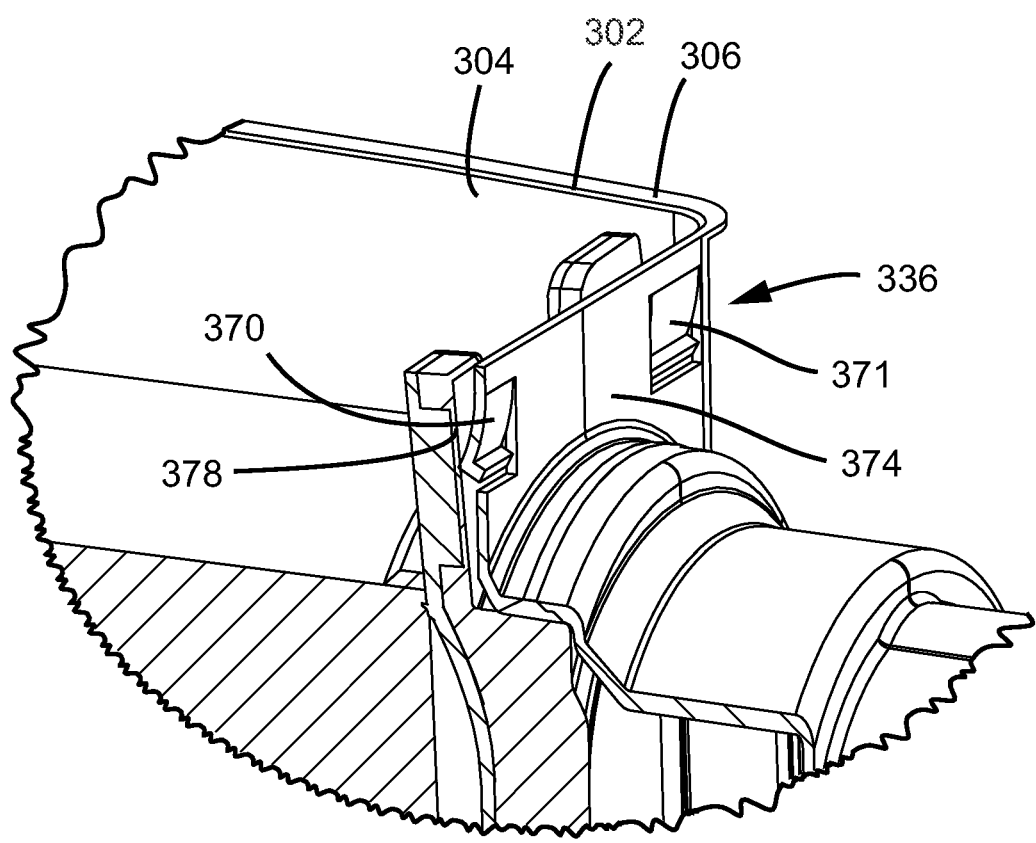
FIG. 33 is a perspective view of a portion of the air cleaner assembly during one step of having the filter element installed therein.
Figure 34:
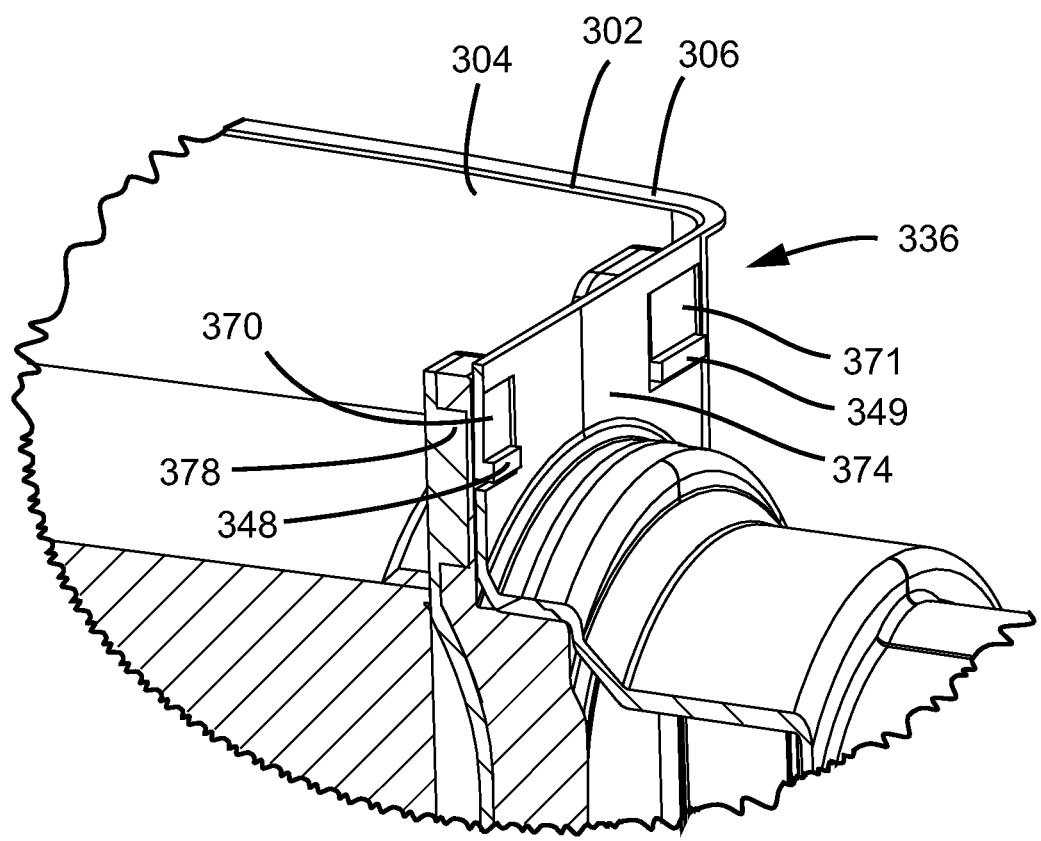
FIG. 34 is a perspective view similar to FIG. 33 and showing the filter element operably installed within the air cleaner housing.

FIG. 33 illustrates one step of installing the filter element 310 into the housing 302. The illustration in FIG. 33 shows the filter element in the interior volume 304 before the element 310 is fully installed, and the flanges 371 are still projecting inwardly in a direction toward their interior volume 304. FIG. 34 shows the element 310 fully installed with the tabs 378 engaging against the flanges 371 so that the keepers 348, 349 project away from the housing wall 374. This puts the keepers 348, 349 in a position that they may be engaged or hooked by the hooks 346, 347 of the latches 340, 341.

Figure 35:
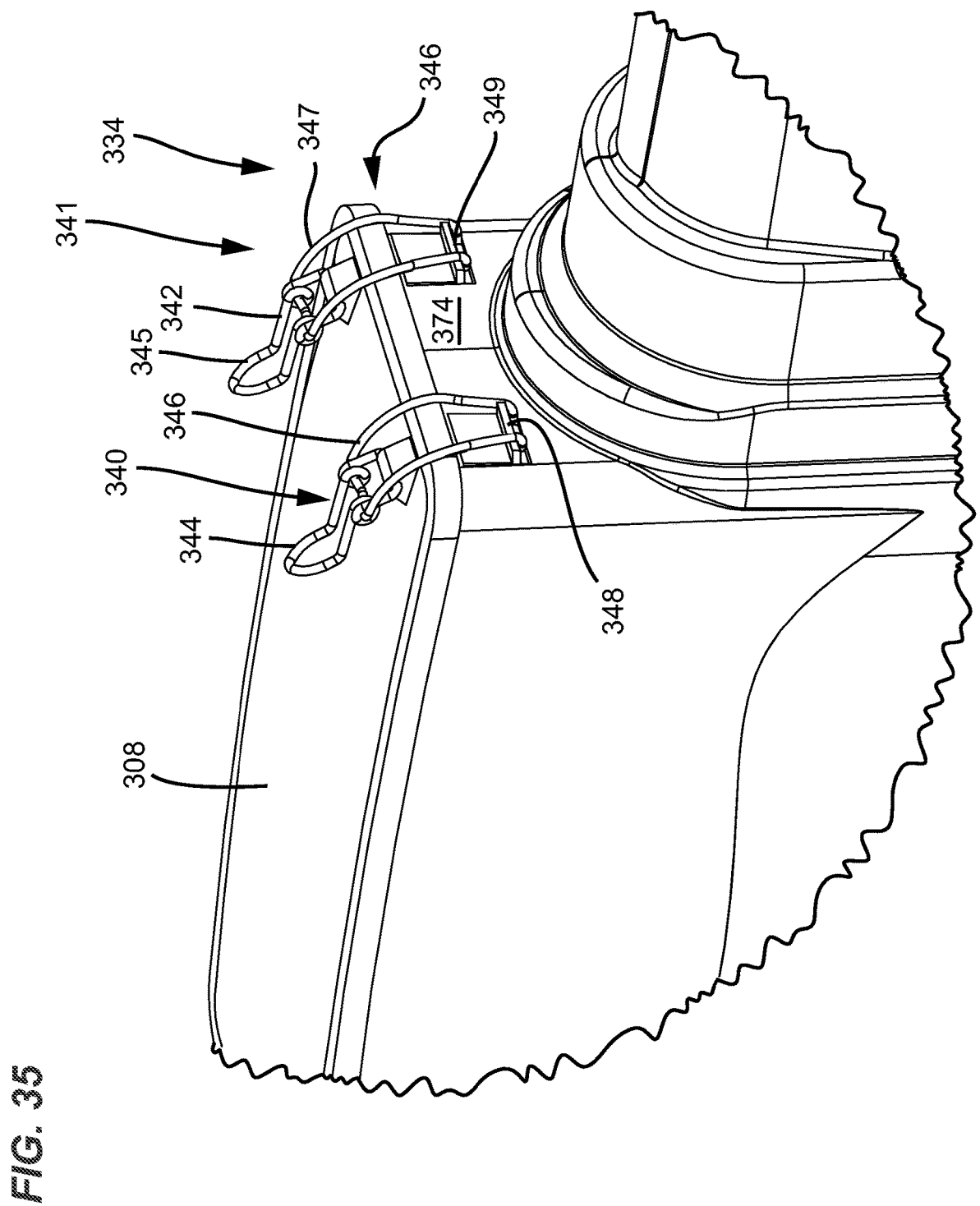
FIG. 35 is a perspective view of the air cleaner assembly with the filter element installed therein and the cover member latched in place on the air cleaner housing.
Figure 37:
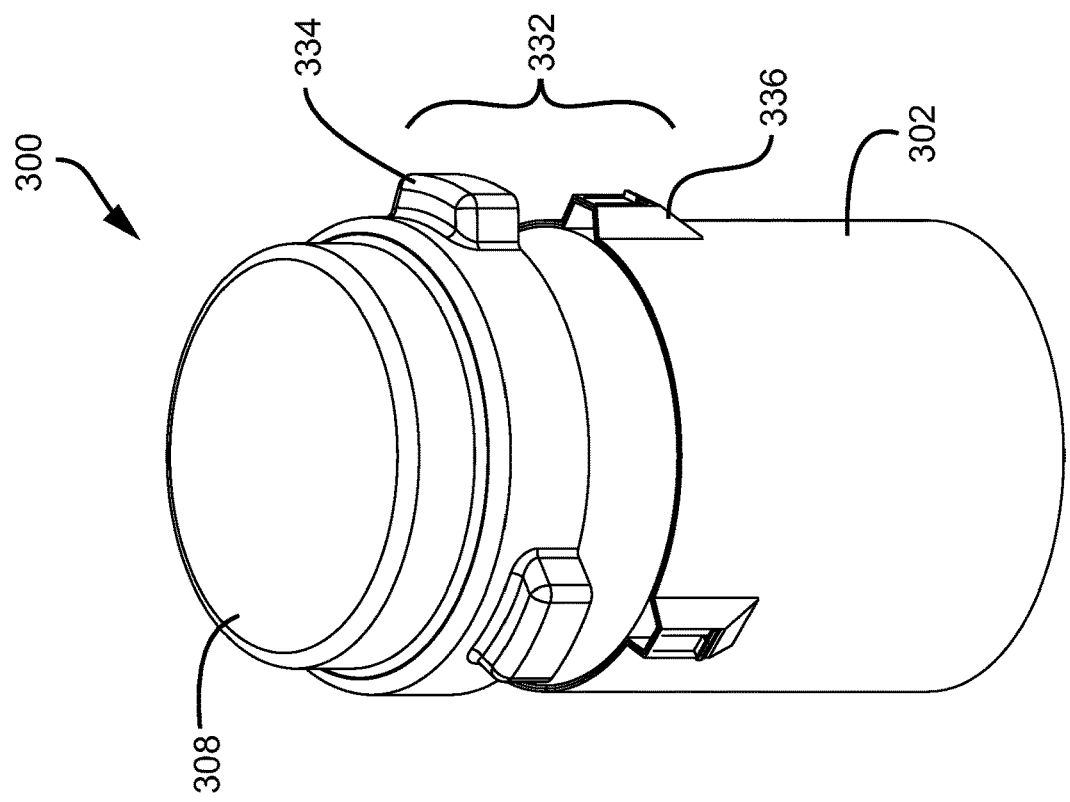
FIG. 37 is a perspective view of the air cleaner assembly of FIG. 36 during a further step of installation of the element.
Figure 36:
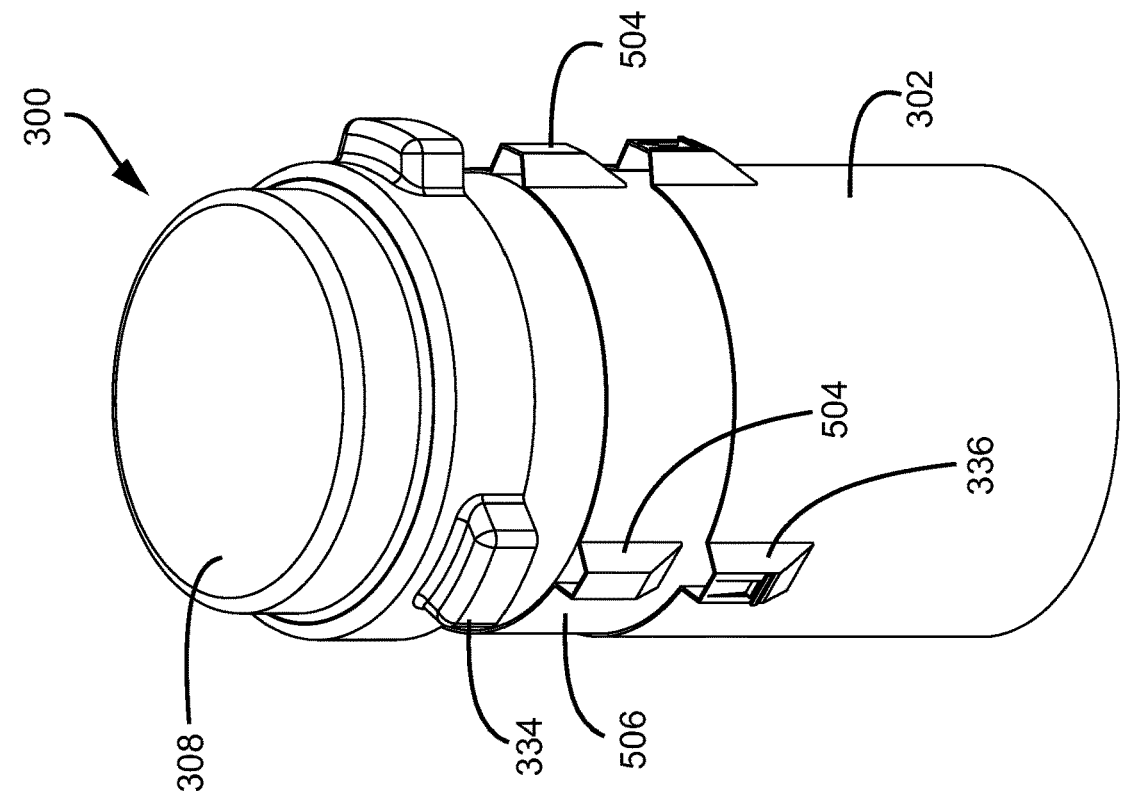
FIG. 36 is a perspective view of another embodiment of an air cleaner assembly, during a step of installation of the element.

The engaged position of the catch assembly 332 is shown in FIG. 35 with the hooks 346, 347 catching or engaging the keepers 348, 349. The cover 308 is in place so that the latches 340, 341 can be positioned to mate with the second part 336, in the form of the flanges 370, 371.

A method of installing the filter element 310 can be appreciated from the above. The method includes orienting the filter element 310 into the interior volume 304 of the housing 302 through the access opening 306 in the housing 302.

Next, there is a step of orienting the cover 308 over the access opening 306.

Next, there is a step of releasably mating the first part 334 and second part 336 of the two part mating catch assembly 332 to secure the cover 308 to the housing 302. The first part 334 is secured to the cover 308. The second part 336 is on one of the housing 302 and the filter element 310.

The second part 336 can be an integral part of the housing 302, in the form of flanges 370, 371 that are deflectable from a position extending into the interior volume 304 to a position extending from a remaining portion of the exterior of the housing 302. The step of orienting the filter element 310 includes using the filter element 310 to push the second part 336 radially outwardly from the remaining portion of the housing 302.

The filter element 310 can include the second part 336 secured thereto. For example, the second part 336 can be in the form of tabs 362, 363 that extend from the ear construction 356 of the filter element 310. The step of orienting the filter element 310 includes extending the second part 336, in the form of tabs, 362, 363, through opening 350 (such as the apertures 352, 353) in the housing 302 when the filter element 310 is operably mounted within the housing interior volume 304.

B. FIGS. 36-42

Attention is now directed to FIGS. 36-40, which shows another embodiment of air cleaner assembly 300. The air cleaner assembly 300 includes housing 302 having interior volume 304 and access opening 306. Cover 308 is removably oriented over the access opening 306. The housing 302 is in communication with an intake for air and an outlet for filtered air to be used by an engine, often a diesel engine.

Located within the interior volume 304 of the housing 302 filter element 310. The filter element 310 is located within the housing 302 so that air that is taken into the housing 302 passes through the filter element 310, where dust and other debris is removed from the air, and then the filtered air proceeds downstream of the filter element 310 to the outlet to be used by the engine. The filter element 310 can be embodied in many different forms. The filter element 310 includes a construction of filter media 312. In this example, the filter media 312 is z-media 314, as described above in connection with FIGS. 1-22. Other types of filter media can be used.

As with the previous embodiment, the air cleaner assembly 300 includes two-part mating catch assembly 332. The two-part mating catch assembly 332 releasably mate when the filter element 310 is correctly and properly mounted within the interior volume 304 of the housing 302 and the cover 308 is correctly mounted in place over the access opening 306.

In this example, the first part 334 of the two-part mating catch assembly 332 is secured to the cover 308, and the second part 336 of the two-part mating catch assembly 332 is on the housing 302.

Figure 38:
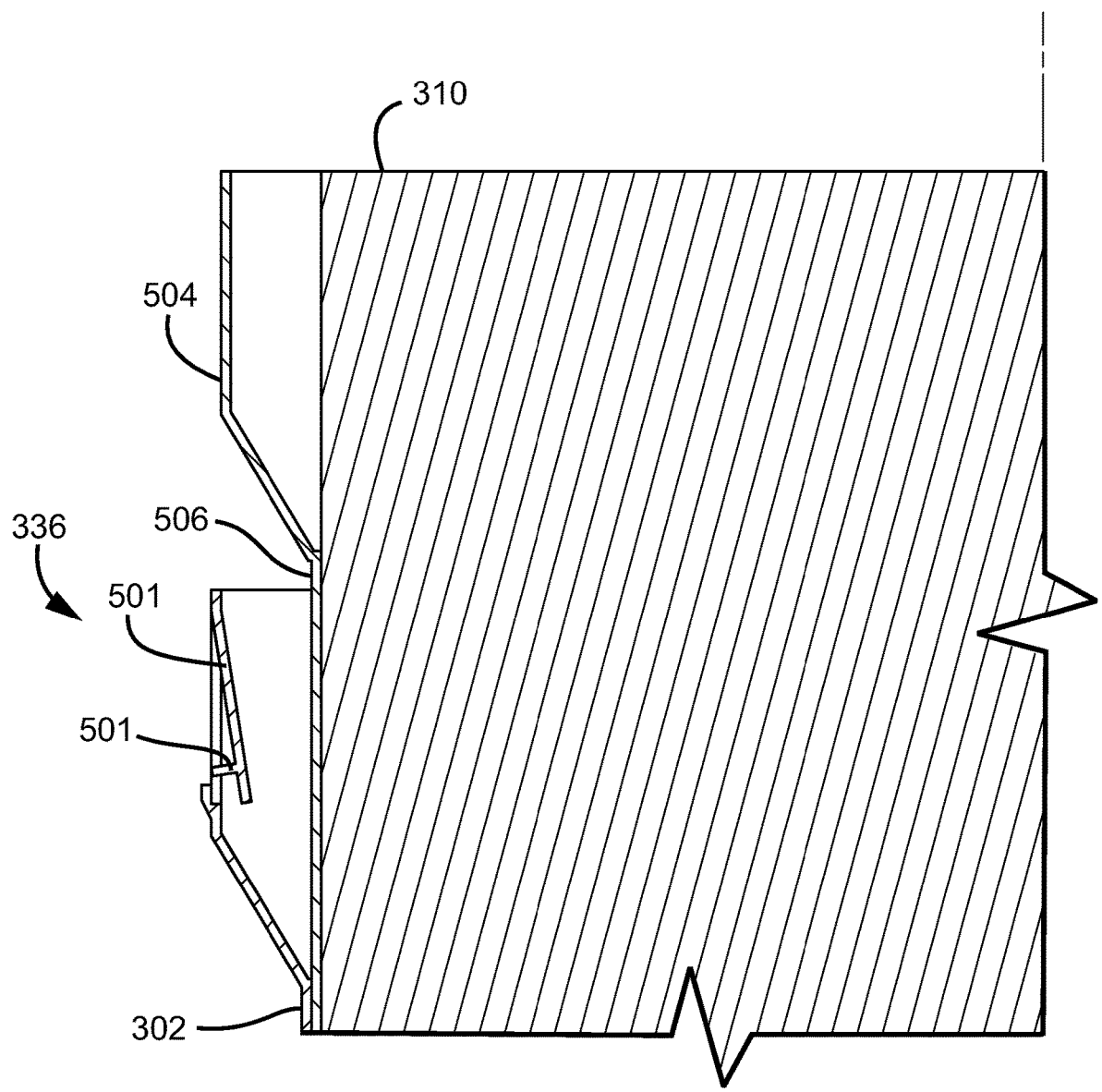
FIG. 38 is a schematic, cross-sectional view of the housing and element of FIG. 36 during one step of assembly.

The second part 336 includes a movable interference member, embodied as a latch member 500 having a latch tab 501 (FIG. 38). The latch member 500 is held by the housing 302, so that in a relaxed state, the interference member is in an interfering position; that is, when there is no filter element 310 located in the housing, the latch member 500 in the relaxed state is angled to prevent connecting with the first part 334 on the cover 308. In the example shown in FIG. 38, the latch member 500 is angled radially inwardly so that the latch tab 501 is extending radially inwardly toward the element 310, and the mating latch catch 502 (FIG. 40) cannot engage.

The movable latch member 500 is movable into a non-interfering position when a proper filter element 310 is installed in the housing 302. The filter element 310 includes one or more interference engagement members, embodied herein as plugs 504. The plugs 504 project radially from the sidewall 506 of the filter element 310. There can be the same number of plugs 504 as latch members 500, or there may be fewer plugs 504 than latch members 500. The plugs 504 extend along the sidewall 506 for only a portion of the length of the sidewall.

Figure 39:
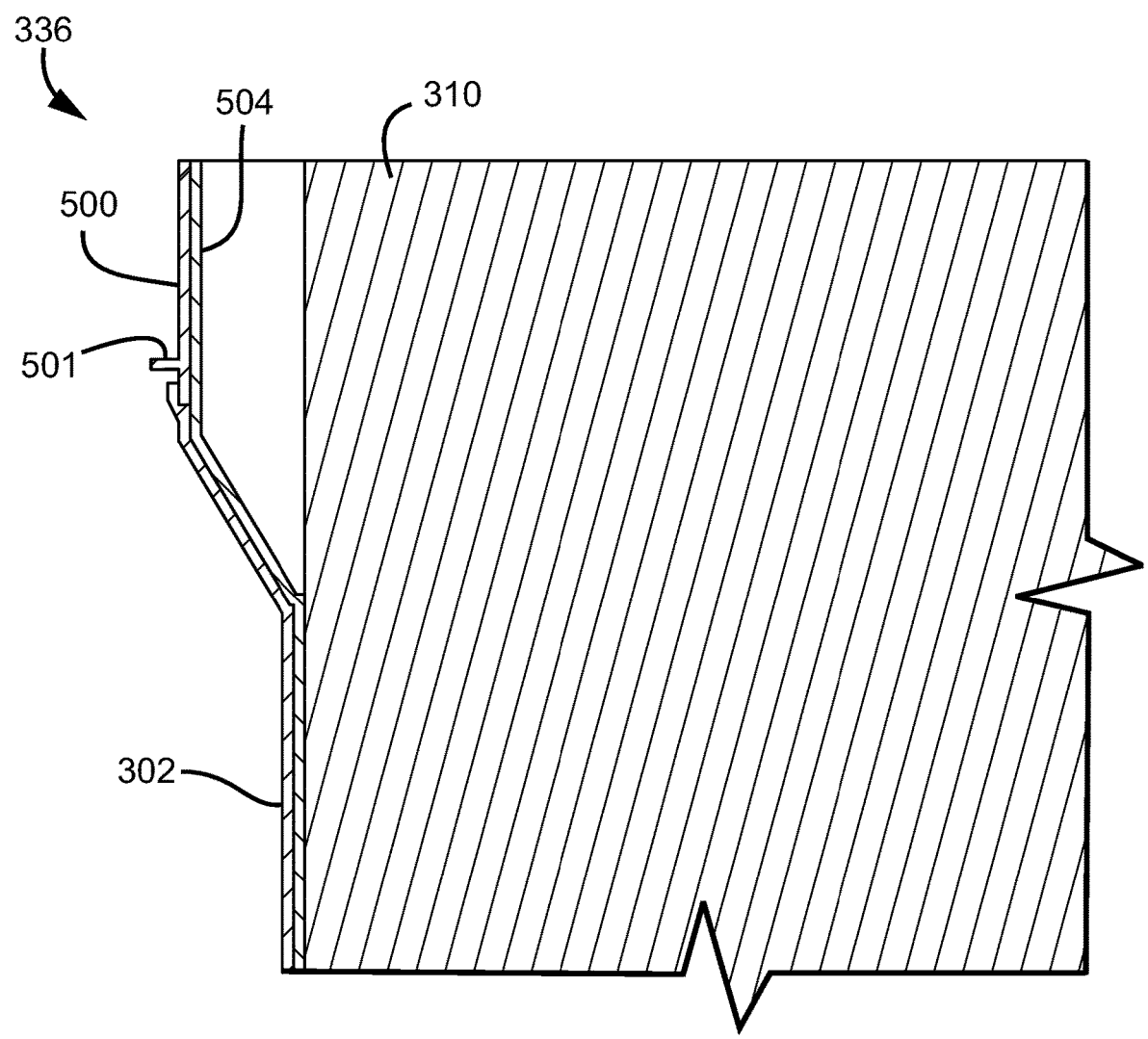
FIG. 39 is a schematic, cross-sectional view of the housing and element of FIG. 36 during one step of assembly.

From comparing FIGS. 38 and 39, it can be appreciated that when the filter element 310 is installed in the housing 302, the plugs 504 will engage against and move the latch member 500 radially outwardly to be positioned in the non-interfering position for engagement with the latch catch 502 on the cover 308. The cover 308 can be rotated or twisted relative to the housing 302 to move the latch catch 502 into secure engagement with the latch tab 501.

If no element or if the wrong element is installed in the housing 302, the cover 308 cannot be latched securely to the housing 302 because the latch tab 501 will not be in position for latching engagement.

Figure 40:
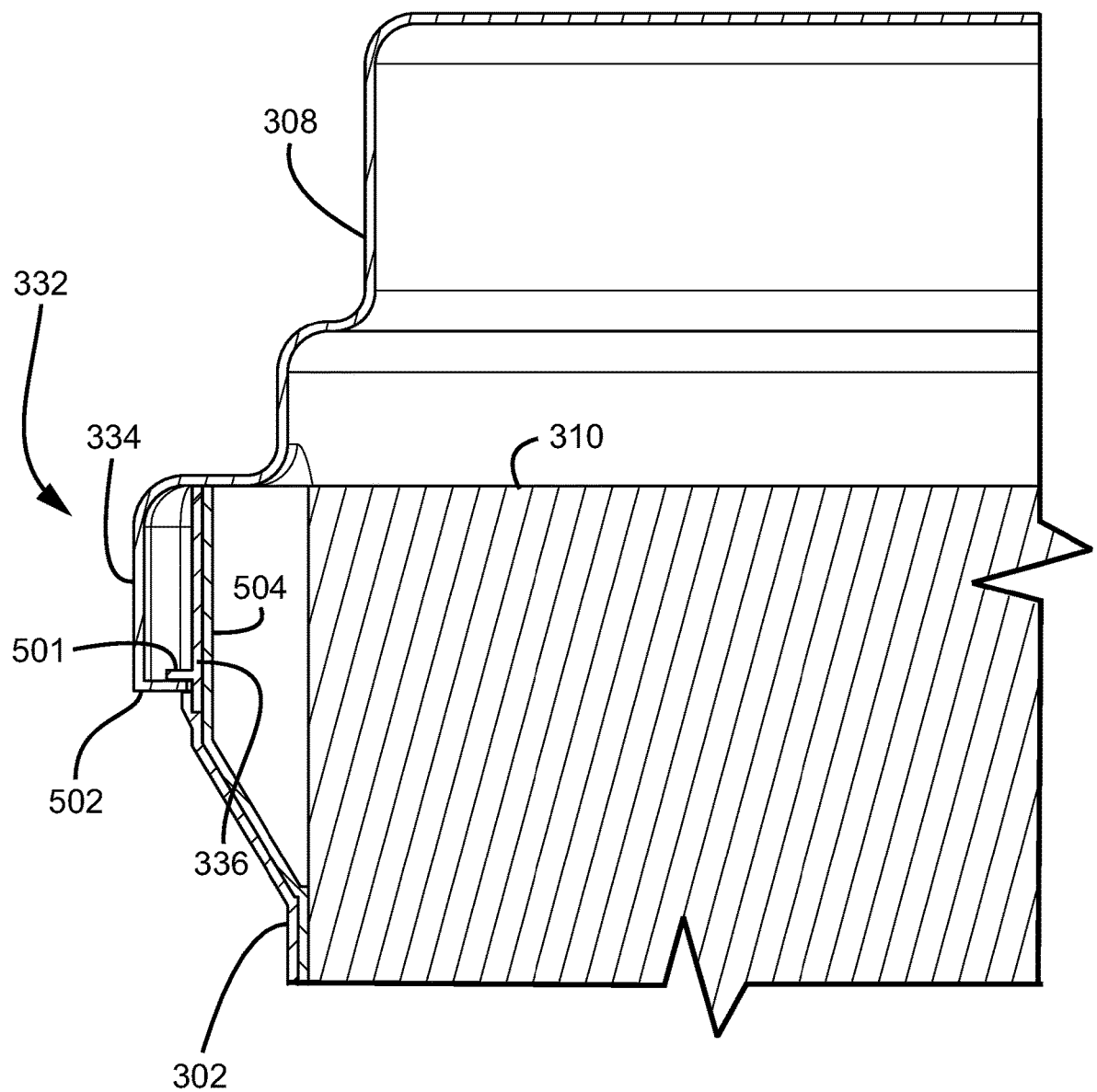
FIG. 40 is a schematic, cross-sectional view of the cover and housing and element of FIG. 36 in final assembly.
Figure 42:
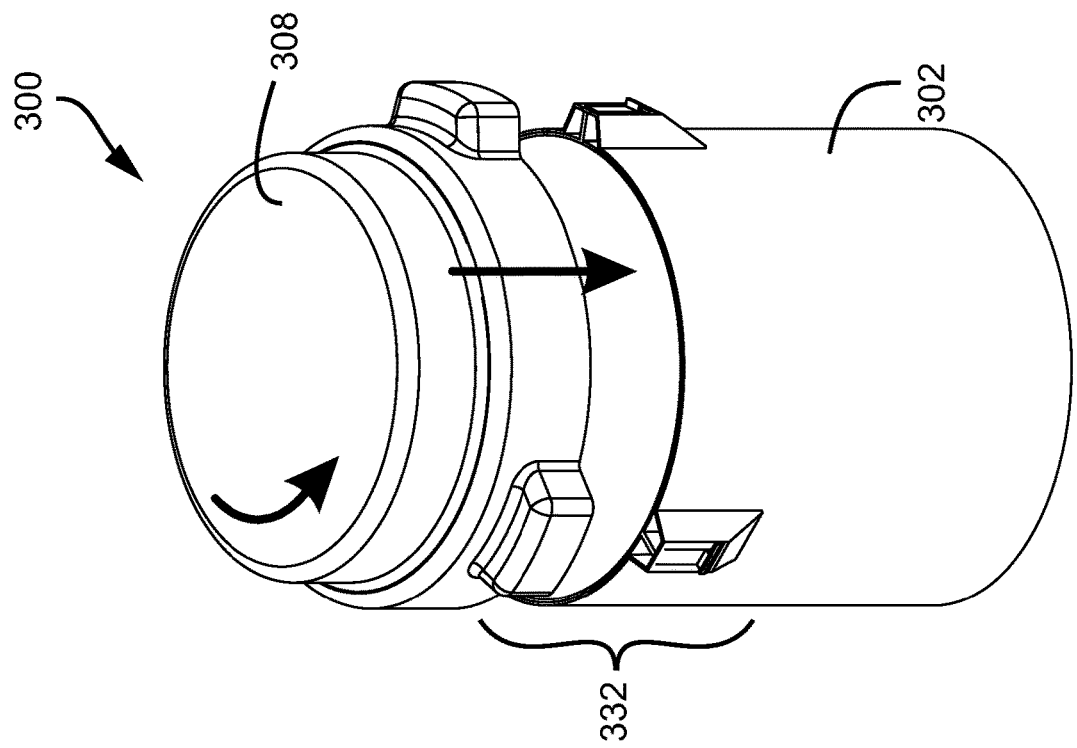
FIG. 42 is a perspective view of the air cleaner assembly of FIG. 41 during a further step of installation of the element.
Figure 41:
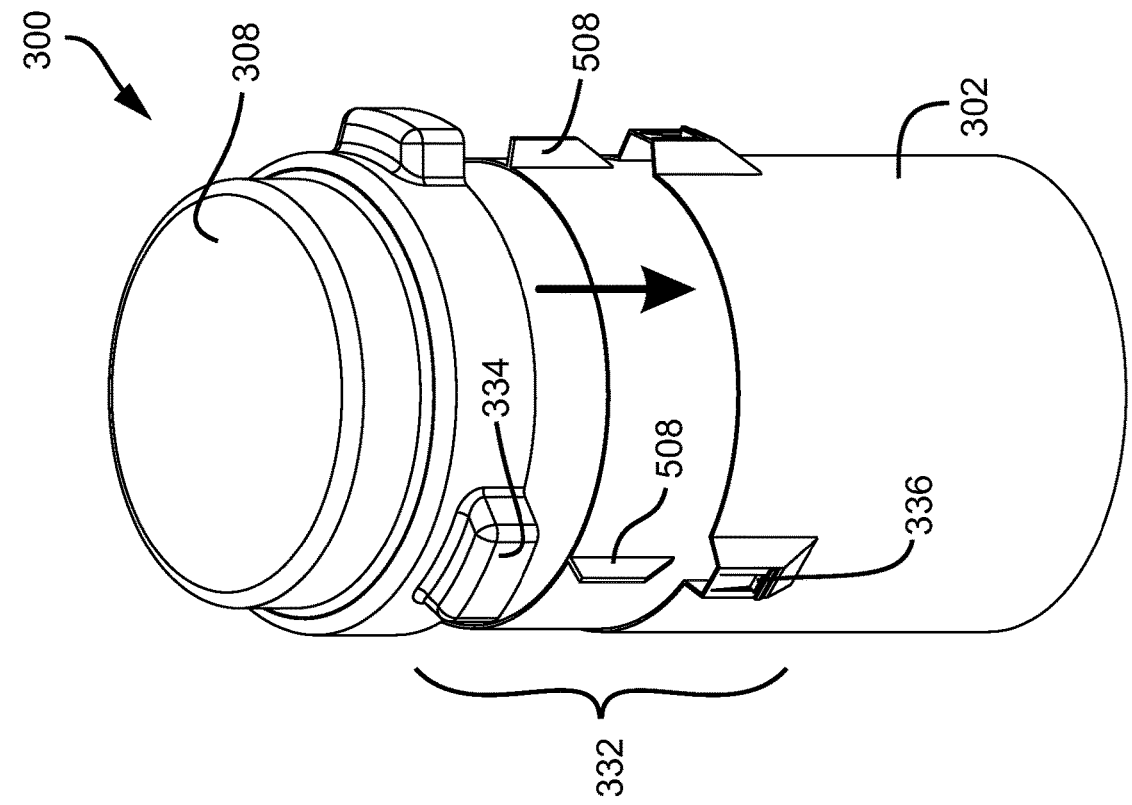
FIG. 41 is a perspective view of another embodiment of an air cleaner assembly, during a step of installation of the element.

FIGS. 41 and 42 are similar to the embodiment of FIGS. 38-40, except instead of plugs 504 on the element 310, there are ribs 508, which are thinner than the plugs 504. The ribs 508 function as interference engagement members.

C. FIG. 43

Figure 43:
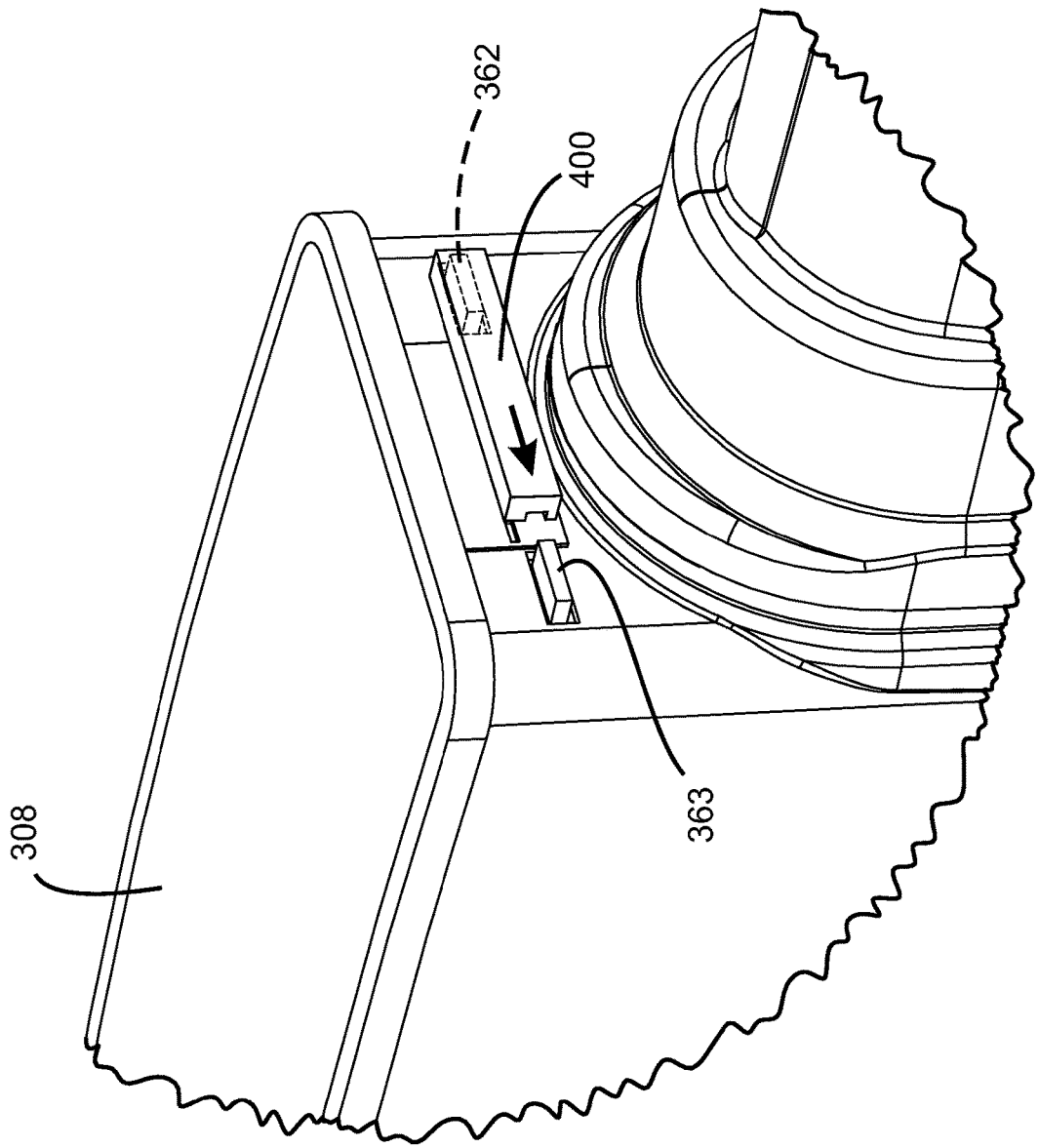
FIG. 43 is a schematic cross-sectional view of another embodiment.
Figure 45:
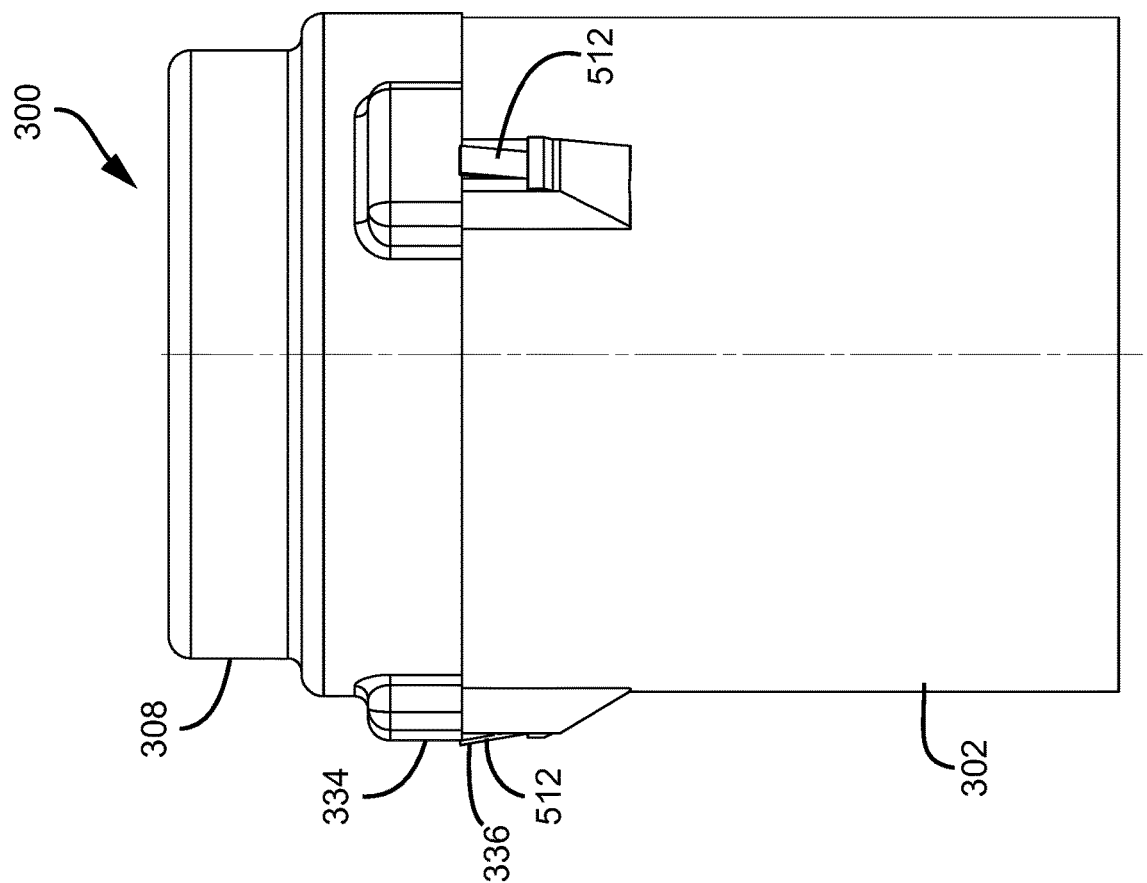
FIG. 45 is a perspective view of the air cleaner assembly of FIG. 44 during a further step of installation of the element.
Figure 44:
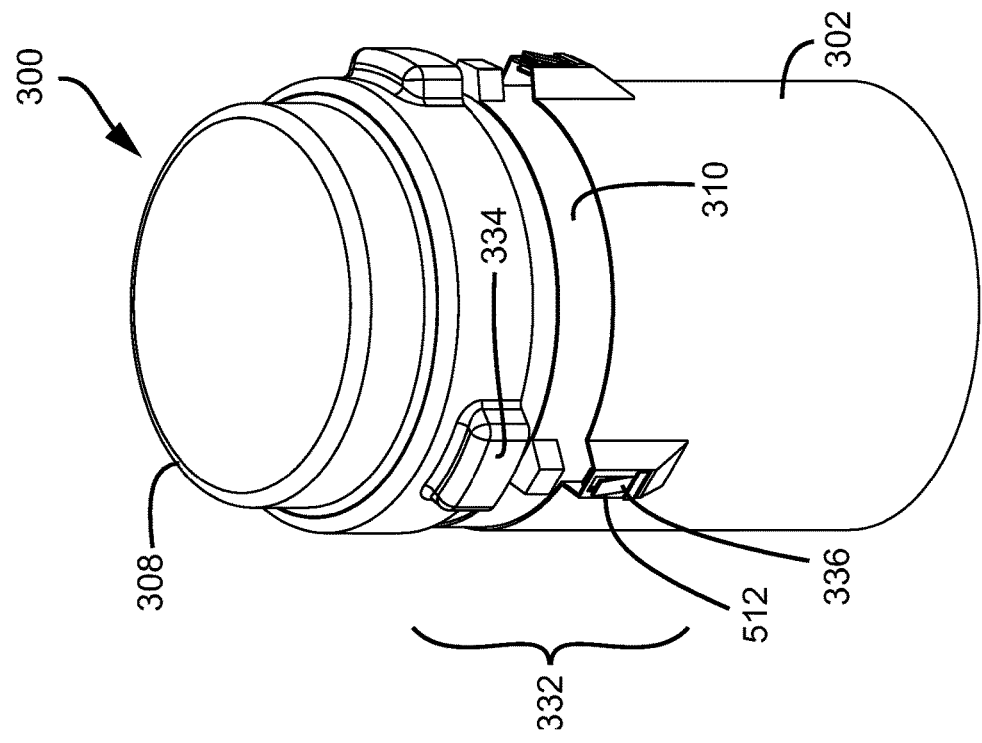
FIG. 44 is a perspective view of another embodiment of an air cleaner assembly, during a step of installation of the element.
Figure 47:
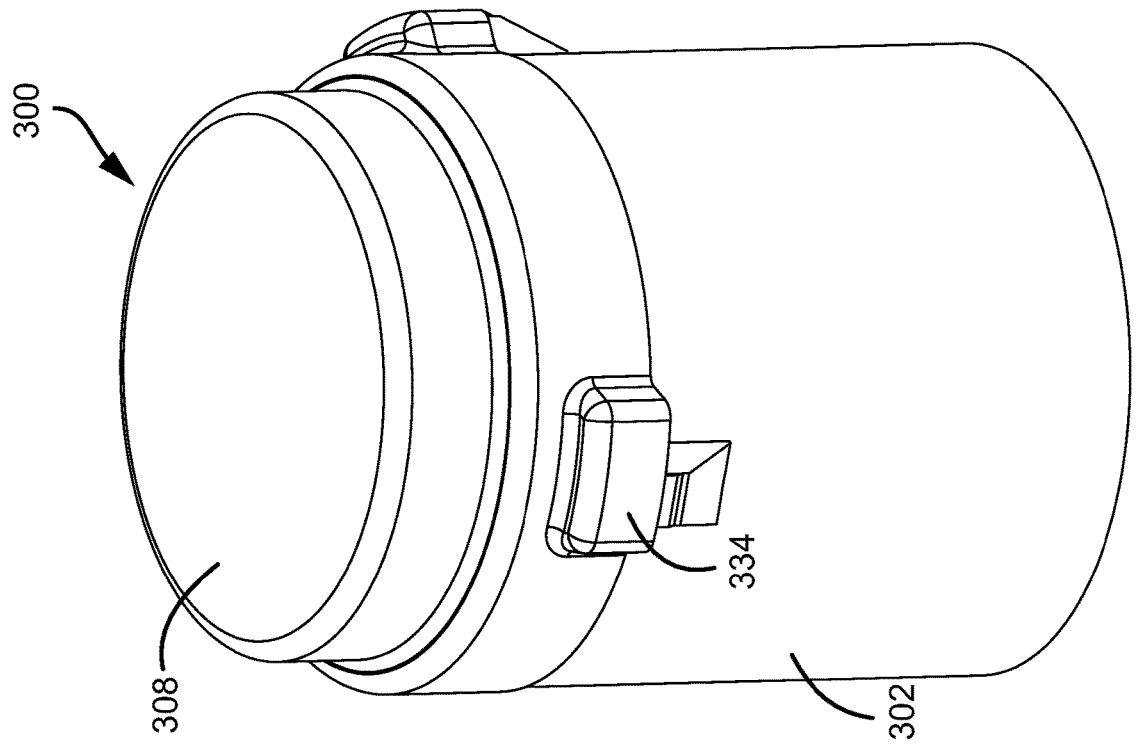
FIG. 47 is a perspective view of the air cleaner assembly of FIG. 44 during a further step of installation of the element.
Figure 46:
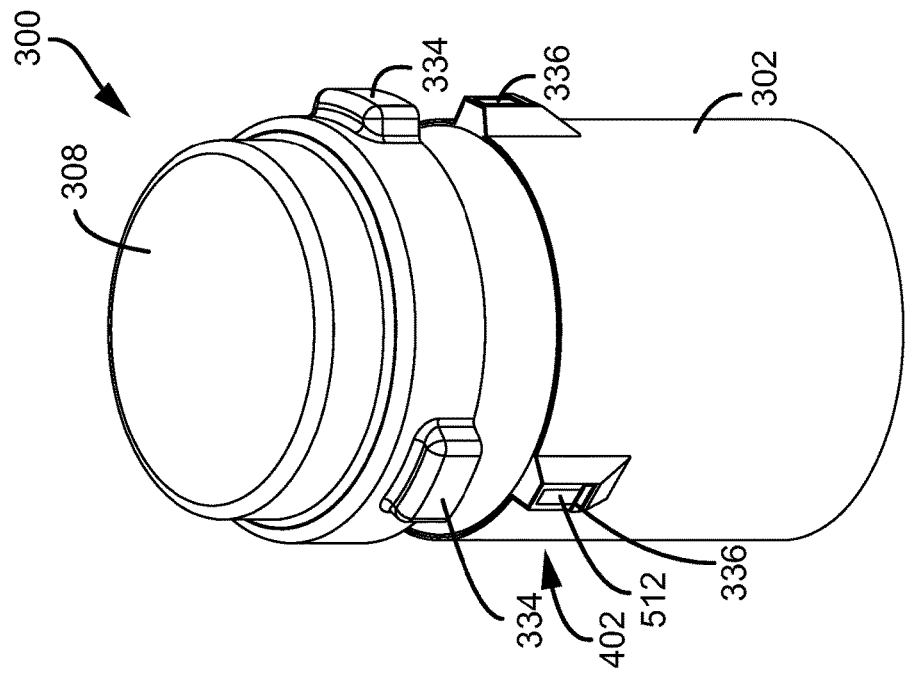
FIG. 46 is a perspective view of the air cleaner assembly of FIG. 44 during a further step of installation of the element.

In FIG. 43, the air cleaner assembly 300 of FIG. 29 is shown with a sliding rail 400. The sliding rail 400 can be part of the cover 308 and used to engage the tabs 362, 363 of the element.

D. FIGS. 44-49

In FIGS. 44-49, the air cleaner assembly 300 is similar to the assembly 300 of FIGS. 36-42. Also similar to the embodiment of FIGS. 36-42, this embodiment includes the filter element 310 moves a deformable interference member 402 to a non-interfering position, once the element 310 is properly installed in the housing 302.

As with the previous embodiment, the air cleaner assembly 300 includes two-part mating catch assembly 332. The two-part mating catch assembly 332 releasably mate when the filter element 310 is correctly and properly mounted within the interior volume 304 of the housing 302 and the cover 308 is correctly mounted in place over the access opening 306.

In this example, the first part 334 of the two-part mating catch assembly 332 is secured to the cover 308, and the second part 336 of the two-part mating catch assembly 332 is on the housing 302.

Prior to the element 310 being installed, the interference member 402 interferes with mounting of the cover 308 onto the housing 302. When the element 310 is installed in the housing, movement of the element 310 into the housing 302 will pull the interference member 402 out of the way, and out of interference to allow the cover 308 to mate with the housing 302. The deformable interference member 402 moves radially inwardly as the element 310 moves into the housing 302 and clears the stop for the cover 308.

The second part 336 includes the interference member 402, embodied as a flange 512 with an engagement arm 514. The flange 512 is held by the housing 302, so that in a relaxed state, the interference member 402 is in an interfering position; that is, when there is no filter element 310 located in the housing, the flange 512 in the relaxed state is angled to prevent connecting with the first part 334 on the cover 308. In the example shown in FIG. 48, the flange 512 is angled radially outwardly away from the element 310, and the mating catch 513 on the cover 308 cannot engage. The engagement arm 514 extends radially inwardly toward the element 310, and is connected to the flange 514 at a base, so that the flange 512 and arm 514 form a V or U-shape in cross-section. Radial inward movement of the arm 514 moves the flange 514 radially inwardly.

The movable flange 512 is movable into a non-interfering position when a proper filter element 310 is installed in the housing 302. The filter element 310 includes interference engagement members, embodied herein as plugs 504. The plugs 504 project radially from the sidewall 506 of the filter element 310. There can be the same number of plugs 504 as flanges 512, or there may be fewer plugs 504 than flanges 512.

Figure 48:
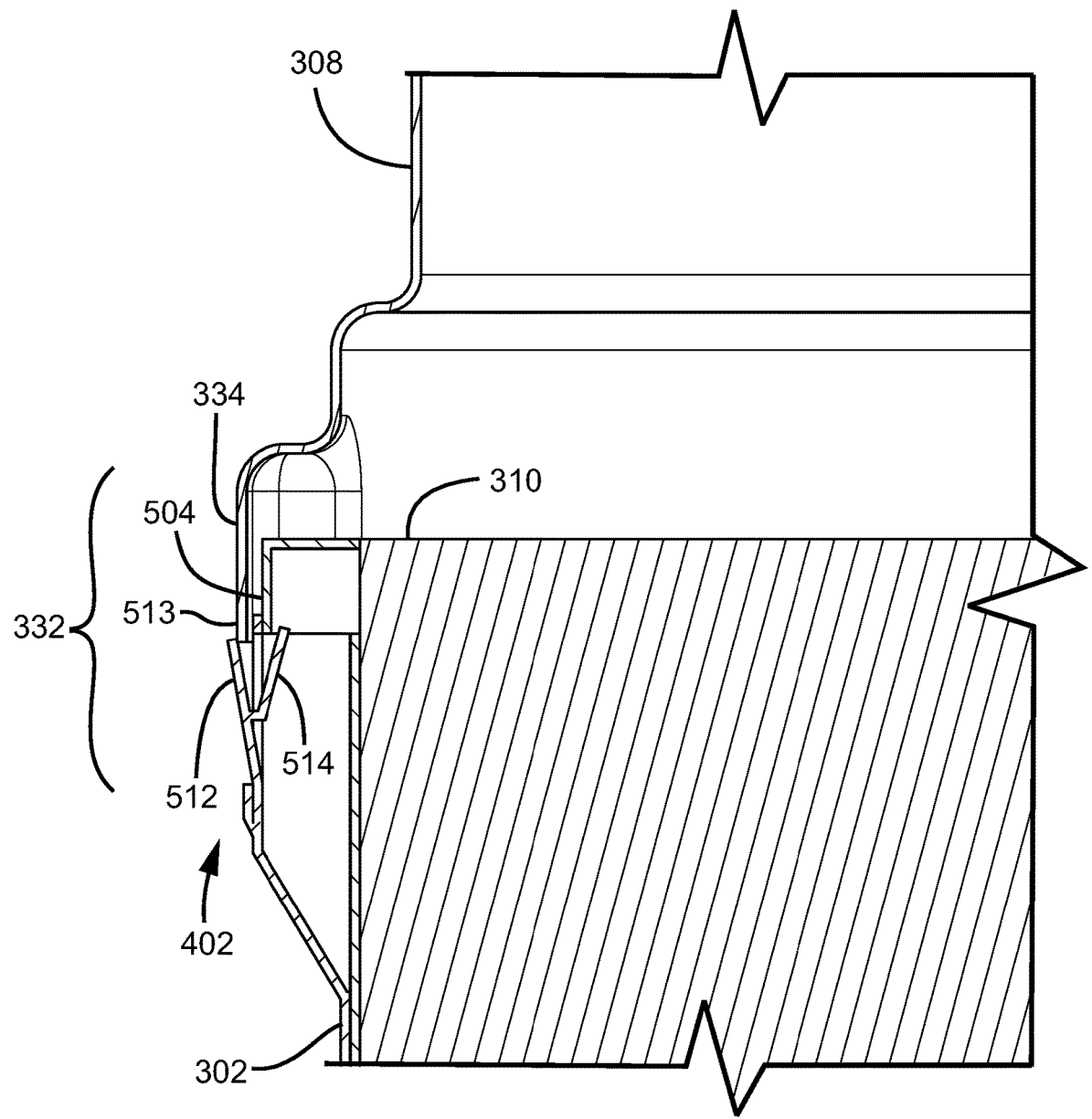
FIG. 48 is a schematic, cross-sectional view of the housing and element of FIG. 44 during one step of assembly.
Figure 49:
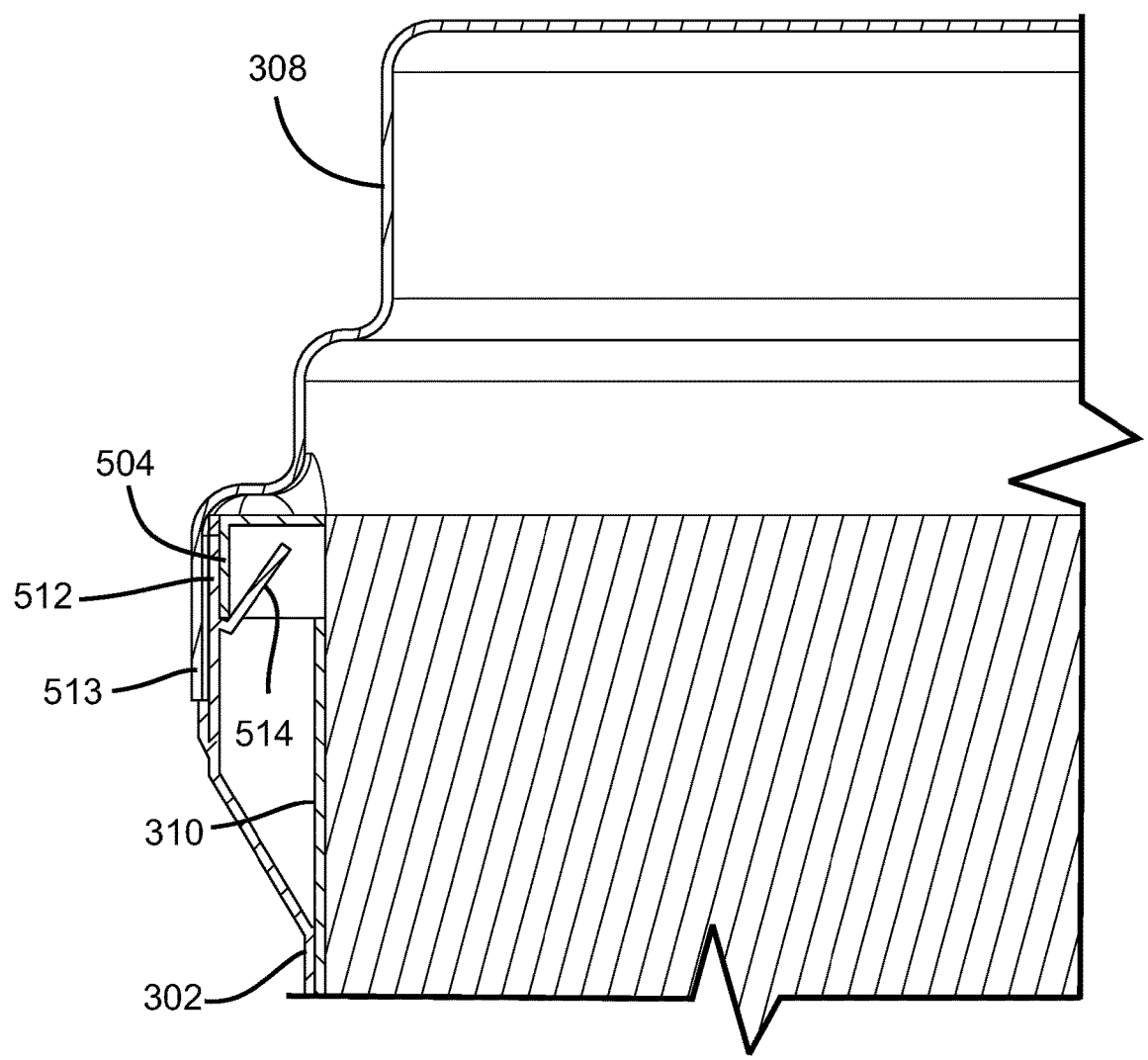
FIG. 49 is a schematic, cross-sectional view of the cover and housing and element of FIG. 44 in final assembly.
Figure 53:
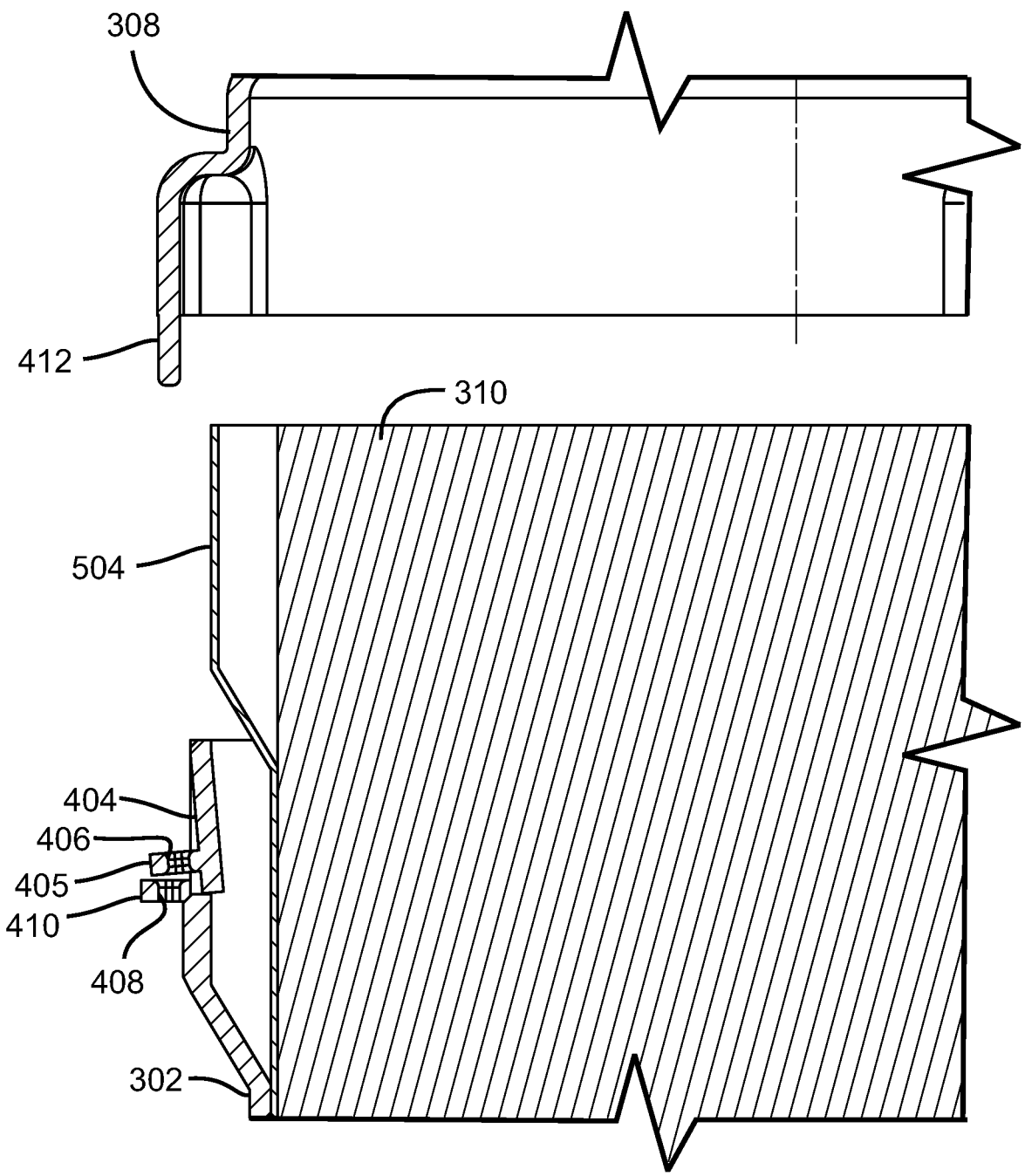
FIG. 53 is a schematic, cross-sectional view of the housing and element of FIG. 50 during one step of assembly.

From comparing FIGS. 48 and 49, it can be appreciated that when the filter element 310 is installed in the housing 302, the plugs 504 will engage against and move the arm 514 radially inwardly, which moves the flange 512 radially inwardly to be positioned in the non-interfering position for engagement with the catch 513 on the cover 308. The cover 308 can be rotated or twisted relative to the housing 302 to move the catch 513 into secure engagement over the flange 512.

If no element or if the wrong element is installed in the housing 302, the cover 308 cannot be secured to the housing 302 because the protruding flange 512 will block the cover 308.

E. FIGS. 50-58

In FIGS. 50-58, the air cleaner assembly 300 is similar to the assembly 300 of FIGS. 38-42. In this embodiment, the filter element 310 moves a deformable interference member to a non-interfering position, once the element 310 is properly installed in the housing 302.

As with the previous embodiment, the air cleaner assembly 300 includes two-part mating catch assembly 332. The two-part mating catch assembly 332 releasably mate when the filter element 310 is correctly and properly mounted within the interior volume 304 of the housing 302 and the cover 308 is correctly mounted in place over the access opening 306.

In this example, the first part 334 of the two-part mating catch assembly 332 is secured to the cover 308, and the second part 336 of the two-part mating catch assembly 332 is on the housing 302.

The filter element 310 has interference engagement members, embodied as radially outwardly extending plugs 504 used to push the interference member, embodied herein as radially inwardly deflectable flange 404 defined by the housing 302, when the element 310 is installed in the housing 302. The deflectable flange 404 has a tab 405 perpendicular to the flange 404. The tab includes a through-aperture 406. The aperture 406 needs to be in alignment and coaxial with an aperture 408 defined in a fixed housing tab 410 extending radially outwardly from the housing 302.

Figure 54:
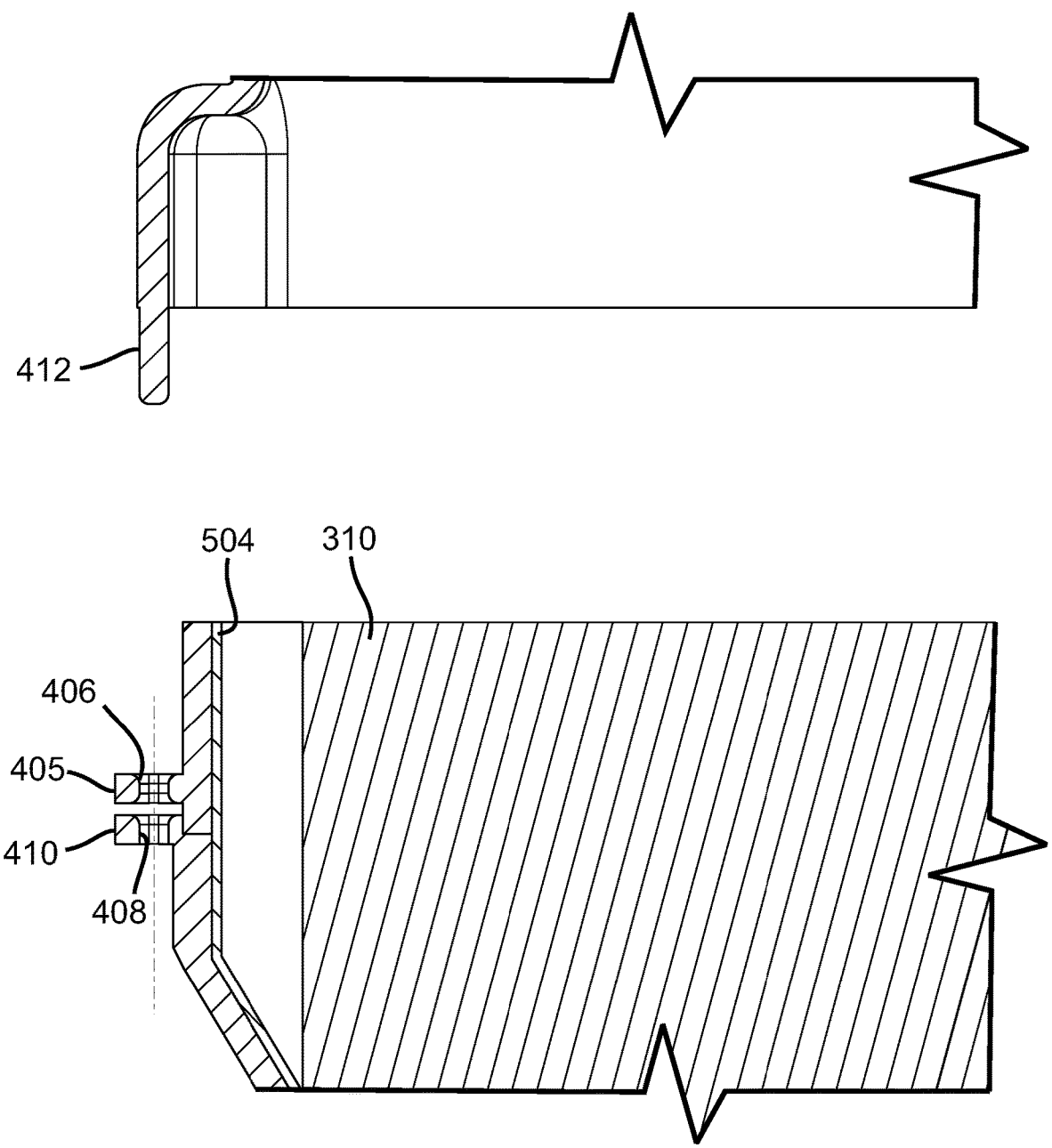
FIG. 54 is a schematic, cross-sectional view of the housing and element of FIG. 50 during one step of assembly.
Figure 55:
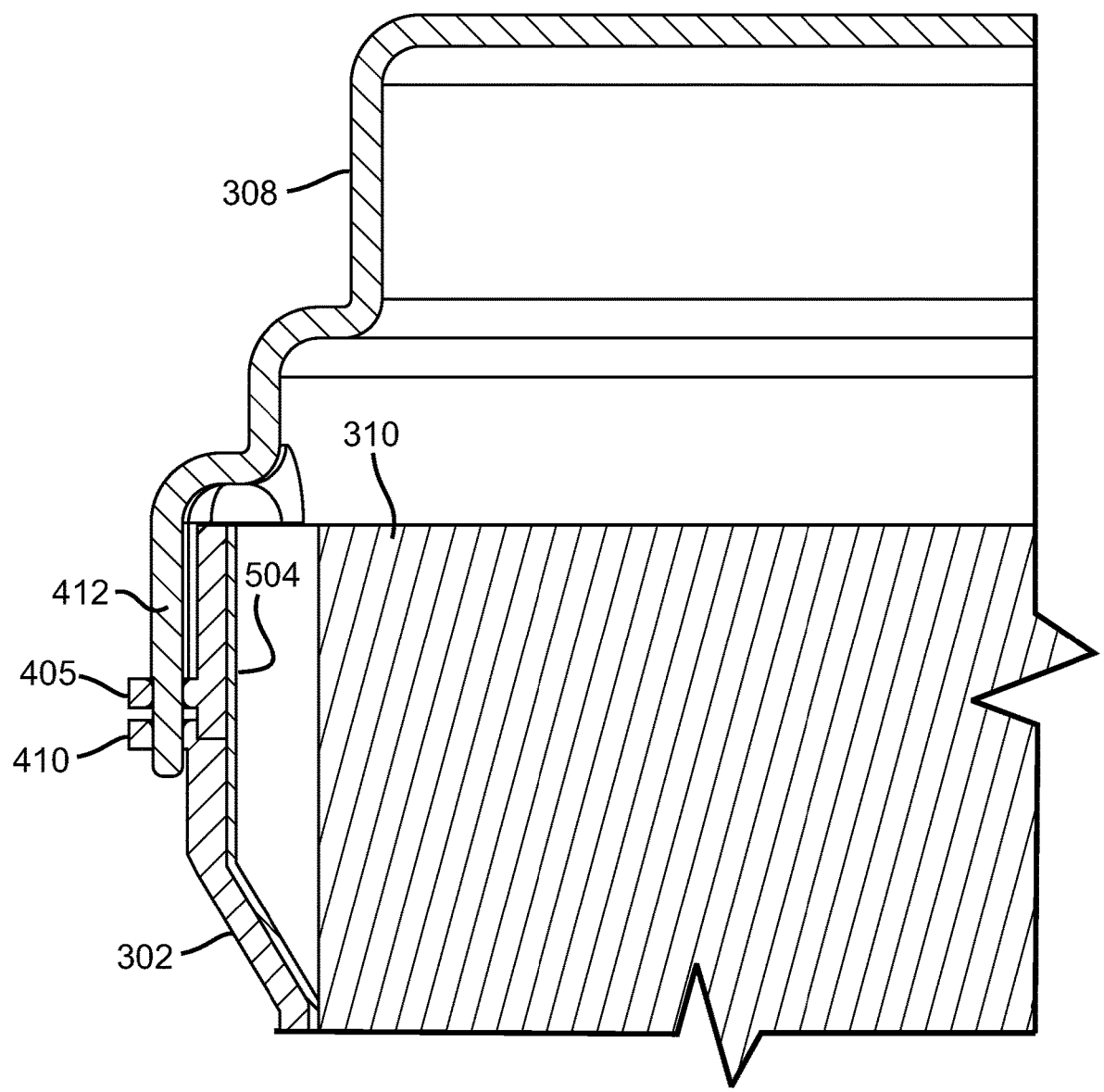
FIG. 55 is a schematic, cross-sectional view of the cover and housing and element of FIG. 50 in final assembly.

FIG. 54 shows the apertures 406, 408 in axial alignment, after the interference member (flange 404) is moved to the non-interfering position. The aligned apertures 406, 408 receive a latch member 412 on the cover 308 (FIG. 55).

If the element 310 is not properly installed within the housing 302, the deflectable flange 404 will be radially inward (FIG. 53), and the apertures 406, 408 will not be in alignment with each other, which will prevent the cover 308 from being properly installed.

FIGS. 56-58 are similar to FIGS. 50-55, except instead of plugs 504, the filter element 310 has ribs 508, functioning as interference engagement members.

In alternative arrangements, the embodiments of FIGS. 50-58 could use a radially outwardly extending flange instead of the radially inwardly deflecting flange 404.

F. FIGS. 59-60

Figure 59:
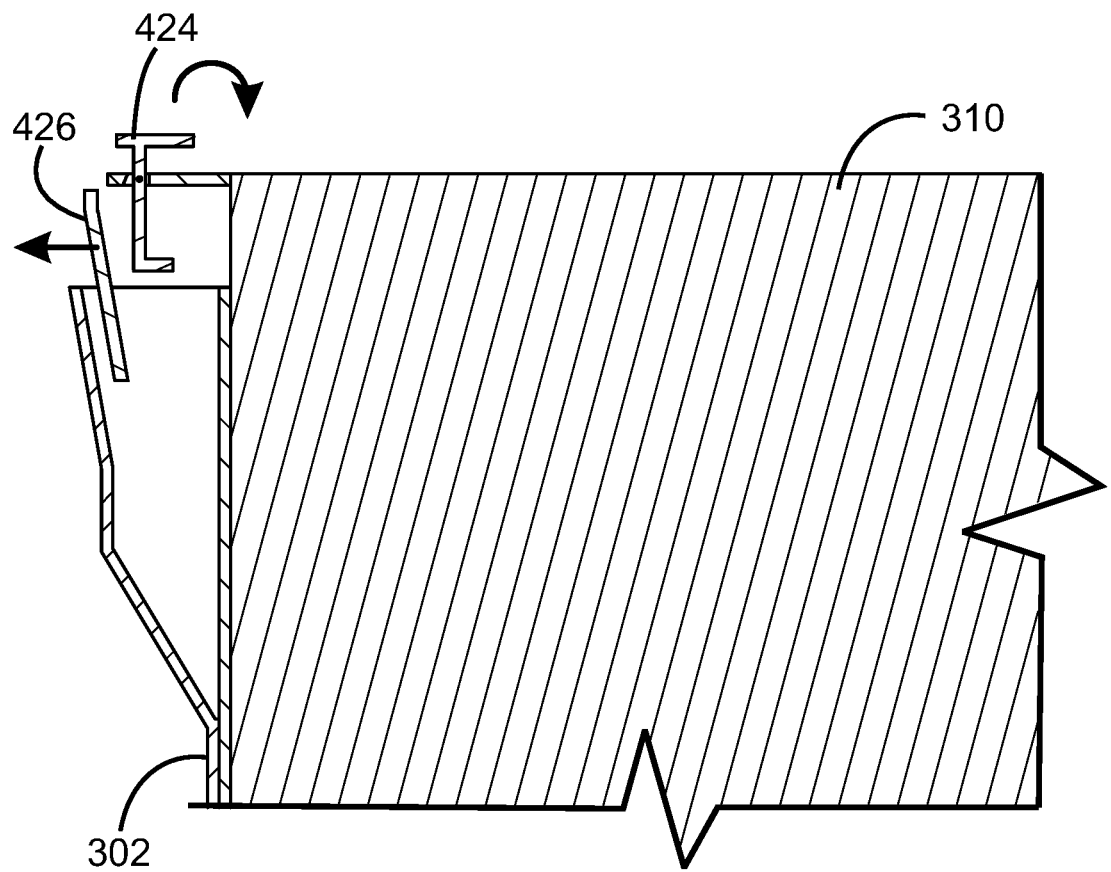
FIG. 59 is a schematic cross-sectional view of another embodiment.

In the embodiment of FIG. 59, the filter element 310 has a rotation member 424 that rotates in order to move an interference member 426, which then allows the element 310 to be seated within the housing 302 and the cover 308 secured thereto. The rotation member 424 deflects the interference member 426 to allow for proper installation.

Figure 60:
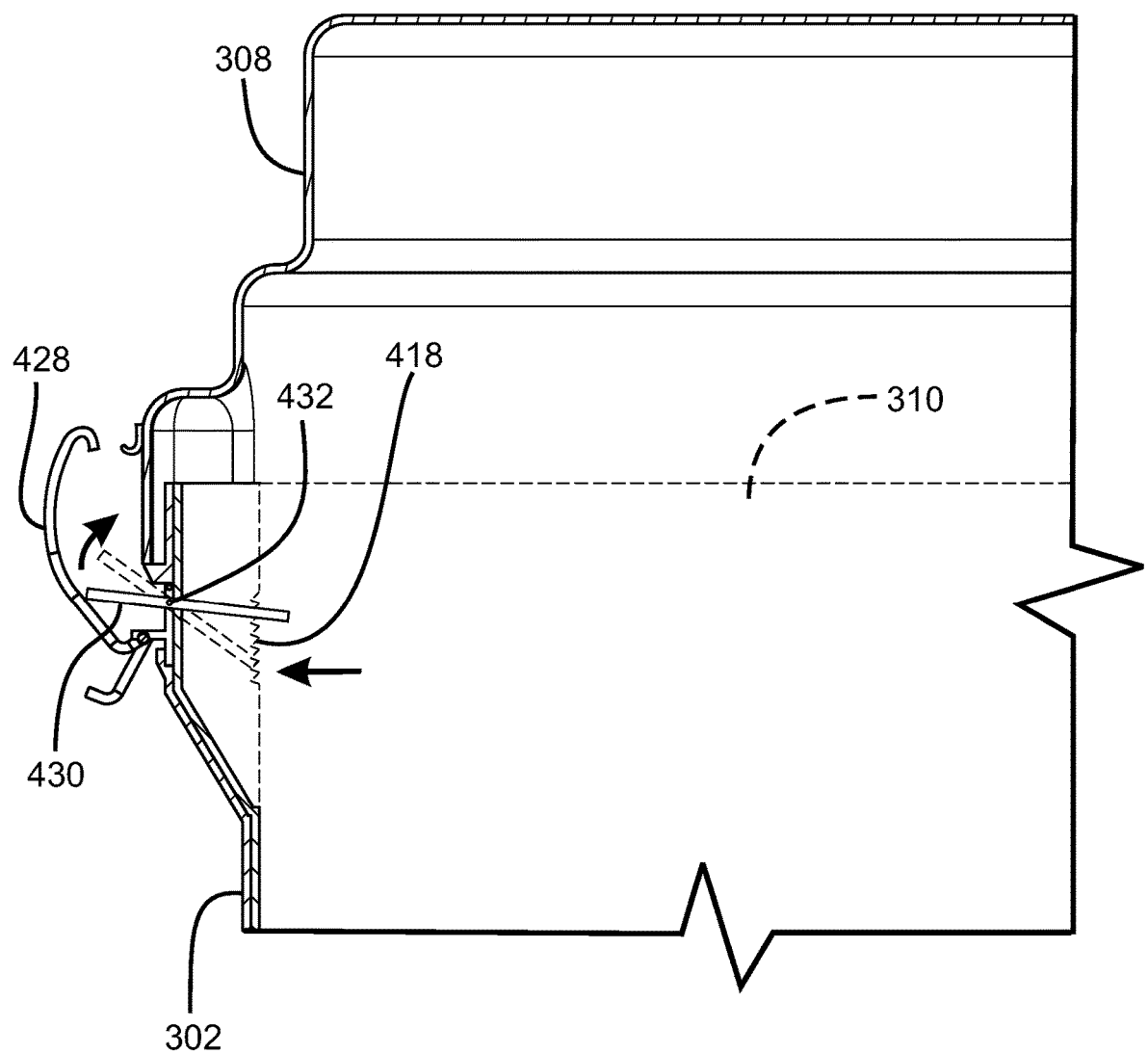
FIG. 60 is a schematic cross-sectional view of another embodiment.
Figure 63:
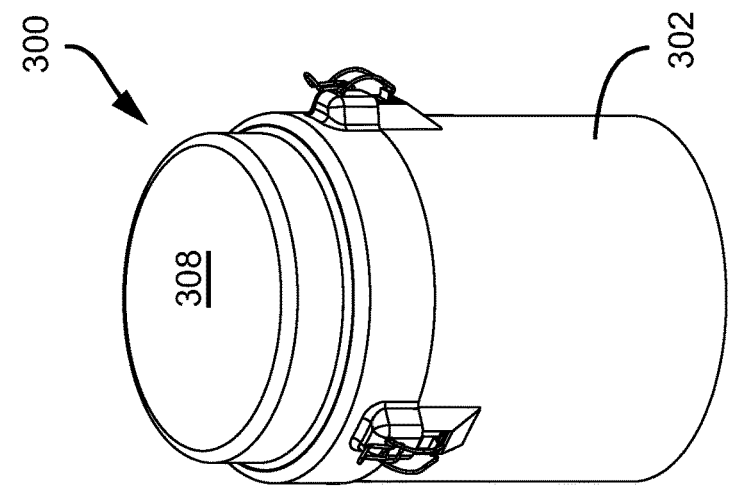
FIG. 63 is a perspective view of the air cleaner assembly of FIG. 61 during a further step of installation of the element.
Figure 62:
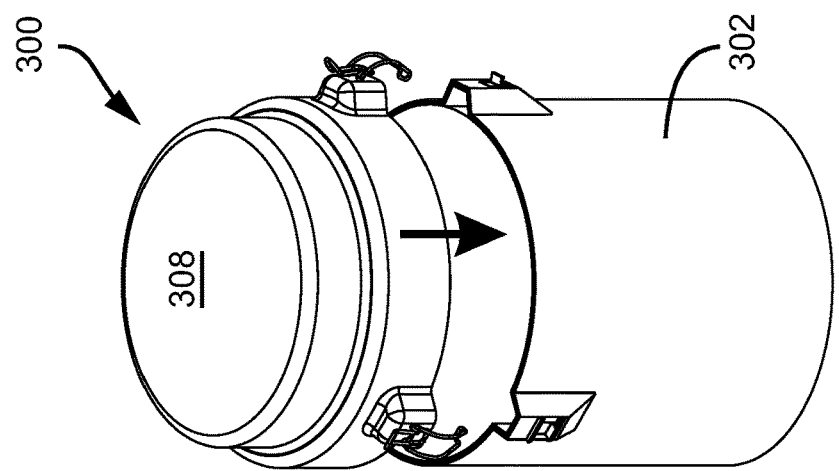
FIG. 62 is a perspective view of the air cleaner assembly of FIG. 61 during a further step of installation of the element.
Figure 61:
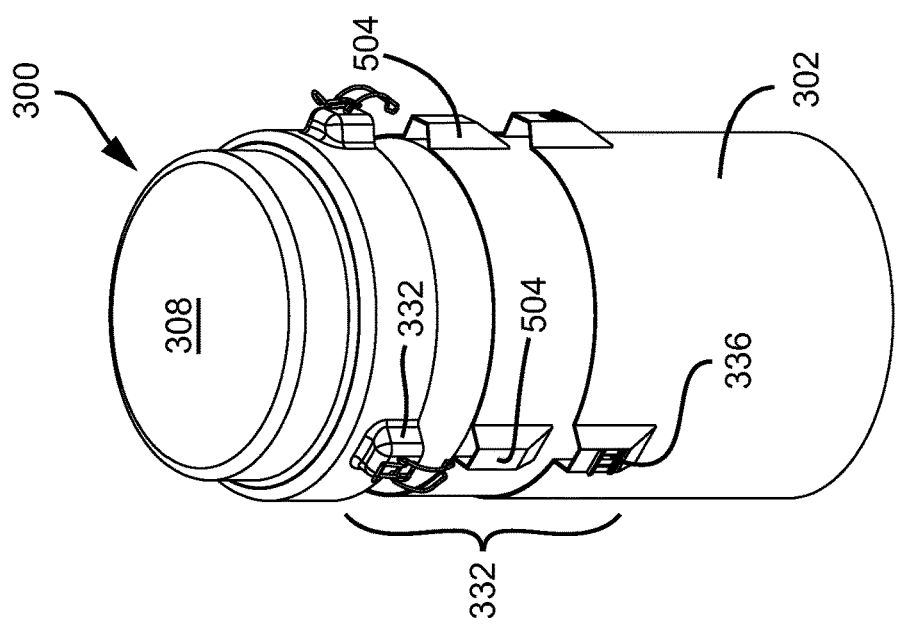
FIG. 61 is a perspective view of another embodiment of an air cleaner assembly, during a step of installation of the element.

In the embodiment of FIG. 60, a latch 428 is shown secured to the housing 302, but it could also be secured to the cover 308. An interference member 430 will cause interference and prevent the latch 428 from being able to connect the cover 308 to the housing 302, unless the filter element 310 is installed and moves the interference member 430 out of the way to not be interfering. The element 310 pushes the interference member 430 down, which rotates or pivots the interference member 430 about pivot point 432, and this moves the interference member 430 out of the way to allow the cover 308 to be positioned within the housing body 302 and allow the latch 428 to secure the cover 308 and housing 302 together.

G. FIGS. 61-66

In FIGS. 61-66, the air cleaner assembly 300 is similar to the assembly 300 of FIGS. 38-42. As with the previous embodiments, in this embodiment, the filter element 310 moves a deformable interference member to a non-interfering position, once the element 310 is properly installed in the housing 302.

The air cleaner assembly 300 includes two-part mating catch assembly 332. The two-part mating catch assembly 332 releasably mate when the filter element 310 is correctly and properly mounted within the interior volume 304 of the housing 302 and the cover 308 is correctly mounted in place over the access opening 306.

In this example, the first part 334 of the two-part mating catch assembly 332 is secured to the cover 308, and the second part 336 of the two-part mating catch assembly 332 is on the housing 302.

The filter element 310 has interference engagement members, embodied as radially outwardly extending plugs 504 (which could also be ribs 508) used to push the interference member, embodied herein as a pivoting member 436.

The pivoting member 436 includes an arm 440 pivoting about a hinge point 438. Extending perpendicular from the arm 440 is a finger 446 with a catch 448. The pivoting member 436 prevents mating of the cover 308 and housing 302, unless the element 310 is properly installed.

Figure 64:
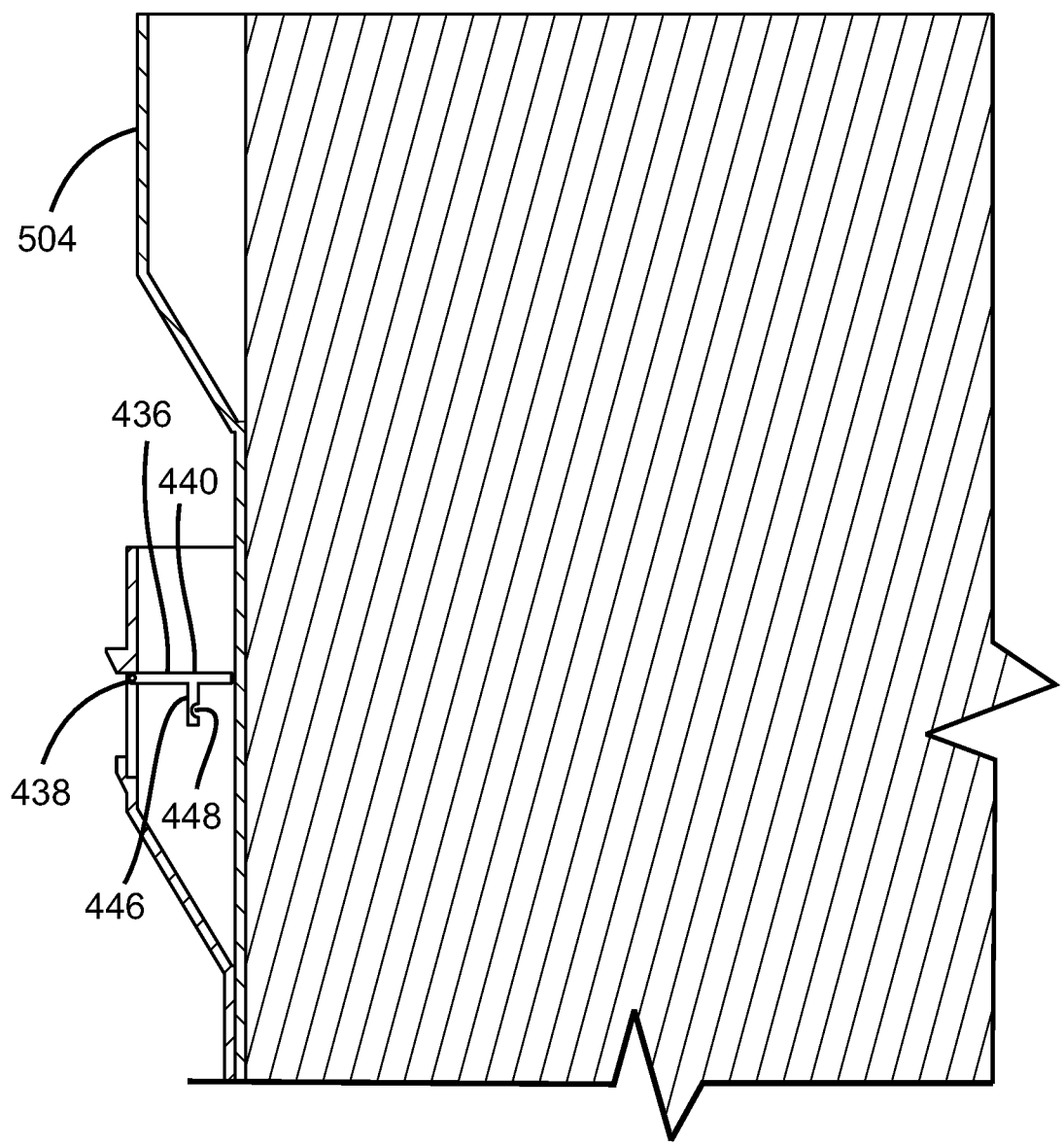
FIG. 64 is a schematic, cross-sectional view of the housing and element of FIG. 61 during one step of assembly.
Figure 66:
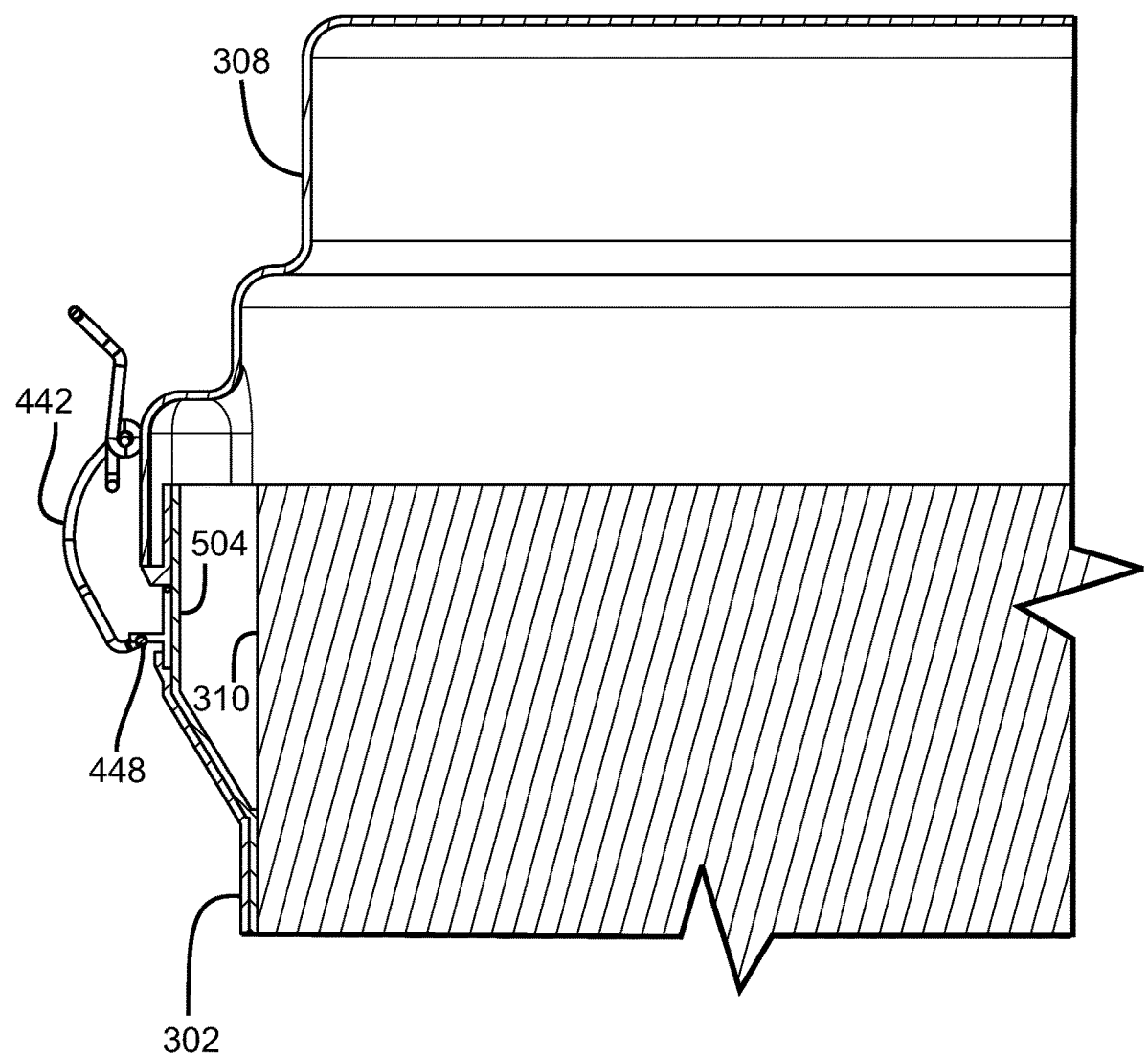
FIG. 66 is a schematic, cross-sectional view of the cover and housing and element of FIG. 61 in final assembly.

When the filter element 310 is being installed in the housing 302, the plugs 504 push down on the pivoting member 436, which will pivot or rotate the arm 440 from the interfering (horizontal) position shown in FIG. 64 to the non-interfering and engaging (vertical) position shown in FIG. 65. In the engaging position, the finger 446 extends along a plane perpendicular to the sidewall 506 of the element 310, and the catch 448 faces downward and away from the cover 302. This rotation allows the cover 302 and housing 308 to be secured together by the latch 442 engaging the catch 448, as shown in FIG. 66.

The above represents example principles. Many embodiments can be made using these principles.

What is claimed is:

1. An air cleaner assembly comprising:
   (a) a housing having an interior volume and an access opening in communication with the interior volume;
   (b) a cover removably oriented over the access opening;
   (c) a filter element removably oriented in the interior volume of the housing;
   (d) a two-part mating catch assembly;
      (i) a first part of the two-part mating catch assembly being secured to the cover;
      (ii) a second part of the two-part mating catch assembly being secured to the filter element;
      (iii) the first part and second part of the catch assembly being positioned to releasably mate when the filter element is operably mounted within the housing interior volume; and
      (iv) the second part extending through an opening in the housing, when the filter element is operably mounted within the housing interior volume.

2. The air cleaner of claim 1 wherein the filter element includes a frame surrounding filter media, and an ear construction extending from the frame; the second part projecting from the ear construction.

3. The air cleaner of claim 2 wherein the filter element has a longitudinal axis extending therethrough; and the second part projects from the ear construction parallel to the longitudinal axis.

4. The air cleaner of claim 3 wherein the filter element includes z-media forming opposite flow faces; the longitudinal axis passes through both flow faces; and the second part includes a pair of tabs located laterally spaced from the z-media and projecting in a direction away from the flow faces and the z-media.

5. The air cleaner of claim 2 wherein the ear construction includes a pair of ears each extending from the frame.

6. The air cleaner of claim 1 wherein the first part of the two-part catch assembly is a latch, and the second part is a keeper.

7. The air cleaner of claim 1 wherein:
   (a) the filter element includes a media pack comprising filter media and having first and second, opposite, flow faces;
      (i) the first flow face comprising an inlet flow face;
      (ii) the second flow face comprising an outlet flow face; and
      (iii) the media pack being configured to filter air flowing into the inlet flow face prior to the air exiting the outlet flow face;
   (b) a frame mounted to the media pack; and
   (c) a seal arrangement positioned on the frame;
      (i) the seal arrangement comprising a seal member oriented to releasably, sealingly engage the housing.

8. The air cleaner of claim 7 wherein the seal member is radially directed and is oriented to form a radial seal with the housing.

9. The air cleaner of claim 1 wherein the filter element includes an ear construction extending from a frame; the ear construction having a projection arrangement therefrom.

10. The air cleaner of claim 1 wherein the filter element is racetrack-shaped having opposite curved ends joined by straight sides.

11. An air cleaner assembly comprising:
   (a) a housing having an interior volume and an access opening in communication with the interior volume;
   (b) a cover removably oriented over the access opening;
   (c) a filter element removably oriented in the interior volume of the housing;
   (d) a two-part mating catch assembly;
      (i) a first part of the two-part mating catch assembly being secured to the cover;
      (ii) a second part of the two-part mating catch assembly integral with the housing and being movable radially outward from a remaining portion of the housing when the filter element is operably mounted within the housing interior volume;
      (iii) the first part and second part of the catch assembly being positioned to releasably mate when the filter element is operably mounted within the housing interior volume; and
   wherein the filter element is constructed and arranged to push the second part radially outward from the remaining portion of the housing when the filter element is operably mounted within the housing interior volume.

12. The air cleaner of claim 11 wherein the first part of the two-part catch assembly is a latch, and the second part is a keeper.

13. The air cleaner of claim 11 wherein:
   (a) the filter element includes a media pack comprising filter media and having first and second, opposite, flow faces;
      (i) the first flow face comprising an inlet flow face;
      (ii) the second flow face comprising an outlet flow face; and
      (iii) the media pack being configured to filter air flowing into the inlet flow face prior to the air exiting the outlet flow face;
   (b) a frame mounted to the media pack; and
   (c) a seal arrangement positioned on the frame;
      (i) the seal arrangement comprising a seal member oriented to releasably, sealingly engage the housing.

14. The air cleaner of claim 13 wherein the seal member is radially directed and is oriented to form a radial seal with the housing.

15. The air cleaner of claim 11 wherein the filter element is racetrack-shaped having opposite curved ends joined by straight sides.

16. An air cleaner assembly comprising:
   (a) a housing having an interior volume and an access opening in communication with the interior volume;
   (b) a cover removably oriented over the access opening;
   (c) a filter element removably oriented in the interior volume of the housing;
      (i) the filter element including a frame surrounding filter media, a longitudinal axis extending therethrough, and an ear construction extending from the frame;
      (ii) the ear construction including a projection arrangement therefrom; the projection arrangement extending in a direction parallel to the longitudinal axis; the projection arrangement including one or more tabs;
   (d) a two-part mating catch assembly;
      (i) a first part of the two-part mating catch assembly being secured to the cover;
      (ii) a second part of the two-part mating catch assembly being on one of the housing and the filter element; and
      (iii) the first part and second part of the catch assembly being positioned to releasably mate when the filter element is operably mounted within the housing interior volume
   wherein the filter element includes z-media forming opposite flow faces; the longitudinal axis passes through both flow faces; and the one or more tabs are located laterally spaced from the z-media and projecting in a direction away from the flow faces and the z-media.

17. The air cleaner of claim 16, wherein the one or more tabs are positioned such that when the filter element is operably mounted within the housing interior volume, the tabs push the second part radially outward from the remaining portion of the housing.

18. The air cleaner of claim 16 wherein the first part of the two-part catch assembly is a latch, and the second part is a keeper.

19. The air cleaner of claim 16 wherein:
  (a) the filter element includes a media pack comprising filter media and having first and second, opposite, flow faces;
    (i) the first flow face comprising an inlet flow face;
    (ii) the second flow face comprising an outlet flow face; and
    (iii) the media pack being configured to filter air flowing into the inlet flow face prior to the air exiting the outlet flow face;
  (b) a frame mounted to the media pack; and
  (c) a seal arrangement positioned on the frame;
    (i) the seal arrangement comprising a seal member oriented to releasably, sealingly engage the housing.

20. The air cleaner of claim 19 wherein the seal member is radially directed and is oriented to form a radial seal with the housing.

21. The air cleaner of claim 16 wherein the filter element is racetrack-shaped having opposite curved ends joined by straight sides.

* * * * *